US012761180B2

(12) United States Patent
Ouyang et al.

(10) Patent No.: US 12,761,180 B2
(45) Date of Patent: Oct. 13, 2026

(54) TEMPERATURE-INSENSITIVE MEMBRANES FOR ANALYTE SENSORS

(71) Applicant: ABBOTT DIABETES CARE INC., Alameda, CA (US)

(72) Inventors: Tianmei Ouyang, Saratoga, CA (US); Benjamin J. Feldman, Berkeley, CA (US)

(73) Assignee: ABBOTT DIABETES CARE INC., Alameda, CA (US)

( * ) Notice: Subject to any disclaimer, the term of this patent is extended or adjusted under 35 U.S.C. 154(b) by 123 days.

(21) Appl. No.: 18/422,910

(22) Filed: Jan. 25, 2024

(65) Prior Publication Data

US 2024/0272113 A1 Aug. 15, 2024

Related U.S. Application Data

(60) Provisional application No. 63/481,498, filed on Jan. 25, 2023.

(51) Int. Cl.

*G01N 27/327* (2006.01)
*C08F 220/54* (2006.01)
*C08F 226/06* (2006.01)

(52) U.S. Cl.

CPC ....... *G01N 27/3272* (2013.01); *C08F 220/54* (2013.01); *C08F 226/06* (2013.01)

(58) Field of Classification Search

None
See application file for complete search history.

(56) References Cited

U.S. PATENT DOCUMENTS

| | | | |
|---|---|---|---|
| 4,780,411 | A | 10/1988 | Piejko et al. |
| 6,134,461 | A | 10/2000 | Say et al. |
| 6,605,200 | B1 | 8/2003 | Mao et al. |
| 6,605,201 | B1 | 8/2003 | Mao et al. |
| 6,736,957 | B1 | 5/2004 | Forrow et al. |
| 6,765,081 | B2 | 7/2004 | Lin et al. |
| 6,932,894 | B2 | 8/2005 | Mao et al. |
| 7,501,053 | B2 | 3/2009 | Karinka et al. |
| 7,754,093 | B2 | 7/2010 | Forrow et al. |
| 8,268,143 | B2 | 9/2012 | Liu et al. |
| 8,444,834 | B2 | 5/2013 | Liu et al. |
| 10,327,677 | B2 | 6/2019 | Hoss et al. |
| 2004/0198849 | A1 | 10/2004 | Aminabhavi et al. |
| 2011/0213225 | A1 | 9/2011 | Bernstein et al. |

(Continued)

FOREIGN PATENT DOCUMENTS

| | | | |
|---|---|---|---|
| JP | 2004-264121 | A | 9/2004 |
| KR | 2022-0049227 | A | 4/2022 |

(Continued)

OTHER PUBLICATIONS

PCT/US24/12955 ISR and Written Opinion.

(Continued)

*Primary Examiner* — J. Christopher Ball
(74) *Attorney, Agent, or Firm* — ONE LLP

(57) ABSTRACT

The present disclosure provides membrane structures that exhibit low temperature sensitivity. Analyte sensors including said membranes are also provided herein. The present disclosure further provides methods of detecting analytes using said sensors.

19 Claims, 12 Drawing Sheets

(56) References Cited

U.S. PATENT DOCUMENTS

| | | | | |
|---|---|---|---|---|
| 2015/0313520 | A1* | 11/2015 | Hoss | A61B 5/1486 600/347 |
| 2019/0320947 | A1 | 10/2019 | Chen et al. | |
| 2020/0237275 | A1 | 7/2020 | Feldman et al. | |
| 2020/0237276 | A1* | 7/2020 | Oja | A61B 5/14503 |
| 2020/0237277 | A1 | 7/2020 | Ouyang et al. | |
| 2020/0241015 | A1 | 7/2020 | Ouyang et al. | |
| 2022/0205944 | A1 | 6/2022 | Liu et al. | |

FOREIGN PATENT DOCUMENTS

| | | | |
|---|---|---|---|
| WO | WO 2010/074702 | A1 | 7/2010 |
| WO | WO 2012/015941 | A1 | 2/2012 |
| WO | WO 2012/161735 | A1 | 11/2012 |
| WO | WO 2016/025064 | A1 | 2/2016 |
| WO | WO 2022/147496 | A1 | 7/2022 |
| WO | WO 2023/091897 | A1 | 5/2023 |

OTHER PUBLICATIONS

Chen, Z., et al., “pH-Sensitive Water-Soluble Nanospheric Imprinted Hydrogels Prepared as Horseradish Peroxidase Mimetic”, Advanced Materials, 2010, vol. 22, pp. 1488-1492.

Deng, H., et al., “An Interference-Free Glucose Biosensor Based on an Anionic Redox Polymer-Mediated Enzymatic Oxidation of Glucose”, ChemPhysChem, 2013, vol. 14, pp. 2343-2347.

Guenther, M., et al., “Modeling and experimental investigations of the sensitivity of piezoresistive chemical sensors based on polyelectrolytic hydrogels”, Electroactive Polymer Actuators and Devices (EAPAD), 2009, Prov. of SPIE, vol. 7287, pp. 72870U-1-72870U-11.

Molina-Fernandez, C., et al., “Immobilization of carbonic anhydrase on poly(ionic liquid) composite membranes for $CO_2$ absorption by gas-liquid membrane contactors”, Journal of Membrane Science, 2023, vol. 687, pp. 1-11.

Mugo, S. M., et al., “Integrated Microcentrifuge Carbon Entrapped Glucose Oxidase Poly (N-Isopropylacrylamide) (pNIPAm) Microgels for Glucose Amperometric Detection”, Analytical Letters, 2019, vol. 52, No. 5, pp. 825-838.

Ogawa, K., et al., “Enzyme-Regulated Microgel Collapse for Controlled Membrane Permeability”, Langmuir, 2001, vol. 17, pp. 4704-4707.

* cited by examiner

TEMPERATURE-INSENSITIVE MEMBRANES FOR ANALYTE SENSORS

CROSS-REFERENCE TO RELATED APPLICATIONS

This application claims priority to U.S. Provisional Application No. 63/481,498 filed Jan. 25, 2023, the contents of which is incorporated herein by reference herein in its entirety.

FIELD

The subject matter disclosed herein relates to membrane structures for analyte sensors and methods of preparing analyte sensors with such membrane structures.

BACKGROUND

The detection of various analytes within an individual can sometimes be vital for monitoring the condition of their health as deviations from normal analyte levels can be indicative of a physiological condition. For example, monitoring glucose levels can enable people suffering from diabetes to take appropriate corrective action including administration of medicine or consumption of particular food or beverage products to avoid significant physiological harm. Other analytes can be desirable to monitor for other physiological conditions. In certain instances, it can be desirable to monitor more than one analyte to monitor multiple physiological conditions, particularly if a person is suffering from comorbid conditions that result in simultaneous dysregulation of two or more analytes in combination with one another.

Continuous analyte monitoring can be conducted using one or more sensors that remain at least partially implanted within a tissue of an individual, such as dermally, subcutaneously or intravenously, so that analyses may be conducted in vivo. Implanted sensors can collect analyte data on-demand, at a set schedule, or continuously, depending on an individual's particular health needs and/or previously measured analyte levels. Analyte monitoring with an in vivo implanted sensor can be a desirable approach for individuals having severe analyte dysregulation and/or rapidly fluctuating analyte levels, although it can also be beneficial for other individuals as well. However, in vivo analyte monitoring systems can be negatively impacted by temperature. For example, many enzymes and/or other components such as the membranes of in vivo analyte systems are sensitive to changes in temperature. Such sensitivity can lead to inaccurate analyte information at different temperatures.

Accordingly, there is a need in the art to develop analyte sensors and methods of in vivo analyte monitoring that are insensitive to temperature changes such as in vivo temperature changes.

SUMMARY

The purpose and advantages of the disclosed subject matter will be set forth in and are apparent from the description that follows, as well as will be learned by practice of the disclosed subject matter. Additional advantages of the disclosed subject matter will be realized and attained by the devices particularly pointed out in the written description and claims hereof, as well as from the appended drawings.

To achieve these and other advantages and in accordance with the purpose of the disclosed subject matter, as embodied and broadly described, the disclosed subject matter includes a membrane structure including an enzyme layer; and a membrane disposed proximate to the enzyme layer (e.g., disposed upon the enzyme layer), wherein the membrane includes a copolymer of at least a first monomer and a second monomer. In certain embodiments, the first monomer comprises an acrylamide. In certain embodiments, the first monomer is an acrylamide. For example, but not by way of limitation, the first monomer comprises an N-alkyl acrylamide. In certain embodiments, the first monomer is an N-alkyl acrylamide. In certain embodiments, the alkyl of the N-alkyl acrylamide is a C1-C6 straight or branched alkyl group or a $C_3$-$C_6$ cycloalkyl group. In certain embodiments, the alkyl of the N-alkyl acrylamide is a branched alkyl group. In certain embodiments, the first monomer is N-isopropylacrylamide. In certain embodiments, the second monomer comprises a heterocycle-containing component. In certain embodiments, the heterocycle of the heterocycle-containing component is selected from the group consisting of furan, thiophene, pyrrole, pyridine, pyrimidine, imidazole, oxadiazole, isoxazole, oxazole, pyrazole, isothiazole, thiazole, pyrazine, isoquinoline, quinoline, benzofuran, benzimidazole or a derivative thereof. In certain embodiments, the heterocycle is pyridine or a derivative thereof. In certain embodiments, the second monomer is a vinylpyridine, e.g., 4-vinylpyridine or 2-vinylpyridine, or a derivative thereof. In certain embodiments, the second monomer is 4-vinylpyridine or a derivative thereof. In certain embodiments, the second monomer is a vinylimidazole or a derivative thereof. In certain embodiments, the second monomer is a vinylimidazole, e.g., 1-vinylimidazole, or a derivative thereof.

In certain embodiments, the copolymer of the membrane structure comprises from about 20 mer % to about 70 mer % of the first monomer. In certain embodiments, the copolymer of the membrane structure comprises from about 30 mer % to about 60 mer % of the first monomer. In certain embodiments, the copolymer of the membrane structure comprises from about 40 mer % to about 60 mer % of the first monomer. In certain embodiments, the copolymer of the membrane structure comprises from about 30 mer % to about 80 mer % of the second monomer. In certain embodiments, the copolymer of the membrane structure comprises from about 40 mer % to about 70 mer % of the second monomer. In certain embodiments, the copolymer of the membrane structure comprises from about 30 mer % to about 65 mer % of the second monomer. In certain embodiments, the copolymer of the membrane structure comprises from about 30 mer % to about 50 mer % of the second monomer.

In certain embodiment, the copolymer has the structure of Formula I:

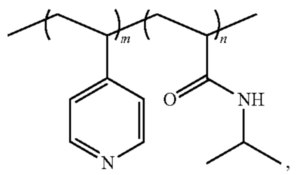

wherein m and n are each a positive integer. In certain embodiments, the ratio, e.g., molar ratio, of m and n is from about 100:1 to about 1:100. In certain embodiments, the ratio, e.g., molar ratio, of m and n is from about 4:1 to about 4:1. In certain embodiments, the ratio, e.g., molar ratio, of m and n is from about 1:1 to about 1:100, e.g., about 1:1 to about 1:50, about 1:1 to about 1:40, about 1:1 to about 1:30, about 1:1 to about 1:20, about 1:1 to about 1:10, about 1:1 to about 1:5, about 1:1 to about 1:4 or from about 1:1 to about 1:2. In certain embodiments, the ratio, e.g., molar ratio, of m and n is from about 1:1 to about 1:4. In certain embodiments, the ratio, e.g., molar ratio, of m and n is from about 1:1 to about 1:3. In certain embodiments, the ratio, e.g., molar ratio, of m and n is from about 1:1 to about 1:2. In certain embodiments, the ratio, e.g., molar ratio, of m and n is from about 1:1 to about 100:1, e.g., about 1:1 to about 50:1, about 1:1 to about 40:1, about 1:1 to about 30:1, about 1:1 to about 20:1, about 1:1 to about 10:1, about 1:1 to about 5:1, from about 1:1 to about 4:1 or from about 1:1 to about 2:1. In certain embodiments, the ratio, e.g., molar ratio, of m and n is from about 1:1 to about 4:1. In certain embodiments, m ranges from about 1 to about 90, e.g., about 1 to 80 or about 1 to 50. In certain embodiments, n ranges from about 1 to about 90, e.g., about 1 to about 70 or about 1 to 50. In certain embodiments, m ranges from about 1 to 50 (e.g., about 20 to 50) and n ranges from about 1 to 70 (e.g., about 40 to 70). In certain embodiments, m is about 80 and n is about 22, m is about 65 and n is about 35, m is about 50 and n is about 50 or m is about 40 and n is about 60. In certain embodiments, m is about 40 and n is about 60.

In certain embodiments, the membrane structure includes one or more crosslinking agents. In certain embodiments, the crosslinking agent is selected from the group consisting of polyethylene glycol diglycidyl ether, polyethylene glycol tetraglycidyl ether and polyetheramine. In certain embodiments, the membrane structure comprises from about 10% to about 20%, e.g., by weight, of a crosslinking agent.

In certain embodiments, the present disclosure provides an analyte sensor comprising: (i) a sensor tail comprising at least a first working electrode; (ii) a first active area disposed upon a surface of the first working electrode; and (iii) a mass transport limiting membrane permeable to the first analyte that overcoats at least the first active area. In certain embodiments, the first active area includes an electron transfer agent. In certain embodiments, the first analyte is selected from the group consisting of glucose, ketones, potassium, creatinine, glutamate, lactate, creatine, sarcosine and ascorbate. In certain embodiments, the first analyte is glucose. In certain embodiments, the first analyte is lactate.

In certain embodiments, the mass transport limiting membrane comprises a copolymer of at least a first monomer comprising a first monomer and a second monomer. In certain embodiments, the second monomer comprises an acrylamide. For example, but not by way of limitation, the mass transport limiting membrane comprises a copolymer of at least a first monomer comprising an acrylamide and a second monomer. In certain embodiments, the second monomer comprises a heterocycle-containing component. In certain embodiments, the acrylamide is an N-alkyl acrylamide or a derivative thereof. In certain embodiments, the alkyl of the N-alkyl acrylamide is a C1-C6 straight or branched alkyl group or a $C_3$-$C_6$ cycloalkyl group. In certain embodiments, the alkyl of the N-alkyl acrylamide is a branched alkyl group. In certain embodiments, the N-alkyl acrylamide is N-isopropylacrylamide or a derivative thereof. In certain embodiments, the heterocycle of the heterocycle-containing component is selected from the group consisting of furan, thiophene, pyrrole, pyridine, pyrimidine, imidazole, oxadiazole, isoxazole, oxazole, pyrazole, isothiazole, thiazole, pyrazine, isoquinoline, quinoline, benzofuran, benzimidazole or a derivative thereof. In certain embodiments, the second monomer is a vinylpyridinc, e.g., 4-vinylpyridine or 2-vinylpyridine, or a derivative thereof. In certain embodiments, the second monomer is 4-vinylpyridine or a derivative thereof. In certain embodiments, the second monomer is a vinylimidazole or a derivative thereof. In certain embodiments, the second monomer is a vinylimidazole, e.g., 1-vinylimidazole, or a derivative thereof.

In certain embodiments, the copolymer of the mass transport limiting membrane comprises from about 20 mer % to about 70 mer % of the first monomer. In certain embodiments, the copolymer of the mass transport limiting membrane comprises from about 30 mer % to about 60 mer % of the first monomer. In certain embodiments, the copolymer of the membrane structure comprises from about 40 mer % to about 60 mer % of the first monomer. In certain embodiments, the copolymer of the mass transport limiting membrane comprises from about 30 mer % to about 80 mer % of the second monomer. In certain embodiments, the copolymer of the mass transport limiting membrane comprises from about 40 mer % to about 70 mer % of the second monomer. In certain embodiments, the copolymer of the membrane structure comprises from about 30 mer % to about 65 mer % of the second monomer. In certain embodiments, the copolymer of the membrane structure comprises from about 30 mer % to about 50 mer % of the second monomer.

In certain embodiments, the copolymer of the mass transport limiting membrane has the structure of Formula I:

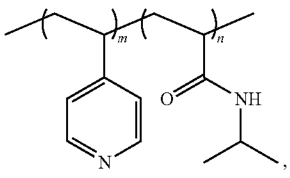

, wherein m and n are each a positive integer. In certain embodiments, the ratio of m and n is from about 100:1 to about 1:100. In certain embodiments, the ratio, e.g., molar ratio, of m and n is from about 4:1 to about 1:4. In certain embodiments, the ratio of m and n is from about 1:1 to about 1:100, e.g., about 1:1 to about 1:50, about 1:1 to about 1:40, about 1:1 to about 1:30, about 1:1 to about 1:20, about 1:1 to about 1:10, about 1:1 to about 1:5 or from about 1:1 to about 1:2. In certain embodiments, the ratio, e.g., molar ratio, of m and n is from about 1:1 to about 100:1, e.g., about 1:1 to about 50:1, about 1:1 to about 40:1, about 1:1 to about 30:1, about 1:1 to about 20:1, about 1:1 to about 10:1, about 1:1 to about 5:1, about 1:1 to about 4:1 or from about 1:1 to about 2:1. In certain embodiments, the ratio, e.g., molar ratio, of m and n is from about 1:1 to about 4:1. In certain embodiments, the ratio, e.g., molar ratio, of m and n is from about 1:1 to about 1:4. In certain embodiments, the ratio, e.g., molar ratio, of m and n is from about 1:1 to about 1:3. In certain embodiments, the ratio, e.g., molar ratio, of m and n is from about 1:1 to about 1:2. In certain embodiments, the ratio, e.g., molar ratio, of m and n is from about 4:1 to about 1:3. In certain embodiments, the ratio, e.g., molar ratio, of m and n is from about 4:1 to about 1:2. In certain embodiments, m ranges from about 1 to about 90, e.g., about 1 to 80 or about 1 to 50, and n ranges from about 1 to 90, e.g., about 1 to about 70 or about 1 to 50. In certain embodiments, m ranges from about 1 to 50 (e.g., about 20 to 50) and n ranges from about 1 to 70 (e.g., about 40 to 70). In certain embodiments, m is about 80 and n is about 22, m is about 65 and n is about 35, m is about 50 and n is about 50 or m is about 40 and n is about 60. In certain embodiments, m is about 40 and n is about 60.

In certain embodiments, the analyte sensor further includes a second working electrode and a second active area disposed upon a surface of the second working electrode and responsive to a second analyte differing from the first analyte, wherein the second active area includes at least one enzyme responsive to the second analyte. In certain embodiments, the mass transport limiting membrane directly overcoats the second active area, a second portion of the mass transport limiting membrane overcoats the second active area or a second separate mass transport limiting membrane overcoats the second active area. In certain embodiments, the second separate mass transport limiting membrane comprises a different polymer than the first separate mass transport limiting membrane. In certain embodiments, the second separate mass transport limiting membrane comprises the same polymer as the first separate mass transport limiting membrane.

In certain embodiments, the second active area includes an electron transfer agent. In certain embodiments, the second analyte is different from the first analyte. In certain embodiments, the first analyte is glucose. In certain embodiments, the second analyte is selected from the group consisting of glucose, glutamate, lactate, creatine, sarcosine, and ascorbate.

In certain embodiments, the present disclosure further provides a method for detecting an analyte, where the method includes providing an analyte sensor as disclosed herein, obtaining a first signal at or above an oxidation-reduction potential of the first active area, the first signal being proportional to a concentration of the first analyte in a fluid contacting the first active area; and correlating the first signal to the concentration of the first analyte in the fluid. In certain embodiments, the first active area includes one or more enzymes responsive to the first analyte. Alternatively, the first active area does not include an enzyme and the analyte undergoes a redox reaction at the working electrode.

In certain embodiments, the present disclosure provides a method for detecting at least two analytes that includes obtaining a first signal at or above an oxidation-reduction potential of the first active area, the first signal being proportional to a concentration of the first analyte in a fluid contacting the first active area, obtaining a second signal at or above an oxidation-reduction potential of the second active area, the second signal being proportional to a concentration of the second analyte in a fluid contacting the second active area, correlating the first signal to the concentration of the first analyte in the fluid, and correlating the second signal to the concentration of the second analyte in the fluid. In certain embodiments, the first active area includes one or more enzymes responsive to the first analyte and/or the second active area includes one or more enzymes responsive to the second analyte.

The present disclosure further provides a copolymer of at least a first monomer comprising an acrylamide and a second monomer comprising a heterocycle-containing component. In certain embodiments, the acrylamide is an N-alkyl acrylamide or a derivative thereof. In certain embodiments, the alkyl of the N-alkyl acrylamide is a C1-C6 straight or branched alkyl group or a $C_3$-$C_6$ cycloalkyl group. In certain embodiments, the alkyl of the N-alkyl acrylamide is a branched alkyl group. In certain embodiments, the N-alkyl acrylamide is N-isopropylacrylamide or a derivative thereof. In certain embodiments, the heterocycle of the heterocycle-containing component is selected from the group consisting of furan, thiophene, pyrrole, pyridine, pyrimidine, imidazole, oxadiazole, isoxazole, oxazole, pyrazole, isothiazole, thiazole, pyrazine, isoquinoline, quinoline, benzofuran, benzimidazole or a derivative thereof. In certain embodiments, the second monomer is a vinylpyridine, e.g., 4-vinylpyridine or 2-vinylpyridine, or a derivative thereof. In certain embodiments, the second monomer is 4-vinylpyridine or a derivative thereof. In certain embodiments, the second monomer is a vinylimidazole or a derivative thereof. In certain embodiments, the second monomer is a vinylimidazole, e.g., 1-vinylimidazole, or a derivative thereof.

In certain embodiments, the copolymer of the present disclosure comprises from about 20 mer % to about 70 mer % of the first monomer. In certain embodiments, the copolymer of the mass transport limiting membrane comprises from about 40 mer % to about 60 mer % of the first monomer. In certain embodiments, the copolymer of the mass transport limiting membrane comprises from about 30 mer % to about 60 mer % of the first monomer. In certain embodiments, the copolymer of the mass transport limiting membrane comprises from about 30 mer % to about 80 mer % of the second monomer. In certain embodiments, the copolymer of the mass transport limiting membrane comprises from about 40 mer % to about 80 mer % of the second monomer. In certain embodiments, the copolymer of the mass transport limiting membrane comprises from about 30 mer % to about 65 mer % of the second monomer. In certain embodiments, the copolymer of the mass transport limiting membrane comprises from about 30 mer % to about 50 mer % of the second monomer.

In certain embodiments, the copolymer of the present disclosure has the structure of Formula I:

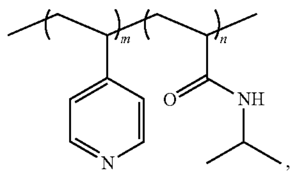

wherein m and n are each a positive integer. In certain embodiments, the ratio of m and n is from about 100:1 to about 1:100. In certain embodiments, the ratio, e.g., molar ratio, of m and n is from about 4:1 to about 1:4. In certain embodiments, the ratio of m and n is from about 1:1 to about 1:100, e.g., about 1:1 to about 1:50, about 1:1 to about 1:40, about 1:1 to about 1:30, about 1:1 to about 1:20, about 1:1 to about 1:10, about 1:1 to about 1:5 or from about 1:1 to about 1:2. In certain embodiments, the ratio, e.g., molar ratio, of m and n is from about 1:1 to about 100:1, e.g., about 1:1 to about 50:1, about 1:1 to about 40:1, about 1:1 to about 30:1, about 1:1 to about 20:1, about 1:1 to about 10:1, about 1:1 to about 5:1, about 1:1 to about 4:1 or from about 1:1 to about 2:1. In certain embodiments, the ratio, e.g., molar ratio, of m and n is from about 1:1 to about 4:1. In certain embodiments, the ratio, e.g., molar ratio, of m and n is from about 1:1 to about 1:4. In certain embodiments, the ratio, e.g., molar ratio, of m and n is from about 1:1 to about 1:3. In certain embodiments, the ratio, e.g., molar ratio, of m and n is from about 1:1 to about 1:2. In certain embodiments, the ratio, e.g., molar ratio, of m and n is from about 4:1 to about 1:3. In certain embodiments, the ratio, e.g., molar ratio, of m and n is from about 4:1 to about 1:2. In certain embodiments, m ranges from about 1 to about 90, e.g., about 1 to 80 or about 1 to 50, and n ranges from about 1 to 90, e.g., about 1 to about 70 or about 1 to 50. In certain embodiments, m ranges from about 1 to 50 (e.g., about 20 to 50) and n ranges from about 1 to 70 (e.g., about 40 to 70). In certain embodiments, m is about 80 and n is about 22, m is about 65 and n is about 35, m is about 50 and n is about 50 or m is about 40 and n is about 60. In certain embodiments, m is about 40 and n is about 60. The present disclosure further provides a membrane comprising a copolymer of the present disclosure.

The present disclosure further provides an analyte sensor comprising the membrane structure described herein.

The present disclosure provides the use of an analyte sensor described herein for detecting an analyte, e.g., an analyte concentration in a fluid.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
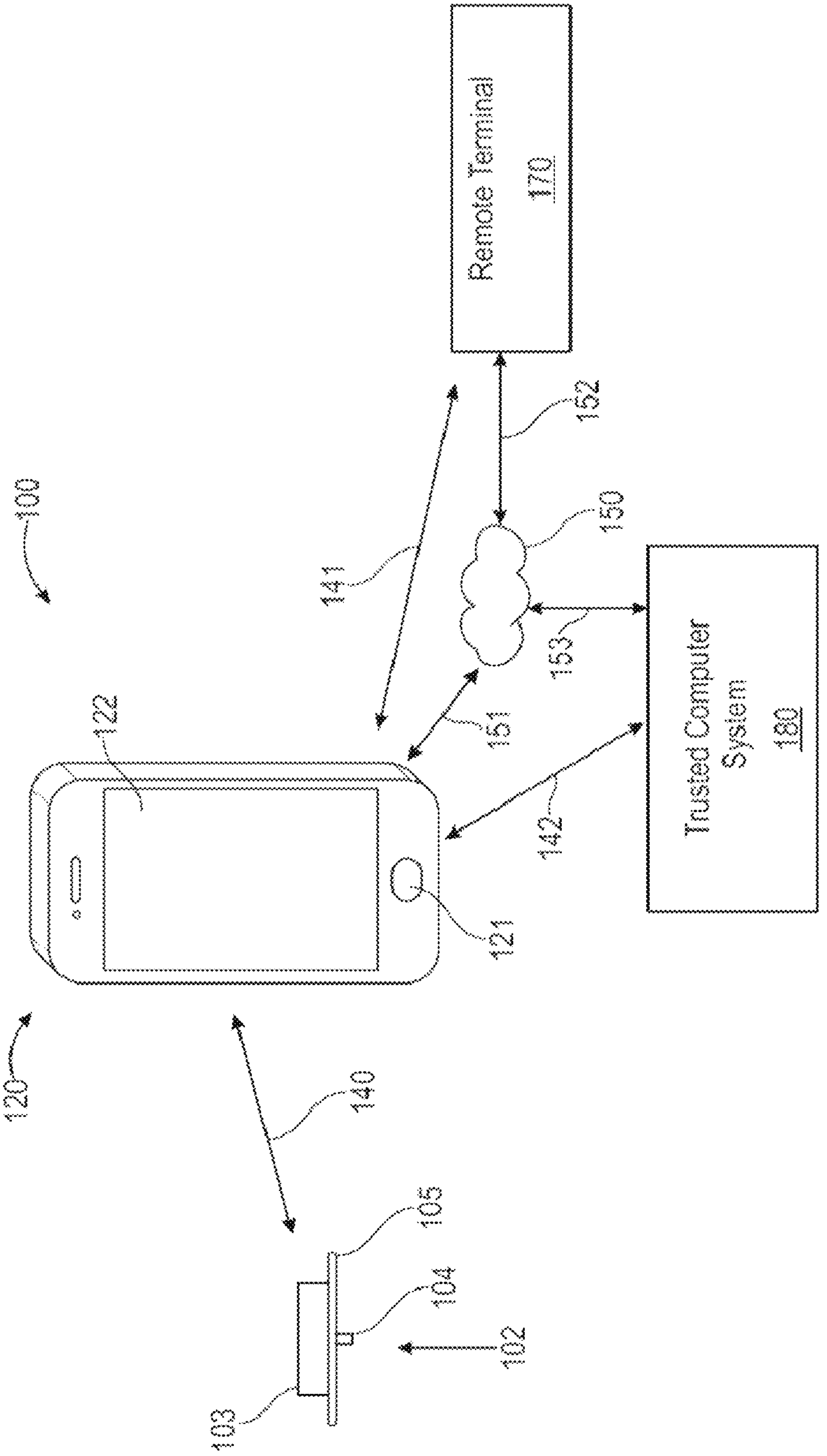
FIG. 1 shows a diagram of an illustrative sensing system that can incorporate an analyte sensor of the present disclosure.

The present disclosure provides membranes for analyte sensors that are temperature independent such that detection of the analyte is not adversely affected by a change in temperature. In certain embodiments, the sensitivity of the analyte sensor that include membranes of the present disclosure remains constant or the changes in sensitivity are clinically insignificant (little to no increase or decrease changes) over a range of temperatures.

In certain embodiments, analyte permeability through the membranes of the present disclosure remains constant or the changes in analyte permeability are clinically insignificant (little to no increase or decrease changes) over a range of temperatures. In certain embodiments, the membranes of the present disclosure have rates of analyte diffusion (i.e., analyte flux) that show little to no change at different temperatures and/or in response to a change in temperature. In certain embodiments, the rate of analyte diffusion through the membranes of the present disclosure changes less than about 5%, e.g., less than about 1%, in response to a change in temperature. In certain embodiments, the rate of analyte diffusion through the membranes of the present disclosure does not change at all in response to a change in temperature. In certain embodiments, the membranes of the present disclosure resist changes in analyte permeability at different temperatures for an extended period of time. For example, but not by the way of limitation, the membranes of the present disclosure resist changes in analyte permeability at different temperatures for at least the in vivo lifetime (wear time or use time) of the membrane, e.g., for at least one week, at least two weeks, at least three weeks or at least four weeks.

In certain embodiments, the sensitivity of analyte sensors that include membranes of the present disclosure show little to no change at different temperatures and/or in response to a change in temperature. In certain embodiments, the sensitivity of analyte sensors that include membranes of the present disclosure changes less than about 5%, e.g., less than about 1%, in response to a change in temperature. In certain embodiments, the sensitivity of analyte sensors that include membranes of the present disclosure does not change at all in response to a change in temperature. In certain embodiments, analyte sensors that include membranes of the present disclosure resist changes in sensitivity at different temperatures for an extended period of time. For example, but not by the way of limitation, analyte sensors that include membranes of the present disclosure resist changes in sensitivity at different temperatures for at least the in vivo lifetime (wear time or use time) of the membrane, e.g., for at least one week, at least two weeks, at least three weeks or at least four weeks.

For clarity, but not by way of limitation, the detailed description of the presently disclosed subject matter is divided into the following subsections:

I. Definitions;

II. Analyte sensors;

1. General Structure of Analyte Sensor Systems;
2. Enzymes;
3. Redox Mediators;
4. Polymeric Backbone;
5. Mass Transport Limiting Membrane; and
6. Interference Domain;

III. Methods of Use;

IV. Methods of Manufacture; and

V. Exemplary Embodiments.

I. Definitions

The terms used in this specification generally have their ordinary meanings in the art, within the context of this disclosure and in the specific context where each term is used. Certain terms are discussed below, or elsewhere in the specification, to provide additional guidance to the practitioner in describing the compositions and methods of the present disclosure and how to make and use them.

For purposes of interpreting this specification, the following definitions will apply and whenever appropriate, terms used in the singular will also include the plural and vice versa. In the event that any definition set forth below conflicts with any document incorporated herein by reference, the definition set forth below shall control.

As used herein, the use of the word "a" or "an" when used in conjunction with the term "comprising" in the claims and/or the specification can mean "one," but it is also consistent with the meaning of "one or more," "at least one," and "one or more than one." For example, but not by way of limitation, reference to "an" or "the" "analyte" encompasses a single analyte, as well as a combination and/or mixture of two or more different analytes.

The terms "comprise(s)," "include(s)," "having," "has," "can," "contain(s)," and variants thereof, as used herein, are intended to be open-ended transitional phrases, terms or words that do not preclude additional acts or structures. The present disclosure also contemplates other embodiments "comprising," "consisting of" and "consisting essentially of," the embodiments or elements presented herein, whether explicitly set forth or not.

As used herein, the term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value.

The term "biological fluid," as used herein, refers to any bodily fluid or bodily fluid derivative in which the analyte can be measured. Non-limiting examples of a biological fluid include dermal fluid, interstitial fluid, plasma, blood, lymph, synovial fluid, cerebrospinal fluid, saliva, broncho-alveolar lavage, amniotic fluid, sweat, tears, or the like. In certain embodiments, the biological fluid is dermal fluid or interstitial fluid.

The term "crosslinker", as used herein refers to a molecule that contains at least two reactive groups capable of linking at two or more polymers together or linking two or more portions of the same polymer together. As described herein, linking two or more different polymers together is intermolecular crosslinking, whereas linking two more portions of the same polymer is intramolecular crosslinking. In certain embodiments of the present disclosure, crosslinkers of interest can be capable of both intermolecular and intramolecular crosslinking at the same time.

As used herein, the term "hydrophilic" refers to having an affinity for and capable of absorbing water.

As used herein, the terms "enzyme composition" and "sensing chemistry," are used interchangeably, and refer to a composition that is used to detect and/or measure an analyte. In certain non-limiting embodiments, the enzyme compositions can include one or more enzymes, polymers, redox mediators, crosslinkers etc.

The term "low critical solution temperature" is used herein in its conventional sense to refer to the temperature below which the components of a mixture are miscible. In certain embodiments, the LCST can depend on pressure (e.g., increasing pressure may increase the LCST), degree of polymerization, polydispersity (e.g., the distribution of molecular mass in the polymer), branching of the polymer, and the like.

The term "polymer," as used herein, refers to molecular structures that include repeating structural units referred to as monomers. These subunits are typically connected by covalent chemical bonds. As would be readily recognized by a person of ordinary skill in the art, polymers can be branched or unbranched. In certain embodiments, the polymers are homopolymers, which are polymers formed by polymerization of a single type of monomer. In certain other embodiments, polymers are heteropolymers or copolymers that include two or more different types of monomers.

As used herein, the term "redox mediator" refers to an electron transfer agent for carrying electrons between an analyte or an analyte-reduced or analyte oxidized enzyme and an electrode, either directly, or via one or more additional electron transfer agents. In certain embodiments, redox mediators that include a polymeric backbone can also be referred to as "redox polymers."

The term "reference electrode" as used herein, can refer to either reference electrodes or electrodes that function as both, a reference and a counter electrode. Similarly, the term "counter electrode", as used herein, refers to both, a counter electrode and a counter electrode that also functions as a reference electrode.

As used herein, the terms "temperature insensitivity," "constant or the same analyte permeability," "low temperature sensitivity, "temperature independent" and analogous terms are used herein interchangeably to refer to a membrane or an analyte sensor where the rate of analyte diffusion through an analyte permeable membrane that does not change (increase or decrease) by more than 5% per ° C., such as by 4.5% per ° C., 4.0% per ° C., 3.5% per ° C., 3.0% per C, 2.5% per ° ° C., 2.0% per ° ° C., 1.5% per ° C., 1.0% per ° ° C., 0.5% per ° ° C., 0.01% or less per ° C., in response to changes in temperatures of 20° ° C. to 50° C. with a standard deviation of about 1%. In certain embodiments, the rate of analyte diffusion such as glucose diffusion across a membrane of the present disclosure is constant (within the parameters mentioned herein) over a temperature range such as from 20° ° C. to 50° C. or 20° C. to 45° C., including at temperatures of 22° C., 27° ° C., 32° ° C., 37° ° C. and 45° C.

As used herein, "analyte sensor" or "sensor" can refer to any device capable of receiving sensor information from a user, including for purpose of illustration but not limited to, body temperature sensors, blood pressure sensors, pulse or heart-rate sensors, glucose level sensors, analyte sensors, physical activity sensors, body movement sensors, or any other sensors for collecting physical or biological information. Analytes measured by the analyte sensors can include, by way of example and not limitation, glutamate, glucose, ketones, lactate, oxygen, hemoglobin A1C, albumin, alcohol, alkaline phosphatase, alanine transaminase, aspartate aminotransferase, bilirubin, blood urea nitrogen, calcium, carbon dioxide, chloride, creatinine, hematocrit, aspartate, asparagine, magnesium, oxygen, pH, phosphorus, potassium, sodium, total protein, uric acid, etc.

The term a "reactive group," as used herein refers to a functional group of a molecule that is capable of reacting with another compound, e.g., a polymer, to couple at least a portion of that other compound, e.g., a polymer, to the molecule. Non-limiting examples of reactive groups include carboxy, activated ester, sulfonyl halide, sulfonate ester, isocyanate, isothiocyanate, epoxide, aziridine, halide, aldehyde, ketone, amine, acrylamide, thiol, acyl azide, acyl halide, hydrazine, hydroxylamine, alkyl halide, imidazole, pyridine, phenol, alkyl sulfonate, halotriazine, imido ester, maleimide, hydrazide, hydroxy, and photo-reactive azido aryl groups. Activated esters, as used herein and understood in the art, include but are not limited to esters of succinimidyl, benzotriazolyl, or aryl substituted by electron-withdrawing groups such as sulfo, nitro, cyano, or halo groups; or carboxylic acids activated by carbodiimides.

As used herein, the term "multi-component membrane" refers to a membrane comprising two or more types of membrane polymers.

As used herein, the term "single-component membrane" refers to a membrane comprising one type of membrane polymer.

As used herein, the term "polyvinylpyridine-based polymer" refers to a polymer or copolymer that comprises polyvinylpyridine (e.g., poly(2-vinylpyridine) or poly(4-vinylpyridine)) or a derivative thereof.

The term "alkyl," as used herein, refers to linear or branched, saturated aliphatic hydrocarbons. Examples of alkyl groups include but are not limited to methyl, ethyl, n-propyl, isopropyl, n-butyl, tert-butyl, and the like. Unless otherwise noted, the term "alkyl" includes both alkyl and cycloalkyl groups.

II. Analyte Sensors

1. General Structure of Analyte Sensor Systems

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed.

Generally, embodiments of the present disclosure include systems, devices and methods for the use of analyte sensor insertion applicators for use with in vivo analyte monitoring systems. An applicator can be provided to the user in a sterile package with an electronics housing of the sensor control device contained therein. According to certain embodiments, a structure separate from the applicator, such as a container, can also be provided to the user as a sterile package with a sensor module and a sharp module contained therein. The user can couple the sensor module to the electronics housing, and can couple the sharp to the applicator with an assembly process that involves the insertion of the applicator into the container in a specified manner. In certain embodiments, the applicator, sensor control device, sensor module and sharp module can be provided in a single package. The applicator can be used to position the sensor control device on a human body with a sensor in contact with the wearer's bodily fluid. The embodiments provided herein are improvements to reduce the likelihood that a sensor is improperly inserted or damaged, or elicits an adverse physiological response. Other improvements and advantages are provided as well. The various configurations of these devices are described in detail by way of the embodiments which are only examples.

Furthermore, many embodiments include in vivo analyte sensors structurally configured so that at least a portion of the sensor is, or can be, positioned in the body of a user to obtain information about at least one analyte of the body. It should be noted, however, that the embodiments disclosed herein can be used with in vivo analyte monitoring systems that incorporate in vitro capability, as well as purely in vitro or ex vivo analyte monitoring systems, including systems that are entirely non-invasive.

Furthermore, for each and every embodiment of a method disclosed herein, systems and devices capable of performing each of those embodiments are covered within the scope of the present disclosure. For example, embodiments of sensor control devices are disclosed and these devices can have one or more sensors, analyte monitoring circuits (e.g., an analog circuit), memories (e.g., for storing instructions), power sources, communication circuits, transmitters, receivers, processors and/or controllers (e.g., for executing instructions) that can perform any and all method steps or facilitate the execution of any and all method steps. These sensor control device embodiments can be used and can be capable of use to implement those steps performed by a sensor control device from any and all of the methods described herein.

Furthermore, the systems and methods presented herein can be used for operations of a sensor used in an analyte monitoring system, such as but not limited to wellness, fitness, dietary, research, information or any purposes involving analyte sensing over time. As used herein, "analyte sensor" or "sensor" can refer to any device capable of receiving sensor information from a user, including for purpose of illustration but not limited to, body temperature sensors, blood pressure sensors, pulse or heart-rate sensors, glucose level sensors, analyte sensors, physical activity sensors, body movement sensors, or any other sensors for collecting physical or biological information. In certain embodiments, an analyte sensor of the present disclosure can further measure analytes including, but not limited to, glutamate, glucose, ketones, lactate, oxygen, hemoglobin A1C, albumin, alcohol, alkaline phosphatase, alanine transaminase, aspartate aminotransferase, bilirubin, blood urea nitrogen, calcium, carbon dioxide, chloride, creatinine, creatine, hematocrit, magnesium, oxygen, pH, phosphorus, potassium, sodium, total protein, uric acid, etc.

Before describing these aspects of the embodiments in detail, however, it is first desirable to describe examples of devices that can be present within, for example, an in vivo analyte monitoring system, as well as examples of their operation, all of which can be used with the embodiments described herein.

There are various types of in vivo analyte monitoring systems. "Continuous Analyte Monitoring" systems (or "Continuous Glucose Monitoring" systems), for example, can transmit data from a sensor control device to a reader device continuously without prompting, e.g., automatically according to a schedule. "Flash Analyte Monitoring" systems (or "Flash Glucose Monitoring" systems or simply "Flash" systems), as another example, can transfer data from a sensor control device in response to a scan or request for data by a reader device, such as with a Near Field Communication (NFC) or Radio Frequency Identification (RFID) protocol. In vivo analyte monitoring systems can also operate without the need for finger stick calibration.

In vivo analyte monitoring systems can be differentiated from "in vitro" systems that contact a biological sample outside of the body (or "ex vivo") and that typically include a meter device that has a port for receiving an analyte test strip carrying bodily fluid of the user, which can be analyzed to determine the user's blood analyte level.

In vivo monitoring systems can include a sensor that, while positioned in vivo, makes contact with the bodily fluid of the user and senses the analyte levels contained therein. The sensor can be part of the sensor control device that resides on the body of the user and contains the electronics and power supply that enable and control the analyte sensing. The sensor control device, and variations thereof, can also be referred to as a "sensor control unit," an "on-body electronics" device or unit, an "on-body" device or unit, or a "sensor data communication" device or unit, to name a few.

In vivo monitoring systems can also include a device that receives sensed analyte data from the sensor control device and processes and/or displays that sensed analyte data, in any number of forms, to the user. This device, and variations thereof, can be referred to as a "handheld reader device," "reader device" (or simply a "reader"), "handheld electronics" (or simply a "handheld"), a "portable data processing" device or unit, a "data receiver," a "receiver" device or unit (or simply a "receiver"), or a "remote" device or unit, to name a few. Other devices such as personal computers have also been utilized with or incorporated into in vivo and in vitro monitoring systems.

FIG. 1 provides a diagram of an illustrative sensing system that can incorporate an analyte sensor of the present disclosure. As shown, sensing system 100 includes sensor control device 102 and reader device 120 that are configured to communicate with one another over a local communication path or link 140, which can be wired or wireless, uni- or bi-directional, and encrypted or non-encrypted. Reader device 120 can constitute an output medium for viewing analyte concentrations and alerts or notifications determined by sensor 104 or a processor associated therewith, as well as allowing for one or more user inputs, according to certain embodiments. Reader device 120 can be a multi-purpose smartphone or a dedicated electronic reader instrument. While only one reader device 120 is shown, multiple reader devices 120 can be present in certain instances. Reader device 120 can also be in communication with remote terminal 170 and/or trusted computer system 180 via communication path(s)/link(s) 141 and/or 142, respectively, which also can be wired or wireless, uni- or bi-directional, and encrypted or non-encrypted. Reader device 120 can also or alternately be in communication with network 150 (e.g., a mobile telephone network, the internet, or a cloud server) via communication path/link 151. Network 150 can be further communicatively coupled to remote terminal 170 via communication path/link 152 and/or trusted computer system 180 via communication path/link 153. Alternately, sensor 104 can communicate directly with remote terminal 170 and/or trusted computer system 180 without an intervening reader device 120 being present. For example, but not by the way of limitation, sensor 104 can communicate with remote terminal 170 and/or trusted computer system 180 through a direct communication link to network 150, according to certain embodiments, as described in U.S. Patent Application Publication 2011/0213225 and incorporated herein by reference in its entirety. Any suitable electronic communication protocol can be used for each of the communication paths or links, such as near field communication (NFC), radio frequency identification (RFID), BLUETOOTH® or BLUETOOTH® Low Energy protocols, WiFi, or the like. Remote terminal 170 and/or trusted computer system 180 can be accessible, according to certain embodiments, by individuals other than a primary user who have an interest in the user's analyte levels. Reader device 120 can include display 122 and optional input component 121. Display 122 can include a touch-screen interface, according to certain embodiments.

Sensor control device 102 includes sensor housing 103, which can house circuitry and a power source for operating sensor 104. Optionally, the power source and/or active circuitry can be omitted. A processor (not shown) can be communicatively coupled to sensor 104, with the processor being physically located within sensor housing 103 or reader device 120. Sensor 104 protrudes from the underside of sensor housing 103 and extends through adhesive layer 105, which is adapted for adhering sensor housing 103 to a tissue surface, such as skin, according to certain embodiments.

Sensor 104 is adapted to be at least partially inserted into a tissue of interest, such as within the dermal or subcutaneous layer of the skin. Sensor 104 can include a sensor tail of sufficient length for insertion to a desired depth in a given tissue. The sensor tail can include at least one working electrode. In certain embodiments, the sensor tail can include two working electrodes. In certain configurations, the sensor tail can include an active area for detecting an analyte, e.g., on a working electrode. A counter electrode can be present in combination with the at least one working electrode. Particular electrode configurations upon the sensor tail are described in more detail below.

The active area can be configured for detecting a particular analyte, such as e.g., glucose, glutamate, creatinine, creatine, sarcosine, ascorbate and a combination thereof. For example, but not by the way of limitation, a glucose-responsive active area can include a glucose-responsive enzyme, a glutamate-responsive active area can include a glutamate-responsive enzyme, a creatine-responsive active area can include a creatine-responsive enzyme system, a creatinine-responsive active area can include a creatinine-responsive enzyme system, a sarcosine-responsive active area can include a sarcosine-responsive enzyme system, and an ascorbate-responsive active area can include an ascorbate-responsive enzyme system.

A membrane can overcoat the active area, as also described in further detail below. In certain embodiments, a membrane overcoating an analyte-responsive active area can function as a mass transport limiting membrane and/or to improve biocompatibility. A mass transport limiting membrane can act as a diffusion-limiting barrier to reduce the rate of mass transport of the analyte. For example, but not by way of limitation, limiting access of an analyte to the analyte-responsive active area with a mass transport limiting membrane can aid in avoiding sensor overload (saturation), thereby improving detection performance and accuracy. In certain embodiments, the membrane includes a copolymer of the present disclosure, e.g., as described in Section II.5. For example, but not by way of limitation, the mass transport limiting membrane can include a copolymer comprising a first monomer, e.g., an acrylamide (e.g., an N-alkyl acrylamide), and a second monomer comprising a heterocycle-containing component, e.g., a vinylpyridine, e.g., 4-vinylpyridine. In certain embodiments, the N-alkyl acrylamide is N-isopropylacrylamide.

In certain embodiments of the present disclosure, one or more analytes can be monitored in any biological fluid of interest such as dermal fluid, interstitial fluid, plasma, blood, lymph, synovial fluid, cerebrospinal fluid, saliva, bronchoalveolar lavage, amniotic fluid, or the like. In certain embodiments, analyte sensors of the present disclosure can be adapted for assaying dermal fluid or interstitial fluid to determine a concentration of one or more analytes in vivo. In certain embodiments, the biological fluid is interstitial fluid.

Referring still to FIG. 1, sensor 104 can automatically forward data to reader device 120. For example, but not by the way of limitation, analyte concentration data can be communicated automatically and periodically, such as at a certain frequency as data is obtained or after a certain time period has passed, with the data being stored in a memory until transmittal (e.g., every minute, five minutes, or other predetermined time period). In certain embodiments, sensor 104 can communicate with reader device 120 in a non-automatic manner and not according to a set schedule. For example, but not by the way of limitation, data can be communicated from sensor 104 using RFID technology when the sensor electronics are brought into communication range of reader device 120. Until communicated to reader device 120, data can remain stored in a memory of sensor 104. Thus, a user does not have to maintain close proximity to reader device 120 at all times, and can instead upload data at a convenient time. In certain embodiments, a combination of automatic and non-automatic data transfer can be implemented. For example, and not by the way of limitation, data transfer can continue on an automatic basis until reader device 120 is no longer in communication range of sensor 104.

An introducer can be present transiently to promote introduction of sensor 104 into a tissue. In certain illustrative embodiments, the introducer can include a needle or similar sharp. As would be readily recognized by a person skilled in the art, other types of introducers, such as sheaths or blades, can be present in alternative embodiments. More specifically, the needle or other introducer can transiently reside in proximity to sensor 104 prior to tissue insertion and then be withdrawn afterward. While present, the needle or other introducer can facilitate insertion of sensor 104 into a tissue by opening an access pathway for sensor 104 to follow. For example, and not by the way of limitation, the needle can facilitate penetration of the epidermis as an access pathway to the dermis to allow implantation of sensor 104 to take place, according to one or more embodiments. After opening the access pathway, the needle or other introducer can be withdrawn so that it does not represent a sharps hazard. In certain embodiments, suitable needles can be solid or hollow, beveled or non-beveled, and/or circular or non-circular in cross-section. In more particular embodiments, suitable needles can be comparable in cross-sectional diameter and/or tip design to an acupuncture needle, which can have a cross-sectional diameter of about 250 microns. However, suitable needles can have a larger or smaller cross-sectional diameter if needed for certain particular applications.

In certain embodiments, a tip of the needle (while present) can be angled over the terminus of sensor 104, such that the needle penetrates a tissue first and opens an access pathway for sensor 104. In certain embodiments, sensor 104 can reside within a lumen or groove of the needle, with the needle similarly opening an access pathway for sensor 104. In either case, the needle is subsequently withdrawn after facilitating sensor insertion.

Figure 2A:
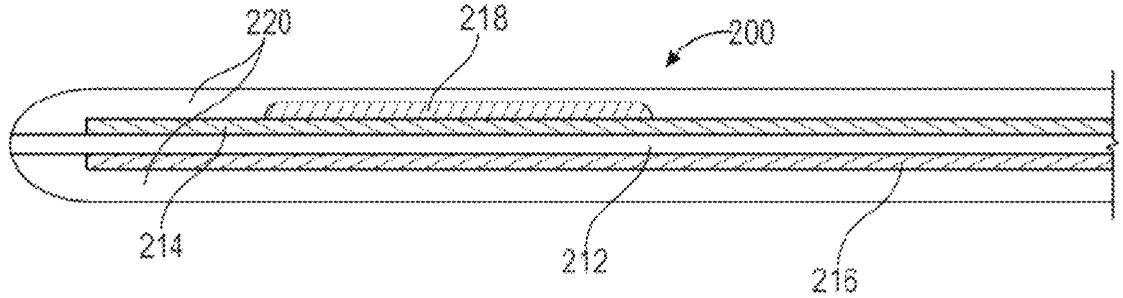
FIGS. 2A-2C show cross-sectional diagrams of analyte sensors including a single active area.
Figure 2B:
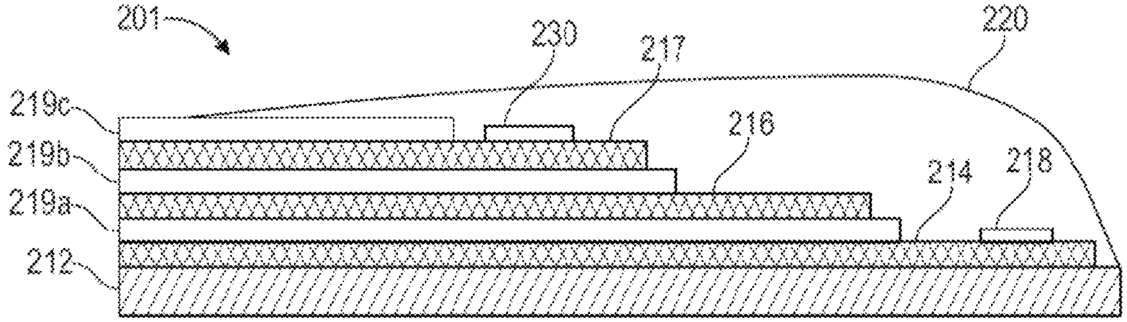
Figure 2C:
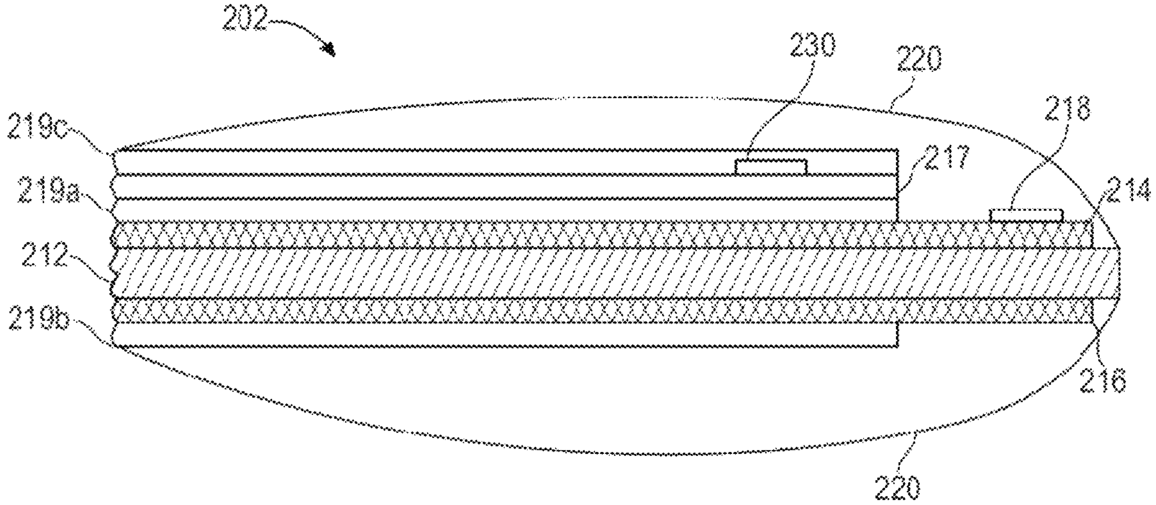

Sensor configurations featuring a single active area that is configured for detection of a corresponding single analyte can employ two-electrode or three-electrode detection motifs, as described further herein in reference to FIGS. 2A-2C. Sensor configurations featuring two different active areas for detection of the same or separate analytes, either upon separate working electrodes or upon the same working electrode, are described separately thereafter in reference to FIGS. 3A-5C. Sensor configurations having multiple working electrodes can be particularly advantageous for incorporating two different active areas within the same sensor tail, since the signal contribution from each active area can be determined more readily.

When a single working electrode is present in an analyte sensor, three-electrode sensor configurations can include a working electrode, a counter electrode and a reference electrode. Related two-electrode sensor configurations can include a working electrode and a second electrode, in which the second electrode can function as both a counter electrode and a reference electrode (i.e., a counter/reference electrode). The various electrodes can be at least partially stacked (layered) upon one another and/or laterally spaced apart from one another upon the sensor tail. Suitable sensor configurations can be substantially flat in shape, substantially cylindrical in shape or any suitable shape. In any of the sensor configurations disclosed herein, the various electrodes can be electrically isolated from one another by a dielectric material or similar insulator.

Analyte sensors featuring multiple working electrodes can similarly include at least one additional electrode. When one additional electrode is present, the one additional electrode can function as a counter/reference electrode for each of the multiple working electrodes. When two additional electrodes are present, one of the additional electrodes can function as a counter electrode for each of the multiple working electrodes and the other of the additional electrodes can function as a reference electrode for each of the multiple working electrodes.

FIG. 2A shows a diagram of an illustrative two-electrode analyte sensor configuration, which is compatible for use in the disclosure herein. As shown, analyte sensor 200 includes substrate 212 disposed between working electrode 214 and counter/reference electrode 216. Alternately, working electrode 214 and counter/reference electrode 216 can be located upon the same side of substrate 212 with a dielectric material interposed in between (configuration not shown). Active area 218 is disposed as at least one layer upon at least a portion of working electrode 214. Active area 218 can include multiple spots or a single spot configured for detection of an analyte (e.g., at a low working electrode potential), as discussed further herein. In certain embodiments, active area 218 can comprise an electron transfer agent described herein.

Referring still to FIG. 2A, membrane 220 overcoats at least active area 218. In certain embodiments, membrane

220 comprises a copolymer of the present disclosure. In certain embodiments, membrane 220 comprises a copolymer comprising a first monomer, e.g., an acrylamide (e.g., an N-alkyl acrylamide), and a second monomer. In certain embodiments, the second monomer can comprise a heterocycle-containing component (e.g., furan, thiophene, pyrrole, pyridine, pyrimidine, imidazole, oxadiazole, isoxazole, oxazole, pyrazole, isothiazole, thiazole, pyrazine, isoquinoline, quinoline, benzofuran, benzimidazole or a derivative thereof). For example, but not by way of limitation, membrane 220 comprises a copolymer comprising a first monomer, e.g., an acrylamide (e.g., an N-alkyl acrylamide), and a second monomer comprising a heterocycle-containing component, e.g., a vinylpyridine, e.g., 4-vinylpyridine. In certain embodiments, the N-alkyl acrylamide is N-isopropylacrylamide.

In certain embodiments, membrane 220 can also overcoat some or all of working electrode 214 and/or counter/reference electrode 216, or the entirety of analyte sensor 200. One or both faces of analyte sensor 200 can be overcoated with membrane 220. Membrane 220 can include one or more polymeric membrane materials having capabilities of limiting analyte flux to active area 218 (i.e., membrane 220 is a mass transport limiting membrane having some permeability for the analyte of interest). The composition and thickness of membrane 220 can vary to promote a desired analyte flux to active area 218, thereby providing a desired signal intensity and stability. Analyte sensor 200 can be operable for assaying an analyte by any of coulometric, amperometric, voltammetric, or potentiometric electrochemical detection techniques.

FIGS. 2B and 2C show diagrams of illustrative three-electrode analyte sensor configurations, which are also compatible for use in the disclosure herein. Three-electrode analyte sensor configurations can be similar to that shown for analyte sensor 200 in FIG. 2A, except for the inclusion of additional electrode 217 in analyte sensors 201 and 202 (FIGS. 2B and 2C). With additional electrode 217, counter/reference electrode 216 can then function as either a counter electrode or a reference electrode, and additional electrode 217 fulfills the other electrode function not otherwise accounted for. Working electrode 214 continues to fulfill its original function. Additional electrode 217 can be disposed upon either working electrode 214 or electrode 216, with a separating layer of dielectric material in between. For example, and not by the way of limitation, as depicted in FIG. 2B, dielectric layers 219*a*, 219*b* and 219*c* separate electrodes 214, 216 and 217 from one another and provide electrical isolation. Alternatively, at least one of electrodes 214, 216 and 217 can be located upon opposite faces of substrate 212, as shown in FIG. 2C. Thus, in certain embodiments, electrode 214 (working electrode) and electrode 216 (counter electrode) can be located upon opposite faces of substrate 212, with electrode 217 (reference electrode) being located upon one of electrodes 214 or 216 and spaced apart therefrom with a dielectric material. Reference material layer 230 (e.g., Ag/AgCl) can be present upon electrode 217, with the location of reference material layer 230 not being limited to that depicted in FIGS. 2B and 2C. As with sensor 200 shown in FIG. 2A, active area 218 in analyte sensors 201 and 202 can include multiple spots or a single spot. In certain embodiments, active area 218 can include a redox mediator disclosed herein.

Additionally, analyte sensors 201 and 202 can be operable for assaying an analyte by any of coulometric, amperometric, voltammetric, or potentiometric electrochemical detection techniques.

Like analyte sensor 200, membrane 220 can also overcoat active area 218, as well as other sensor components, in analyte sensors 201 and 202, thereby serving as a mass transport limiting membrane. In certain embodiments, the additional electrode 217 can be overcoated with membrane 220. Although FIGS. 2B and 2C have depicted electrodes 214, 216 and 217 as being overcoated with membrane 220, it is to be recognized that in certain embodiments only working electrode 214 is overcoated. Moreover, the thickness of membrane 220 at each of electrodes 214, 216 and 217 can be the same or different. As in two-electrode analyte sensor configurations (FIG. 2A), one or both faces of analyte sensors 201 and 202 can be overcoated with membrane 220 in the sensor configurations of FIGS. 2B and 2C, or the entirety of analyte sensors 201 and 202 can be overcoated. Accordingly, the three-electrode sensor configurations shown in FIGS. 2B and 2C should be understood as being non-limiting of the embodiments disclosed herein, with alternative electrode and/or layer configurations remaining within the scope of the present disclosure.

Figure 3A:
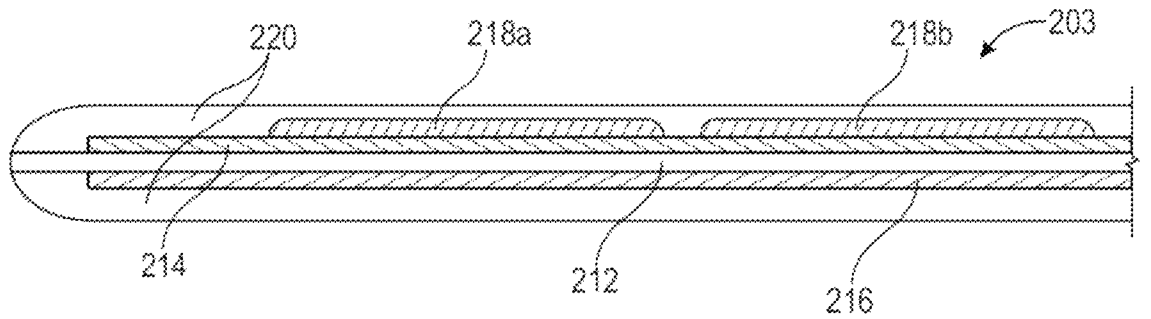
FIGS. 3A-3C show cross-sectional diagrams of analyte sensors including two active areas upon working electrodes.

FIG. 3A shows an illustrative configuration for sensor 203 having a single working electrode with two different active areas disposed thereon. FIG. 3A is similar to FIG. 2A, except for the presence of two active areas upon working electrode 214: first active area 218*a* and second active area 218*b*, which are responsive to the same or different analytes and are laterally spaced apart from one another upon the surface of working electrode 214. Active areas 218*a* and 218*b* can include multiple spots or a single spot configured for detection of each analyte. The composition of membrane 220 can vary or be compositionally the same at active areas 218*a* and 218*b*. First active area 218*a* and second active area 218*b* can be configured to detect their corresponding analytes at working electrode potentials that differ from one another, as discussed further below.

Figure 3B:
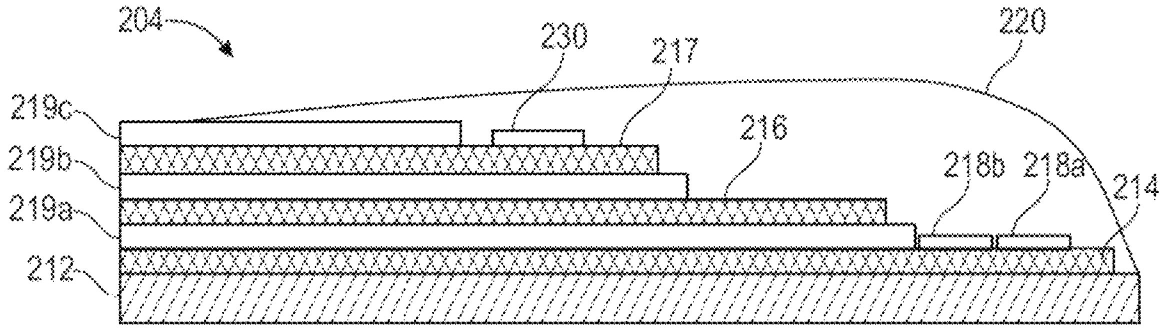
Figure 3C:
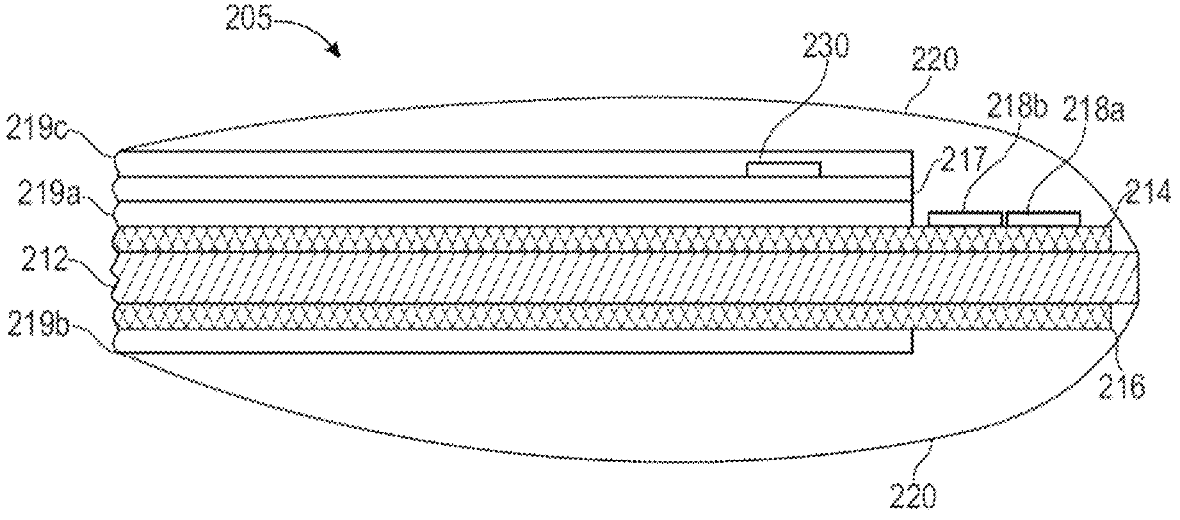

FIGS. 3B and 3C show cross-sectional diagrams of illustrative three-electrode sensor configurations for sensors 204 and 205, respectively, each featuring a single working electrode having first active area 218*a* and second active area 218*b* disposed thereon. FIGS. 3B and 3C are otherwise similar to FIGS. 2B and 2C and can be better understood by reference thereto. As with FIG. 3A, the composition of membrane 220 can vary or be compositionally the same at active areas 218*a* and 218*b*. In certain embodiments, any one of active areas 218*a* and 218*b* can comprise a redox mediator described herein. In certain embodiments, only one of active areas 218*a* and 218*b* can comprise a redox mediator described herein. For example, but not by way of limitation, only active area 218*a* includes a redox mediator described herein. In certain embodiments, only active area 218*b* includes a redox mediator described herein. In certain embodiments, both active areas 218*a* and 218*b* comprise a redox mediator described herein. In certain embodiments, the electron transfer agent present in active area 218*a* is different from the redox mediator present in 218*b*. Alternatively, the electron transfer agent present in active area 218*a* is the same redox mediator present in 218*b*.

Figure 4:
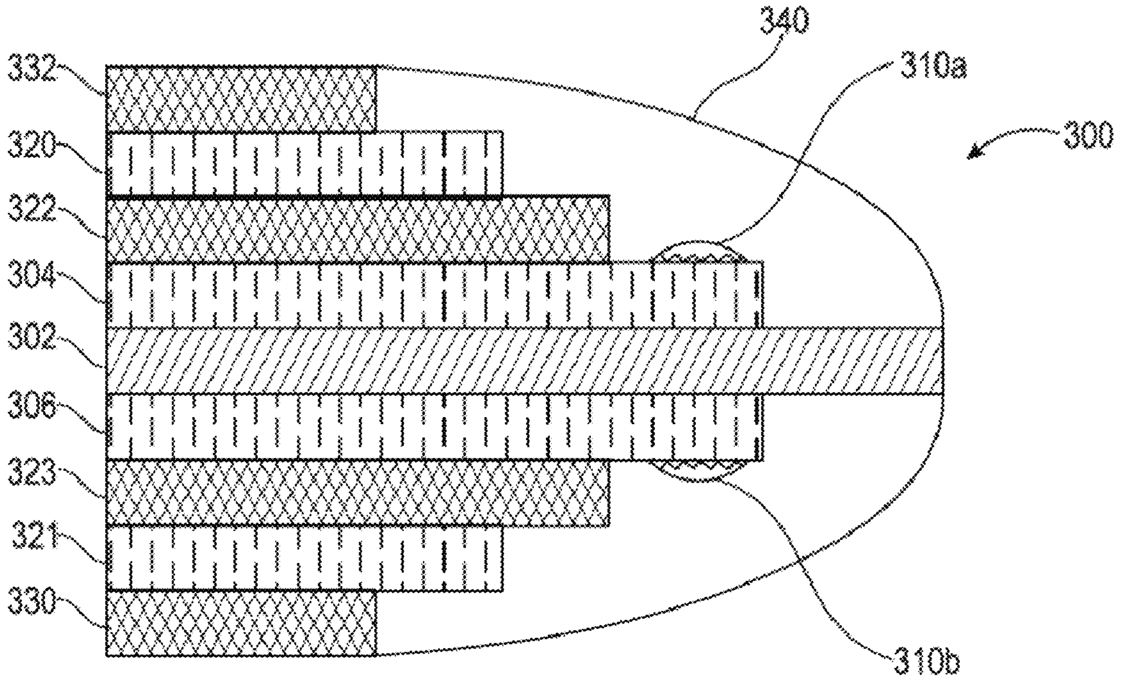
FIG. 4 shows a cross-sectional diagram of analyte sensors including two active areas.
Figure 5A:
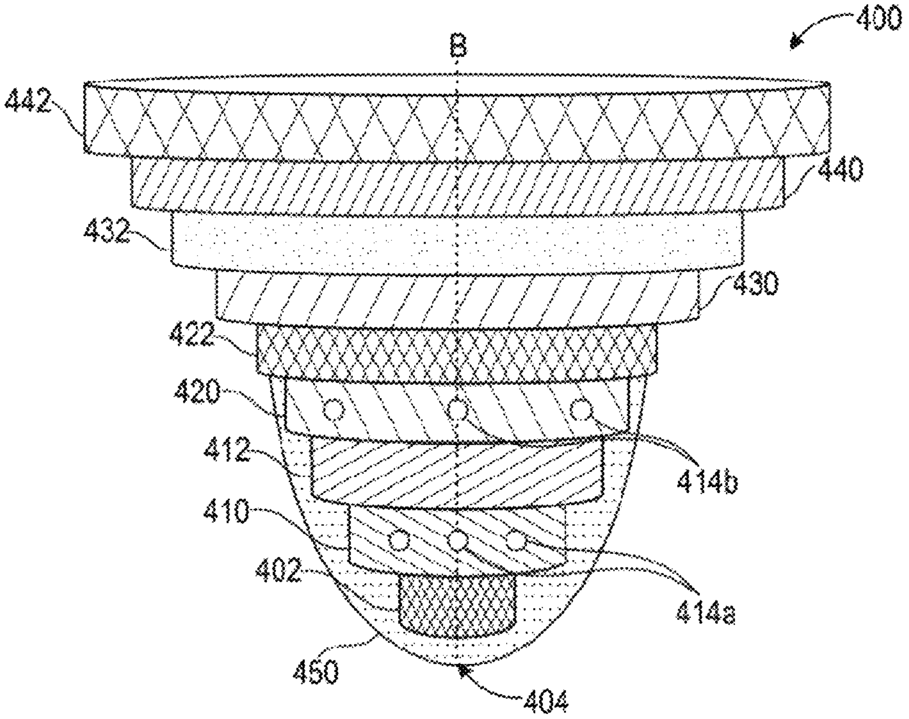
FIGS. 5A-5C show perspective view of analyte sensors including two active areas upon separate working electrodes.
Figure 5B:
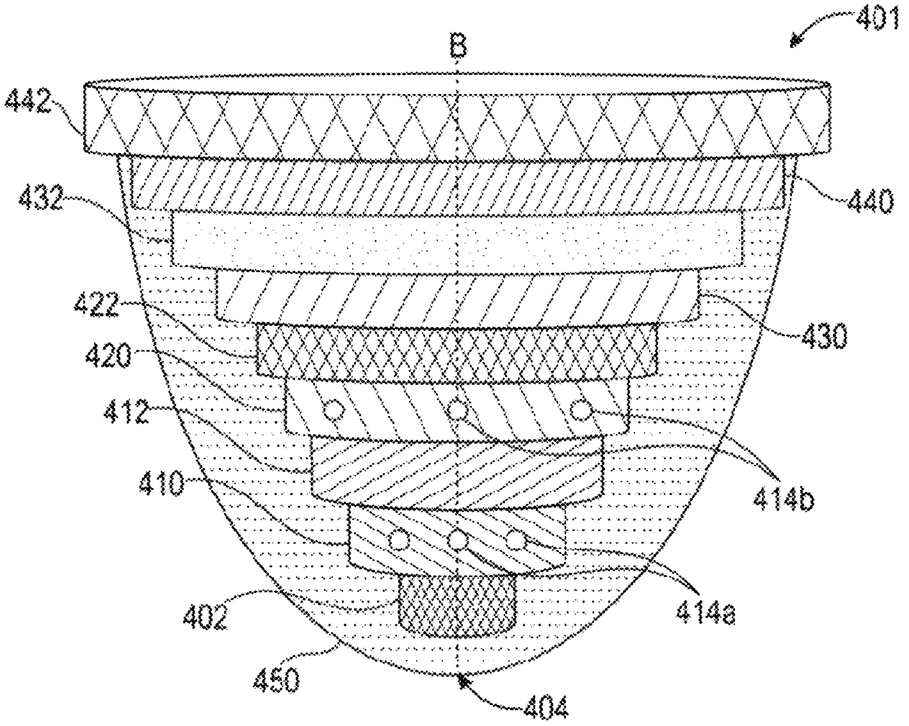
Figure 5C:
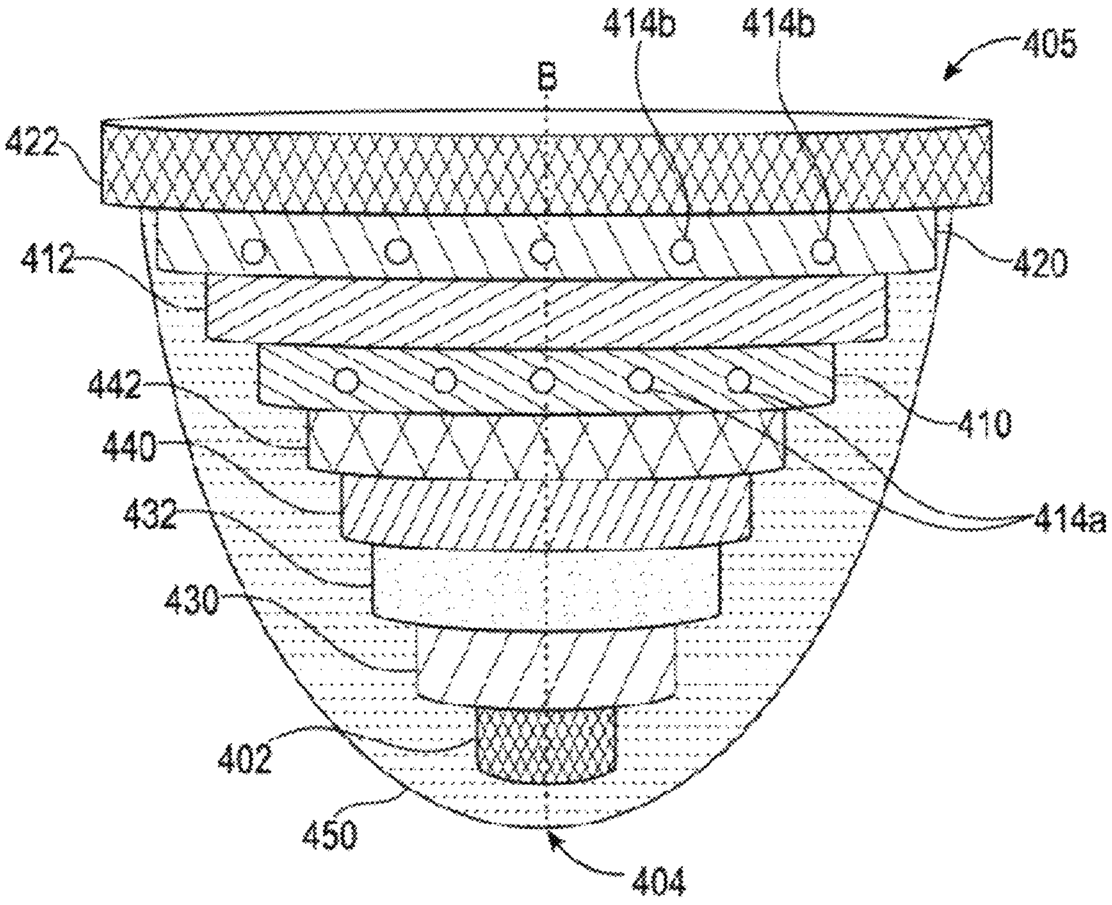

Illustrative sensor configurations having multiple working electrodes, specifically two working electrodes, are described in further detail in reference to FIGS. 4-5C. Although the following description is primarily directed to sensor configurations having two working electrodes, it is to be appreciated that more than two working electrodes can be incorporated through extension of the disclosure herein. Additional working electrodes can be used to impart additional sensing capabilities to the analyte sensors beyond just a first analyte and a second analyte.

FIG. 4 shows a cross-sectional diagram of an illustrative analyte sensor configuration having two working electrodes, a reference electrode and a counter electrode, which is compatible for use in the disclosure herein. As shown, analyte sensor 300 includes working electrodes 304 and 306 disposed upon opposite faces of substrate 302. First active area 310*a* is disposed upon the surface of working electrode 304, and second active area 310*b* is disposed upon the surface of working electrode 306. Counter electrode 320 is electrically isolated from working electrode 304 by dielectric layer 322, and reference electrode 321 is electrically isolated from working electrode 306 by dielectric layer 323. Outer dielectric layers 330 and 332 are positioned upon reference electrode 321 and counter electrode 320, respectively. Membrane 340 can overcoat at least active areas 310*a* and 310*b*, according to various embodiments, with other components of analyte sensor 300 or the entirety of analyte sensor 300. In certain embodiments, membrane 340 comprises a copolymer of the present disclosure. For example, but not by way of limitation, membrane 340 comprises a copolymer comprising a first monomer, e.g., an acrylamide (e.g., an N-alkyl acrylamide), and a second monomer comprising a heterocycle-containing component, e.g., a vinylpyridine, e.g., 4-vinylpyridine. In certain embodiments, the N-alkyl acrylamide is N-isopropylacrylamide.

In certain embodiments, membrane 340 can be continuous but vary compositionally upon active area 310*a* and/or upon active area 310*b* in order to afford different permeability values for differentially regulating the analyte flux at each location. For example, but not by way of limitation, the one or more electrodes can be overcoated with a first membrane portion 340*a* and/or a second membrane portion 340*b*. In certain embodiments, different membrane formulations can be sprayed and/or printed onto the opposing faces of analyte sensor 300. Dip coating techniques can also be appropriate, particularly for depositing at least a portion of a bilayer membrane upon one of active areas 310*a* and 310*b*. In certain embodiments, membrane 340 can be the same or vary compositionally at active areas 310*a* and 310*b*. For example, but not by way of limitation, membrane 340 can include a bilayer overcoating active area 310*a* and be a homogeneous membrane overcoating active area 310*b*, or membrane 340 can include a bilayer overcoating active areas 310*b* and be a homogeneous membrane overcoating active area 310*a*. In certain embodiments, one of the first membrane portion and the second membrane portion can comprise a bilayer membrane and the other of the first membrane portion and the second membrane portion can comprise a single membrane polymer, according to particular embodiments of the present disclosure. In certain embodiments, an analyte sensor can include more than one membrane 340, e.g., two or more membranes. For example, but not by way of limitation, an analyte sensor can include a membrane that overcoats the one or more active areas, e.g., 310*a* and 310*b*, and an additional membrane that overcoats the entire sensor as shown in FIG. 4. In such configurations, a bilayer membrane can be formed over the one or more active areas, e.g., 310*a* and 310*b*. In certain embodiments, the two membranes can have different polymeric compositions. For example, but not by way of limitation, a first membrane can include a copolymer of the present disclosure and the second membrane can include a different polymer. In certain embodiments, any one of active areas 310*a* and 310*b* can comprise an electron transfer agent described herein. In certain embodiments, only one of active areas 310*a* and 310*b* can comprise a redox mediator described herein. For example, but not by way of limitation, only active area 310*a* includes a redox mediator described herein. In certain embodiments, only active area 310*b* includes a redox mediator described herein. In certain embodiments, both active areas 310*a* and 310*b* comprise a redox mediator described herein. In certain embodiments, the redox mediator present in active area 310*a* is different from the electron transfer agent present in 310*b*. Alternatively, the redox mediator present in active area 310*a* is the same electron transfer agent present in 310*b*.

Alternative sensor configurations having multiple working electrodes and differing from the configuration shown in FIG. 4 can feature a counter/reference electrode instead of separate counter and reference electrodes 320, 321, and/or feature layer and/or membrane arrangements varying from those expressly depicted. For example, and not by the way of limitation, the positioning of counter electrode 320 and reference electrode 321 can be reversed from that depicted in FIG. 4. In addition, working electrodes 304 and 306 need not necessarily reside upon opposing faces of substrate 302 in the manner shown in FIG. 4.

Although suitable sensor configurations can feature electrodes that are substantially planar in character, it is to be appreciated that sensor configurations featuring non-planar electrodes can be advantageous and particularly suitable for use in the disclosure herein. In particular, substantially cylindrical electrodes that are disposed concentrically with respect to one another can facilitate deposition of a mass transport limiting membrane, as described hereinbelow. For example, but not by way of limitation, concentric working electrodes that are spaced apart along the length of a sensor tail can facilitate membrane deposition through sequential dip coating operations, in a similar manner to that described above for substantially planar sensor configurations. FIGS. 5A-5C show perspective views of analyte sensors featuring two working electrodes that are disposed concentrically with respect to one another. It is to be appreciated that sensor configurations having a concentric electrode disposition but lacking a second working electrode are also possible in the present disclosure.

FIG. 5A shows a perspective view of an illustrative sensor configuration in which multiple electrodes are substantially cylindrical and are disposed concentrically with respect to one another about a central substrate. As shown, analyte sensor 400 includes central substrate 402 about which all electrodes and dielectric layers are disposed concentrically with respect to one another. In particular, working electrode 410 is disposed upon the surface of central substrate 402, and dielectric layer 412 is disposed upon a portion of working electrode 410 distal to sensor tip 404. Working electrode 420 is disposed upon dielectric layer 412, and dielectric layer 422 is disposed upon a portion of working electrode 420 distal to sensor tip 404. Counter electrode 430 is disposed upon dielectric layer 422, and dielectric layer 432 is disposed upon a portion of counter electrode 430 distal to sensor tip 404. Reference electrode 440 is disposed upon dielectric layer 432, and dielectric layer 442 is disposed upon a portion of reference electrode 440 distal to sensor tip 404. As such, exposed surfaces of working electrode 410, working electrode 420, counter electrode 430, and reference electrode 440 are spaced apart from one another along longitudinal axis B of analyte sensor 400.

Referring still to FIG. 5A, first active areas 414*a* and second active areas 414*b*, which are responsive to different analytes, are disposed upon the exposed surfaces of working electrodes 410 and 420, respectively, thereby allowing contact with a fluid to take place for sensing. Although active areas 414*a* and 414*b* have been depicted as three discrete spots in FIG. 5A, it is to be appreciated that fewer or greater than three spots, including a continuous layer of active area, can be present in alternative sensor configurations. In certain embodiments, any one of active areas 414*a* and 414*b* can comprise an electron transfer agent described herein. In certain embodiments, only one of active areas 414*a* and 414*b* can comprise a redox mediator described herein. For example, but not by way of limitation, only active area 414*a* includes a redox mediator described herein. In certain embodiments, only active area 414*b* includes a redox mediator described herein. In certain embodiments, both active areas 414*a* and 414*b* comprise a redox mediator described herein. In certain embodiments, the redox mediator present in active area 414*a* is different from the electron transfer agent present in 414*b*. Alternatively, the redox mediator present in active area 414*a* is the same electron transfer agent present in 414*b*.

In FIG. 5A, sensor 400 is partially coated with membrane 450 upon working electrodes 410 and 420 and active areas 414*a* and 414*b* disposed thereon. FIG. 5B shows an alternative sensor configuration in which the substantial entirety of sensor 401 is overcoated with membrane 450. Membrane 450 can be the same or vary compositionally at active areas 414*a* and 414*b*. For example, membrane 450 can include a bilayer overcoating active area 414*a* and be a homogeneous membrane overcoating active area 414*b*. In certain embodiments, membrane 450 comprises a copolymer of the present disclosure. For example, but not by way of limitation, membrane 450 comprises a copolymer comprising a first monomer, e.g., an acrylamide (e.g., an N-alkyl acrylamide), and a second monomer comprising a heterocycle-containing component, e.g., a vinylpyridine, e.g., 4-vinylpyridine.

It is to be further appreciated that the positioning of the various electrodes in FIGS. 5A and 5B can differ from that expressly depicted. For example, the positions of counter electrode 430 and reference electrode 440 can be reversed from the depicted configurations in FIGS. 5A and 5B. Similarly, the positions of working electrodes 410 and 420 are not limited to those that are expressly depicted in FIGS. 5A and 5B. FIG. 5C shows an alternative sensor configuration to that shown in FIG. 5B, in which sensor 405 contains counter electrode 430 and reference electrode 440 that are located more proximal to sensor tip 404 and working electrodes 410 and 420 that are located more distal to sensor tip 404. Sensor configurations in which working electrodes 410 and 420 are located more distal to sensor tip 404 can be advantageous by providing a larger surface area for deposition of active areas 414*a* and 414*b* (five discrete sensing spots illustratively shown in FIG. 5C), thereby facilitating an increased signal strength in some cases. Similarly, central substrate 402 can be omitted in any concentric sensor configuration disclosed herein, wherein the innermost electrode can instead support subsequently deposited layers.

In certain embodiments, one or more electrodes of an analyte sensor described herein is a wire electrode, e.g., a permeable wire electrode. In certain embodiments, the sensor tail comprises a working electrode and a reference electrode helically wound around the working electrode. In certain embodiments, an insulator is disposed between the working and reference electrodes. In certain embodiments, portions of the electrodes are exposed to allow reaction of the one or more enzymes with an analyte on the electrode. In certain embodiments, each electrode is formed from a fine wire with a diameter of from about 0.001 inches or less to about 0.010 inches or more. In certain embodiments, the working electrode has a diameter of from about 0.001 inches or less to about 0.010 inches or more, e.g., from about 0.002 inches to about 0.008 inches or from about 0.004 inches to about 0.005 inches. In certain embodiments, an electrode is formed from a plated insulator, a plated wire or bulk electrically conductive material. In certain embodiments, the working electrode comprises a wire formed from a conductive material, such as platinum, platinum-iridium, palladium, graphite, gold, carbon, conductive polymer, alloys or the like. In certain embodiments, the conductive material is a permeable conductive material. In certain embodiments, the electrodes can be formed by a variety of manufacturing techniques (e.g., bulk metal processing, deposition of metal onto a substrate or the like), the electrodes can be formed from plated wire (e.g., platinum on steel wire) or bulk metal (e.g., platinum wire). In certain embodiments, the electrode is formed from tantalum wire, e.g., covered with platinum.

In certain embodiments, the reference electrode, which can function as a reference electrode alone, or as a dual reference and counter electrode, is formed from silver, silver/silver chloride or the like. In certain embodiments, the reference electrode is juxtaposed and/or twisted with or around the working electrode. In certain embodiments, the reference electrode is helically wound around the working electrode. In certain embodiments, the assembly of wires can be coated or adhered together with an insulating material so as to provide an insulating attachment.

In certain embodiments, additional electrodes can be included in the sensor tail. For example, but not by way of limitation, a three-electrode system (a working electrode, a reference electrode and a counter electrode) and/or an additional working electrode (e.g., an electrode for detecting a second analyte). In certain embodiments where the sensor comprises two working electrodes, the two working electrodes can be juxtaposed around which the reference electrode is disposed upon (e.g., helically wound around the two or more working electrodes). In certain embodiments, the two or more working electrodes can extend parallel to each other. In certain embodiments, the reference electrode is coiled around the working electrode and extends towards the distal end (i.e., in vivo end) of the sensor tail. In certain embodiments, the reference electrode extends (e.g., helically) to the exposed region of the working electrode.

In certain embodiments, one or more working electrodes are helically wound around a reference electrode. In certain embodiments where two or more working electrodes are provided, the working electrodes can be formed in a double-, triple-, quad- or greater helix configuration along the length of the sensor tail (for example, surrounding a reference electrode, insulated rod or other support structure). In certain embodiments, the electrodes, e.g., two or more working electrodes, are coaxially formed. For example, but not by way limitation, the electrodes all share the same central axis.

In certain embodiments, the working electrode comprises a tube with a reference electrode disposed or coiled inside, including an insulator therebetween. Alternatively, the reference electrode comprises a tube with a working electrode disposed or coiled inside, including an insulator therebetween. In certain embodiments, a polymer (e.g., insulating) rod is provided, wherein the one or more electrodes (e.g., one or more electrode layers) are disposed upon (e.g., by electro-plating). In certain embodiments, a metallic (e.g., steel or tantalum) rod or wire is provided, coated with an insulating material (described herein), onto which the one or more working and reference electrodes are disposed upon. For example, but not by way of limitation, the present disclosure provides a sensor, e.g., a sensor tail, that comprises one or more tantalum wires, where a conductive material is disposed upon a portion of the one or more tantalum wires to function as a working electrode. In certain embodiments, the platinum-clad tantalum wire is covered with an insulating material, where the insulating material is partially covered with a silver/silver chloride composition to function as a reference and/or counter electrode.

In certain embodiments where an insulator is disposed upon the working electrode (e.g., upon the platinum surface of the electrode), a portion of the insulator can be stripped or otherwise removed to expose the electroactive surface of the working electrode. For example, but not by way of limitation, a portion of the insulator can be removed by hand, excimer lasing, chemical etching, laser ablation, grit-blasting or the like. Alternatively, a portion of the electrode can be masked prior to depositing the insulator to maintain an exposed electroactive surface area. In certain embodiments, the portion of the insulator that is stripped and/or removed can be from about 0.1 mm or less to about 2 mm or more in length, e.g., from about 0.5 mm to about 0.75 mm in length. In certain embodiments, the insulator is a non-conductive polymer. In certain embodiments, the insulator comprises parylene, fluorinated polymers, polyethylene terephthalate, polyvinylpyrrolidone, polyurethane, polyimide and other non-conducting polymers. In certain embodiments, glass or ceramic materials can also be used in the insulator layer. In certain embodiments, the insulator comprises parylene. In certain embodiments, the insulator comprises a polyurethane. In certain embodiments, the insulator comprises a polyurethane and polyvinylpyrrolidone.

Several parts of the sensor, including the active areas, are further described below.

2. Enzymes

An active area of a presently disclosed analyte sensor can be configured for detecting one or more analytes. In certain embodiments, an active area comprises one or more enzymes for detecting an analyte. In certain embodiments, an analyte sensor of the present disclosure can include more than one active area, where each active area is configured to detect the same analyte or different analytes.

In certain embodiments, an active area of a sensor of the present disclosure can comprise one or more enzymes to detect an analyte including, but not limited to, glutamate, glucose, ketones, lactate, oxygen, hemoglobin A1C, albumin, alcohol, alkaline phosphatase, alanine transaminase, aspartate aminotransferase, bilirubin, blood urea nitrogen, calcium, carbon dioxide, chloride, creatinine, hematocrit, aspartate, asparagine, magnesium, oxygen, pH, phosphorus, potassium, sodium, total protein, uric acid, etc. Additional analytes include acetoacetate, fructosamine, amylase, cholesterol, chorionic gonadotropin, creatine kinase (e.g., CK-MB), creatine, DNA, RNA, growth factors, growth hormones, hormones (e.g., thyroid stimulating hormone), steroids, vitamins (e.g., ascorbic acid), neurochemicals (e.g., acetylcholine, norepinephrine and dopamine), sarcosine, prostate-specific antigen, prothrombin, thrombin, troponin, pyruvate, acetaldehyde, ascorbate, galactose, L-xylono-1,4-lactone, glutathione disulfide, hydrogen peroxide, linoleate, 1,3-bisphosphoglycerate, 6-phospho-D-glucono-1,5-lactone, pharmaceutical drugs (e.g., antibiotics (e.g., gentamicin, vancomycin and the like), digitoxin, digoxin, theophylline, insulin and warfarin), drugs of abuse (e.g., analgesics, depressants, stimulants and hallucinogens) and antibodies. In certain embodiments, the analyte is glucose, ketones, glutamate, lactate, creatinine, sarcosine and/or ascorbate. In certain embodiments, the analyte is glucose. In certain embodiments, the analyte is ketones. In certain embodiments, the analyte is glutamate. In certain embodiments, the analyte is lactate. In certain embodiments, the analyte is creatinine. In certain embodiments, the analyte is sarcosine. In certain embodiments, the analyte is alcohol. In certain embodiments, the analyte is ascorbate. In certain embodiments, the analyte is potassium.

In certain embodiments, the enzyme can be an oxidoreductase. In certain embodiments, the oxidoreductase can be an enzyme belonging to enzyme class 1. For example, but not by way of limitation, the enzyme can belong to enzyme class 1.1, e.g., 1.1.1, 1.1.3, or 1.4, e.g., 1.4.3. In certain embodiments, the enzyme can be a NAD(P)+-dependent dehydrogenase. In certain embodiments, the enzyme can be a NAD(P)+-dependent dehydrogenase. In certain embodiments, the enzyme can be a flavin adenine dinucleotide (FAD)-dependent oxidoreductase. In certain embodiments, the enzyme can be a hydrolase. In certain embodiments, the hydrolase can be an enzyme belonging to enzyme class 3. For example, but not by way of limitation, the enzyme can belong to enzyme class 3.5, e.g., 3.5.2 or 3.5.3.

In certain embodiments, an analyte-responsive active area, e.g., present on a working electrode, of an analyte sensor of the present disclosure can include one or more enzymes that can be used to detect glucose. For example, but not by way of limitation, an analyte sensor of the present disclosure can include an active area that comprises one or more enzymes for detecting glucose, e.g., disposed on a first working electrode. In certain embodiments, the analyte sensor can include an active site comprising a glucose oxidase and/or a glucose dehydrogenase for detecting glucose. In certain embodiments, the glucose dehydrogenase can be a pyrroloquinoline quinone (PQQ) or a cofactor-dependent glucose dehydrogenase, e.g., flavin adenine dinucleotide (FAD)-dependent glucose dehydrogenase or nicotinamide adenine dinucleotide (NAD)-dependent glucose dehydrogenase. In certain embodiments, the active area can further include diaphorase. In certain embodiments, the enzyme for detecting glucose is an FAD-dependent glucose oxidase.

In certain embodiments, an analyte-responsive active area, e.g., present on a working electrode, of an analyte sensor of the present disclosure can include one or more enzymes that can be used to detect ketones. For example, but not by way of limitation, an analyte sensor of the present disclosure can include an active area that comprises one or more enzymes, e.g., an enzyme system, for detecting ketones, e.g., disposed on a first working electrode. In certain embodiments, a ketones-responsive active area can include an enzyme system comprising multiple enzymes that are capable of acting in concert to facilitate detection of ketones, as described in U.S. Patent Publication No. 2020/0237275 (the contents of which are incorporated by reference herein in their entirety). In certain embodiments, the analyte sensor can include an active site comprising β-hydroxybutyrate dehydrogenase for detecting ketones. In certain embodiments, the active area can further include diaphorase. In certain embodiments, the analyte sensor can include β-hydroxybutyrate dehydrogenase and diaphorase for detecting ketones.

In certain embodiments, an analyte-responsive active area, e.g., present on a working electrode, of an analyte sensor of the present disclosure can include one or more enzymes that can be used to detect lactate. For example, but not by way of limitation, an analyte sensor of the present disclosure can include an active area that comprises one or more enzymes, e.g., an enzyme system, for detecting lactate, e.g., disposed on a first working electrode. In certain embodiments, a lactate-responsive active area can include an enzyme system comprising multiple enzymes that are capable of acting in concert to facilitate detection of lactate, as described in U.S. Publication No. 2019/0320947 (the contents of which are incorporated by reference herein in their entirety). In certain embodiments, the analyte sensor can include an active site comprising a lactate dehydrogenase and/or a lactate oxidase. In certain embodiments, the active area can further include diaphorase. In certain embodiments, the analyte sensor can include a lactate oxidase and diaphorase.

In certain embodiments, an analyte-responsive active area, e.g., present on a working electrode, of an analyte sensor of the present disclosure can include one or more enzymes that can be used to detect alcohol. For example, but not by way of limitation, an analyte sensor of the present disclosure can include an active area that comprises one or more enzymes, e.g., an enzyme system, for detecting alcohol, e.g., disposed on a first working electrode. In certain embodiments, an ethanol-responsive active area can include an enzyme system comprising multiple enzymes that are capable of acting in concert to facilitate detection of ethanol, as in U.S. Patent Publication No. 2020/0237277 (the contents of which are incorporated by reference herein in their entirety). In certain embodiments, the analyte sensor can include an active site comprising an alcohol dehydrogenase or a ketoreductase.

In certain embodiments, an analyte-responsive active area, e.g., present on a working electrode, of an analyte sensor of the present disclosure can include one or more enzymes that can be used to detect creatinine. For example, but not by way of limitation, an analyte sensor of the present disclosure can include an active area that comprises one or more enzymes, e.g., an enzyme system, for detecting creatinine, e.g., disposed on a first working electrode. In certain embodiments, a creatinine-responsive active area can include an enzyme system comprising multiple enzymes that are capable of acting in concert to facilitate detection of creatinine, e.g., as described in U.S. Patent Publication No. 2020/0241015 (the contents of which are incorporated by reference herein in their entirety). In certain embodiments, the analyte sensor can include an active site comprising an amidohydrolase, creatine amidinohydrolase and/or sarcosine oxidase.

In certain embodiments, an analyte-responsive active area, e.g., present on a working electrode, of an analyte sensor of the present disclosure can include one or more enzymes that can be used to detect glutamate. For example, but not by way of limitation, an analyte sensor of the present disclosure can include an active area that comprises one or more enzymes, e.g., an enzyme system, for detecting glutamate, e.g., disposed on a first working electrode. In certain embodiments, the analyte sensor can include an active site comprising a glutamate dehydrogenase or a glutamate oxidase.

In certain embodiments, a sensor of the present disclosure does not include an analyte-responsive active area comprising an enzyme. In certain embodiments, a sensor of the present disclosure includes a working electrode that does not have an enzyme disposed upon the working electrode or includes an inactive enzyme, e.g., an enzyme that lacks enzymatic activity (e.g., for the analyte of interest), disposed upon the working electrode. In certain embodiments, such a sensor can be used to detect an analyte that can be directly oxidized at the working electrode. For example, but not by way of limitation, a sensor of the present disclosure for detecting ascorbate does not include an enzyme on the working electrode. In certain embodiments, ascorbate is directly oxidized at the working electrode resulting in a signal that correlates to the level of ascorbate in the biological fluid contacting the sensor.

In certain embodiments, a working electrode that does not include an enzyme or includes an inactive enzyme can be used for detecting a background signal. In certain embodiments, the background signal includes a signal that is caused by chemical species other than the analyte of interest present in the sample, e.g., signal caused by an interferent. In certain embodiments, the background signal is a signal caused by one or more interferents. Non-limiting examples of interferents include acetaminophen, ascorbate, ascorbic acid, bilirubin, cholesterol, creatinine, dopamine, ephedrine, ibuprofen, L-dopa, methyldopa, salicylate, tetracycline, tolazamide, tolbutamide, triglycerides, urea and uric acid. In certain embodiments, the background signal can be used to calibrate, filter and/or normalize the signal obtained from a second working electrode (which is configured for detecting an analyte) present on the same analyte sensor. In certain embodiments, the signal from the working electrode that does not have enzyme (or has inactive enzyme) can be subtracted from the signal obtained from a working electrode that is configured to detect an analyte to determine the signal contribution from the analyte.

In certain embodiments, the one or more enzymes can be present in the active area in various amounts. For example, but not by way of limitation, the enzyme can be present in the active area in amount from about 0.05 μg to about 20 μg, e.g., from about 0.1 μg to about 15 μg, from about 0.1 μg to about 10 μg, from about 0.1 μg to about 5 μg, from about 1 μg to about 20 μg, from about 1 μg to about 15 μg, from about 1 μg to about 10 μg or from about 1 μg to about 5 μg. In certain embodiments, the enzyme is present in the active area in an amount from about 0.01% to about 50% by weight of the active area composition. For example, but not by way of limitation, the enzyme can be present in the active area from about 0.1% to about 45% by weight, from about 0.1% to about 40% by weight, from about 0.1% to about 35% by weight, from about 0.1% to about 30% by weight, from about 0.1% to about 25% by weight, from about 0.1% to about 20% by weight, from about 0.1% to about 15% by weight, from about 0.1% to about 10% by weight or from about 1% to about 10% by weight or any values in between based on the weight of the total active area composition.

In certain embodiments, an analyte-responsive active area can further include a stabilizer, e.g., for stabilizing the enzyme. For example, but not by way of limitation, the stabilizer can be an albumin, e.g., a serum albumin. Non-limiting examples of serum albumins include bovine serum albumin and human serum albumin. In certain embodiments, the stabilizer is a human serum albumin. In certain embodiments, the stabilizer is a bovine serum albumin. In certain embodiments, an analyte-responsive active area can include by weight from about 5% to about 50%, e.g., from about 10% to about 50%, from about 15% to about 45%, from about 20% to about 40%, from about 20% to about 35% or from about 20% to about 30% of the stabilizer. In certain embodiments, the analyte-responsive active area can include from about 5% to about 40% of the stabilizing agent by weight. In certain embodiments, the analyte-responsive active area can include from about 5% to about 35% of the stabilizing agent by weight. In certain embodiments, the analyte-responsive active area can include from about 5% to about 30% of the stabilizing agent by weight. In certain embodiments, the analyte-responsive active area can include from about 10% to about 30% of the stabilizing agent by weight. In certain embodiments, the analyte-responsive active area can include from about 15% to about 35% of the stabilizing agent by weight.

In certain embodiments, an analyte-responsive active area, e.g., an analyte-responsive active area, can further include a cofactor or coenzyme for one or more enzymes present in the analyte-responsive active area. In certain embodiments, the cofactor is nicotinamide adenine dinucleotide (NAD) or nicotinamide adenine dinucleotide phosphate (NADP) (referred to herein collectively as "NAD(P)"). In certain embodiments, the coenzyme is FAD. In certain embodiments, the analyte-responsive active area can include from about 1% to about 50% by weight, e.g., from about 10% to about 50%, from about 15% to about 45%, from about 20% to about 40%, from about 20% to about 35%, from about 20% to about 30%, from about 1% to about 20%, from about 1% to about 10% or from about 1% to about 5% by weight, of the cofactor. In certain embodiments, the analyte-responsive active area can include from about 1% to about 20% by weight of the cofactor. In certain embodiments, the analyte-responsive active area can include from about 1% to about 10% by weight of the cofactor. In certain embodiments, the analyte-responsive active area can include from about 15% to about 35% by weight of the cofactor. In certain embodiments, the cofactor, e.g., NAD(P) or FAD, can be physically retained within the analyte-responsive active area. For example, but not by way of limitation, a membrane overcoating the analyte-responsive active area can aid in retaining the cofactor within the analyte-responsive active area while still permitting sufficient inward diffusion of the analyte to permit detection thereof.

In certain embodiments, an analyte-responsive active area is disposed upon a portion of a working electrode. For example, but not by way of limitation, an analyte-responsive active area is disposed upon a portion of the working electrode in a spotted pattern, e.g., two or more spots, three or more spots, four or more spots, five or more spots or six or more spots on the working electrode. In certain embodiments, an analyte-responsive active area is disposed upon a portion of the working electrode in a slotted pattern. In certain embodiments, an analyte-responsive active area is disposed upon the entire length of the working electrode or in a continuous pattern on the working electrode. Non-limiting examples of depositing a plurality of reagent compositions to the surface of an electrode as well as forming a discontinuous or continuous perimeter around each reagent composition is described in U.S. Pat. No. 10,327,677, the disclosure of which is herein incorporated by reference.

In certain embodiments, when more than one active area is present in a sensor, the enzymes can be the same or different. For example, but not by the way of limitation, when the sensor includes a first and a second active area, the enzyme in the first active area and the enzyme in the second active area can be the same. In certain other embodiments, when the sensor includes a first active area and a second active area, the one or more enzymes of the first active area and the one or more enzymes in the second active area can be different, e.g., for detecting different analytes or the same analyte.

In certain embodiments, an analyte sensor can include two working electrodes, e.g., a first active area disposed on a first working electrode and a second active area disposed on a second working electrode. In certain embodiments, an analyte sensor disclosed herein can feature a first analyte-responsive active area and a second active area for detecting an analyte different from the first analyte. For example, but not by way of limitation, such analyte sensors can include a sensor tail with at least a first working electrode and a second working electrode, a first analyte-responsive active area disposed upon a surface of the first working electrode and a second active area, e.g., a second analyte-responsive active area, configured to detect a different analyte disposed upon a surface of the second working electrode. In certain embodiments, when the sensor is configured to detect two or more analytes, detection of each analyte can include applying a potential to each working electrode separately, such that separate signals are obtained from each analyte. The signal obtained from each analyte can then be correlated to an analyte concentration through use of a calibration curve or function, or by employing a lookup table. In certain particular embodiments, correlation of the analyte signal to an analyte concentration can be conducted through use of a processor.

In certain other analyte sensor configurations, the first active area and the second active area can be disposed upon a single working electrode. A first signal can be obtained from the first active area and a second signal containing a signal contribution from both active areas can be obtained. In certain embodiments, a first signal can be obtained from the first active area, e.g., at a low potential, and a second signal containing a signal contribution from both active areas can be obtained at a higher potential. Subtraction of the first signal from the second signal can then allow the signal contribution arising from the second analyte to be determined. The signal contribution from each analyte can then be correlated to an analyte concentration in a similar manner to that described for sensor configurations having multiple working electrodes. In certain embodiments, when a first active area and the second active area, e.g., a second analyte-responsive active area, configured to detect a different analyte are arranged upon a single working electrode in this manner, one of the active areas can be configured such that it can be interrogated separately to facilitate detection of each analyte. For example, either the first analyte-responsive active area or the second active area responsive to the second analyte can produce a signal independently of the other active area.

It is also to be appreciated that the sensitivity (output current) of the analyte sensors toward each analyte can be varied by changing the coverage (area or size) of the active areas, the area ratio of the active areas with respect to one another, the identity, thickness and/or composition of a mass transport limiting membrane overcoating the active areas. Variation of these parameters can be conducted readily by one having ordinary skill in the art once granted the benefit of the disclosure herein.

In certain embodiments, an active area of the present disclosure can have a thickness from about 0.1 μm to about 100 μm, e.g., from about 1 μm to about 90 μm, from about 1 μm to about 80 μm, from about 1 μm to about 70 μm, from about 1 μm to about 60 μm, from about 1 μm to about 50 μm, from about 1 μm to about 40 μm, from about 1 μm to about 30 μm, from about 1 μm to about 20 μm, from about 0.5 μm to about 10 μm, from about 1 μm to about 10 μm, from about 1 μm to about 5 μm or from about 0.1 μm to about 5 μm. In certain embodiments, a series of droplets can be applied atop of one another to achieve the desired thickness of the active area, without substantially increasing the diameter of the applied droplets (i.e., maintaining the desired diameter or range thereof).

3. Redox Mediators

In certain embodiments, an analyte sensor disclosed herein can include an electron transfer agent, e.g., a redox mediator. In certain embodiments, one or more active areas of an analyte sensor disclosed herein can include an electron transfer agent, e.g., a redox mediator.

In certain embodiments, an analyte-responsive active area can include one or more electron transfer agents. For example, but not way of limitation, an analyte sensor of the present disclosure can include a sensor tail with at least a first working electrode and an analyte-responsive active area disposed upon a surface of the first working electrode, where the analyte-responsive active area comprises an electron transfer agent and one or more enzymes responsive to the analyte.

In certain embodiments, an analyte sensor of the present disclosure can include two or more active areas, where each active area includes an electron transfer agent. Alternatively, an analyte sensor of the present disclosure can include two or more active areas, where only one active area includes an electron transfer agent.

Suitable electron transfer agents for use in the analyte sensors of the present disclosure can facilitate conveyance of electrons to the adjacent working electrode after an analyte undergoes an enzymatic oxidation-reduction reaction within the corresponding active area, thereby generating a current that is indicative of the presence of that particular analyte. The amount of current generated is proportional to the quantity of analyte that is present. For example, and not by the way of limitation, the electron transfer agent transfers electrons between the working electrode through an oxidoreductase, e.g., an NAD(P)-dependent oxidoreductase.

In certain embodiments, suitable electron transfer agents can include electroreducible and electrooxidizable ions, complexes or molecules (e.g., quinones) having oxidation-reduction potentials that are a few hundred millivolts above or below the oxidation-reduction potential of the standard calomel electrode (SCE). In certain embodiments, the electron transfer agent can include osmium complexes and other transition metal complexes, such as those described in U.S. Pat. Nos. 6,134,461 and 6,605,200, which are incorporated herein by reference in their entirety. Additional examples of suitable redox mediators include those described in U.S. Pat. Nos. 6,736,957, 7,501,053 and 7,754,093, the disclosures of each of which are also incorporated herein by reference in their entirety. Other examples of suitable electron transfer agents include metal compounds or complexes of ruthenium, osmium, iron (e.g., polyvinylferrocene or hexacyanoferrate), or cobalt, including metallocene compounds thereof, for example. Suitable ligands for the metal complexes can also include, for example, bidentate or higher denticity ligands such as, for example, bipyridine, biimidazole, phenanthroline, or pyridyl(imidazole). Other suitable bidentate ligands can include, for example, amino acids, oxalic acid, acetylacetone, diaminoalkanes, or o-diaminoarenes. Any combination of monodentate, bidentate, tridentate, tetradentate or higher denticity ligands can be present in a metal complex to achieve a full coordination sphere. In certain embodiments, the electron transfer agent is an osmium complex. In certain embodiments, the electron transfer agent is osmium complexed with bidentate ligands. In certain embodiments, the electron transfer agent is osmium complexed with tridentate ligands.

In certain embodiments, electron transfer agents disclosed herein can comprise suitable functionality to promote covalent bonding to a polymer (also referred to herein as a polymeric backbone) within the active areas as discussed further below. For example, but not by way of limitation, an electron transfer agent for use in the present disclosure can include a polymer-bound electron transfer agent, e.g., a redox polymer. Suitable non-limiting examples of polymer-bound electron transfer agents include those described in U.S. Pat. Nos. 8,444,834, 8,268,143 and 6,605,201 and WO 2022/147496, the disclosures of which are incorporated herein by reference in their entirety. In certain embodiments, the electron transfer agent is a bidentate osmium complex bound to a polymer described herein, e.g., a polymeric backbone described in Section II.4 below. In certain embodiments, the polymer-bound electron transfer agent shown in FIG. 3 of U.S. Pat. No. 8,444,834 (referred to as "X7") can be used in a sensor of the present disclosure. In certain embodiments, the electron transfer agent is a tridentate osmium complex bound to a polymer described herein, e.g., a polymeric backbone described in Section II.4 below. In certain embodiments, the polymer-bound electron transfer agents shown in WO 2022/147496 can be used in a sensor of the present disclosure.

4. Polymeric Backbone

In certain embodiments, one or more active sites for promoting analyte detection can include a polymer to which an enzyme and/or redox mediator is covalently bound. Any suitable polymeric backbone can be present in the active area for facilitating detection of an analyte through covalent bonding of the enzyme and/or redox mediator thereto. Non-limiting examples of suitable polymers within the active area include polyvinylpyridines, e.g., poly(4-vinylpyridine), and polyvinylimidazoles, e.g., poly(N-vinylimidazole) and poly(l-vinylimidazole), or a copolymer thereof, for example, in which quaternized pyridine groups serve as a point of attachment for the redox mediator or enzyme thereto. In certain embodiments, the polymer is a poly(4-vinylpyridine)-based polymer or a derivative thereof. Non-limiting polymers for use in the present disclosure are disclosed in U.S. Pat. No. 8,444,834.

Illustrative copolymers that can be suitable for inclusion in the active areas include those containing monomer units such as styrene, acrylamide, methacrylamide, or acrylonitrile, for example. In certain embodiments, the polymer is a copolymer of vinylpyridine and styrene. Additional non-limiting examples of polymers that can be present in the active area include those described in U.S. Pat. No. 6,605,200, incorporated herein by reference in its entirety, such as poly(acrylic acid), styrene/maleic anhydride copolymer, methylvinylether/maleic anhydride copolymer (GANTREZ polymer), poly(vinylbenzylchloride), poly(allylamine), polylysine, poly(4-vinylpyridine) quaternized with carboxypentyl groups, and poly(sodium 4-styrene sulfonate). In certain embodiments where the analyte sensor includes two active sites, the polymer within each active area can be the same or different.

In certain embodiments, an enzyme of a given active area can be immobilized. In certain embodiments, an enzyme of an active area is covalently bonded to the polymer. Alternatively or additionally, the enzyme of an active area can be non-covalently associated with the polymer, such that the non-covalently bonded enzyme is physically retained within the polymer.

In certain particular embodiments, covalent bonding of the one or more enzymes and/or redox mediators to the polymer in a given active area can take place via crosslinking introduced with a suitable crosslinking agent. Suitable crosslinking agents for reaction with free amino groups in the enzyme (e.g., with the free side chain amine in lysine) can include crosslinking agents such as, for example, polyethylene glycol diglycidyl ether (PEGDGE) or other polyepoxides, cyanuric chloride, glutaraldehyde, N-hydroxysuccinimide, imidoesters, epichlorohydrin or derivatized variants thereof. In certain embodiments, the crosslinking agent is PEGDGE, e.g., having an average molecular weight ($M_n$) from about 200 to 1,000, e.g., about 400. In certain embodiments, the crosslinking agent is PEGDGE 400. In certain embodiments, the crosslinking agent can be glutaraldehyde. Suitable crosslinking agents for reaction with free carboxylic acid groups in the enzyme can include, for example, carbodiimides. In certain embodiments, the crosslinking of the enzyme to the polymer is generally intermolecular. In certain embodiments, the crosslinking of the enzyme to the polymer is generally intramolecular.

5. Mass Transport Limiting Membranes

In certain embodiments, the analyte sensors disclosed herein includes a membrane that directly overcoats at least one active area, e.g., a first active area. In certain embodiments, the analyte sensors disclosed herein includes a membrane that directly overcoats at least two active areas, e.g., a first active area and/or a second active area, of the analyte sensor. In certain embodiments, the active area is disposed upon a working electrode. In certain embodiments, the two active areas are disposed upon one working electrode. Alternatively, the two active areas are disposed upon two separate working electrodes. In certain embodiments, the membrane is permeable to the analyte or analytes to be detected in the one or more active areas.

The membranes of the present disclosure include polymeric membranes having a diffusivity which exhibits low temperature sensitivity. In certain embodiments, the membranes have the same diffusivity to a given analyte over a predetermined temperature range. For example, but not by way of limitation, the membranes have the same diffusivity to glucose over a predetermined temperature range. In certain embodiments, the membranes have the same diffusivity to lactose over a predetermined temperature range. In certain embodiments, the rate of analyte diffusion through the membrane depends on the lower critical solution temperature (LCST) of the membrane. At temperatures above the LCST, one or more polymers of the membrane of the present disclosure can be immiscible (e.g., one or more polymers can solidify or crystalize), which can result in a decrease in analyte diffusion through the membrane. In certain embodiments, the decrease in the diffusivity of the flux limiting membrane can offset the increase in diffusivity due to increasing the temperature, such that the flux limiting membrane has the same diffusivity to the analyte over a temperature range of interest.

In certain embodiments, the rate of analyte diffusion through the membranes of the present disclosure changes less than about 10% in response to a change in temperature. In certain embodiments, the rate of analyte diffusion through the membranes of the present disclosure changes less than about 9%, less than about 8%, less than about 7%, less than about 6%, less than about 5%, less than about 4%, less than about 3%, less than about 2% or less than about 1% in response to a change in temperature. In certain embodiments, the rate of analyte diffusion through the membranes of the present disclosure changes less than about 5% in response to a change in temperature. In certain embodiments, the rate of analyte diffusion through the membranes of the present disclosure changes less than about 4% in response to a change in temperature. In certain embodiments, the rate of analyte diffusion through the membranes of the present disclosure changes less than about 3% in response to a change in temperature. In certain embodiments, the rate of analyte diffusion through the membranes of the present disclosure changes less than about 2% in response to a change in temperature. In certain embodiments, the rate of analyte diffusion through the membranes of the present disclosure changes less than about 1% in response to a change in temperature. In certain embodiments, the change in temperature is about 30 degrees, e.g., about 25 degrees or about 20 degrees, e.g., Celsius. In certain embodiments, the change in temperature is a change up to about 30 degrees, e.g., about 25 degrees or about 20 degrees, e.g., Celsius. In certain embodiments, the rate of analyte diffusion through the membranes of the present disclosure changes less than about 5% in response to a change in temperature, e.g., a change of about 20 degrees, e.g., Celsius. In certain embodiments, the rate of analyte diffusion through the membranes of the present disclosure changes less than about 4% in response to a change in temperature, e.g., a change of about 20 degrees, e.g., Celsius. In certain embodiments, the rate of analyte diffusion through the membranes of the present disclosure changes less than about 3% in response to a change in temperature, e.g., a change of about 20 degrees, e.g., Celsius. In certain embodiments, the rate of analyte diffusion through the membranes of the present disclosure changes less than about 2% in response to a change in temperature, e.g., a change of about 20 degrees, e.g., Celsius. In certain embodiments, the rate of analyte diffusion through the membranes of the present disclosure changes less than about 1% in response to a change in temperature, e.g., a change of about 20 degrees, e.g., Celsius.

In certain embodiments, the rate of analyte diffusion through the membranes of the present disclosure changes less than about 10% in response to a change in temperature from about 20° ° C. to about 45° C., e.g., from about 22° C. to about 42° ° C. In certain embodiments, the rate of analyte diffusion through the membranes of the present disclosure changes less than about 9%, less than about 8%, less than about 7%, less than about 6%, less than about 5%, less than about 4%, less than about 3%, less than about 2% or less than about 1% in response to a change in temperature from about 20° C. to about 45° C., e.g., from about 22° C. to about 42° ° C. In certain embodiments, the rate of analyte diffusion through the membranes of the present disclosure changes less than about 5% in response to a change in temperature from about 20° ° C. to about 45° C., e.g., from about 22° C. to about 42° C. In certain embodiments, the rate of analyte diffusion through the membranes of the present disclosure changes less than about 4% in response to a change in temperature from about 20° C. to about 45° C., e.g., from about 22° C. to about 42° C. In certain embodiments, the rate of analyte diffusion through the membranes of the present disclosure changes less than about 3% in response to a change in temperature from about 20° C. to about 45° C., e.g., from about 22° C. to about 42° C. In certain embodiments, the rate of analyte diffusion through the membranes of the present disclosure changes less than about 2% in response to a change in temperature from about 20° C. to about 45° C., e.g., from about 22° C. to about 42° C. In certain embodiments, the rate of analyte diffusion through the membranes of the present disclosure changes less than about 1% in response to a change in temperature from about 20° C. to about 45° C., e.g., from about 22° ° C. to about 42° C.

In certain embodiments, the sensitivity of an analyte sensor that includes a membrane of the present disclosure changes less than about 10% in response to a change in temperature, e.g., a temperature change of about 20 degrees, e.g., Celsius. In certain embodiments, the sensitivity of an analyte sensor that includes a membrane of the present disclosure changes less than about 9%, less than about 8%, less than about 7%, less than about 6%, less than about 5%, less than about 4%, less than about 3%, less than about 2% or less than about 1%. In certain embodiments, the sensitivity of an analyte sensor that includes a membrane of the present disclosure changes less than about 5% in response to a change in temperature. In certain embodiments, the sensitivity of an analyte sensor that includes a membrane of the present disclosure changes less than about 4% in response to a change in temperature. In certain embodiments, the sensitivity of an analyte sensor that includes a membrane of the present disclosure changes less than about 3% in response to a change in temperature. In certain embodiments, the sensitivity of an analyte sensor that includes a membrane of the present disclosure changes less than about 2% in response to a change in temperature. In certain embodiments, the sensitivity of an analyte sensor that includes a membrane of the present disclosure changes less than about 1% in response to a change in temperature.

In certain embodiments, in vivo analyte sensors that include one or more membranes of the present disclosure retain initial sensitivity for an extended period of time. In certain embodiments, the initial sensitivity of an analyte sensor is the sensitivity (e.g., average sensitivity) of the analyte sensor that is observed within the first 6 hours to 24 hours after insertion of the analyte sensor into a subject. In certain embodiments, the initial sensitivity of an analyte sensor is the sensitivity (e.g., average sensitivity) of the analyte sensor observed during the manufacturing (and/or in vitro testing) of the analyte sensor or a batch of analyte sensors. In certain embodiments, even when exposed to changes in temperature, the sensor retains a sensitivity that is at least about 85%, at least about 90%, at least about 95%, at least about 96%, at least about 97%, at least about 98%, at least about 99% or about 100% of the initial sensitivity of the analyte sensor for an extended period of time. In certain embodiments, even when exposed to changes in temperature, the sensor retains a sensitivity that is about 85% to about 100%, e.g., about 90% to about 98%, of the initial sensitivity after 1 day or more, 2 days or more, 3 days or more, 4 days or more, 5 days or more, 6 days or more, 7 days or more, 10 days or more, 14 days or more, 15 days or more, 1 month or more, 2 months or more, 4 months or more, 6 months or more, 9 months or more or 1 year or more. In certain embodiments, even when exposed to changes in temperature, the sensor retains a sensitivity that is about 85% to about 100%, e.g., about 90% to about 98% or about 90% to about 100%, of the initial sensitivity after about 5 days or more. In certain embodiments, even when exposed to changes in temperature, the sensor retains a sensitivity that is about 85% to about 100%, e.g., about 90% to about 98% or about 90% to about 100%, of the initial sensitivity after about 10 days or more. In certain embodiments, even when exposed to changes in temperature, the sensor retains a sensitivity that is about 85% to about 100%, e.g., about 90% to about 98% or about 90% to about 100%, of the initial sensitivity after about 14 days or more. In certain embodiments, even when exposed to changes in temperature, the sensor retains a sensitivity that is about 85% to about 100%, e.g., about 90% to about 98% or about 90% to about 100%, of the initial sensitivity after about 15 days or more. In certain embodiments, in vivo analyte sensors that include one or more membranes of the present disclosure retain initial sensitivity for 15 days or more when exposed to changes in temperature.

In certain embodiments, an analyte sensor of the present disclosure has a sensitivity (e.g., an initial sensitivity) of about 0.1 nA/mM or greater. In certain embodiments, in vivo analyte sensors that include one or more of membranes of the present disclosure have a sensitivity of about 0.1 nA/mM or more, about 0.5 nA/mM or more, about 1 nA/mM or more, about 1.5 nA/mM or more, about 2 nA/mM or more, about 2.5 nA/mM or more, about 5 nA/mM or more, about 7.5 nA/mM or more, about 10 nA/mM or more, about 12.5 nA/mM or more, or about 15 nA/mM or more.

In certain embodiments, the membrane is capable of absorbing from about 5% to about 95% of its weight in water, e.g., from about 5% to about 95%, from about 5% to about 90%, from about 5% to about 85%, from about 10% to about 95%, from about 15% to about 95%, from about 20% to about 95%, from about 25% to about 95%, from about 30% to about 95%, from about 5% to about 30%, from about 5% to about 35%, from about 5% to about 25% or from about 5% to about 20%. In certain embodiments, the amount of water a membrane of the present disclosure absorbs changes less than about 5%, e.g., less than about 1%, in response to a change in temperature.

In certain embodiments, the membranes of the present disclosure that are less temperature sensitive include a copolymer of at least two different types of monomers. In certain embodiments, the copolymers have alternating monomer subunits. In certain other embodiments, the copolymers can be block copolymers, which include two or more homopolymer subunits linked by covalent bonds. A copolymer of the present disclosure includes a block copolymer. In certain embodiments, the copolymer can be a graft polymer. In certain embodiments, the copolymer can be a random copolymer.

In certain embodiments, the membranes of the present disclosure can include a polymer with a heterocycle-containing component, e.g., monomer. In certain embodiments, a copolymer of the present disclosure includes a heterocycle-containing monomer. In certain embodiments, a copolymer of the present disclosure includes a heterocycle. In certain embodiments, a heterocycle refers to a cyclic moiety that include one or more heteroatoms, e.g., nitrogen (N), phosphate (P), oxygen (O), sulfur (S) and silicon (Si). In certain embodiments, the heterocycle comprises one or more nitrogens. In certain embodiments, the heterocycle includes one nitrogen.

In certain embodiments, the heterocycle is selected from the group consisting of furan, thiophene, pyrrole, pyridine, pyrimidine, imidazole, oxadiazole, isoxazole, oxazole, pyrazole, isothiazole, thiazole, pyrazine, isoquinoline, quinoline, benzofuran, benzimidazole or a derivative thereof. In certain particular embodiments, the heterocycle is a furan or a derivative thereof. In certain particular embodiments, the heterocycle is a thiophene or a derivative thereof. In certain particular embodiments, the heterocycle is a pyrrole or a derivative thereof. In certain particular embodiments, the heterocycle is a pyrimidine or a derivative thereof. In certain particular embodiments, the heterocycle is an oxadiazole or a derivative thereof. In certain particular embodiments, the heterocycle is an isoxazole or a derivative thereof. In certain particular embodiments, the heterocycle is an oxazole or a derivative thereof. In certain particular embodiments, the heterocycle is a pyrazole or a derivative thereof. In certain particular embodiments, the heterocycle is an isothiazole or a derivative thereof. In certain particular embodiments, the heterocycle is a thiazole or a derivative thereof. In certain particular embodiments, the heterocycle is a pyrazine or a derivative thereof. In certain particular embodiments, the heterocycle is an isoquinoline or a derivative thereof. In certain particular embodiments, the heterocycle is a quinoline or a derivative thereof. In certain particular embodiments, the heterocycle is a benzofuran or a derivative thereof. In certain particular embodiments, the heterocycle is a benzimidazole or a derivative thereof. In certain particular embodiments, the heterocycle is an imidazole or a derivative thereof. In certain particular embodiments, the heterocycle is a pyridine or a derivative thereof. In certain embodiments, a derivative of a monomer, e.g., a heterocycle, disclosed herein includes forms of the monomer that includes one or more substituents and/or functional groups, e.g., an alkene functional group, e.g., a vinyl functional group.

In certain embodiments, the membranes of the present disclosure can include a polymer, e.g., copolymer, that includes a pyridine component or a derivative thereof. In certain embodiments, the heterocycle-containing monomer is a vinylpyridine or a derivative thereof. Non-limiting examples of vinylpyridines include 2-vinylpyridine and 4-vinylpyridine. In certain embodiments, the heterocycle-containing monomer is 4-vinylpyridine. In certain embodiments, the heterocycle-containing monomer is 2-vinylpyridine.

In certain embodiments, the membranes of the present disclosure can include a polymer, e.g., copolymer, that includes an imidazole component. In certain embodiments, the heterocycle-containing monomer is a vinylimidazole. Non-limiting examples of vinylimidazoles include 1-vinylimidazole (also referred to as N-vinylimidazole), 2-vinylimidazole and 4-vinylimidazole. In certain embodiments, the heterocycle-containing monomer is 1-vinylimidazole. In certain embodiments, the heterocycle-containing monomer is 2-vinylimidazole. In certain embodiments, the heterocycle-containing monomer is 4-vinylimidazole.

In certain embodiments, the polymer, e.g., copolymer, can include a heterocycle-containing component, e.g., monomer, in amount of at least about 3%, at least about 5%, at least about 7%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90% or at least about 95% w/w of the total copolymer. In certain embodiments, the polymer, e.g., copolymer, can include a heterocycle-containing component, e.g., 4-vinylpyridine, in amount of at least about 30% w/w of the total copolymer. In certain embodiments, the polymer, e.g., copolymer, can include a heterocycle-containing component, e.g., 4-vinylpyridine, in amount of at least about 40% w/w of the total copolymer. In certain embodiments, the polymer, e.g., copolymer, can include a heterocycle-containing component, e.g., 4-vinylpyridine, in amount of at least about 50% w/w of the total copolymer. In certain embodiments, the polymer, e.g., copolymer, can include a heterocycle-containing component, e.g., 4-vinylpyridine, in amount of at least about 60% w/w of the total copolymer. In certain embodiments, the polymer, e.g., copolymer, can include a heterocycle-containing component, e.g., 4-vinylpyridine, in amount of at least about 70% w/w of the total copolymer. In certain embodiments, the polymer, e.g., copolymer, can include a heterocycle-containing component, e.g., 4-vinylpyridine, in amount of at least about 80% w/w of the total copolymer. In certain embodiments, the polymer, e.g., copolymer, can include a heterocycle-containing component, e.g., 4-vinylpyridine, in amount from about 30% w/w to about 80% w/w of the total copolymer. In certain embodiments, the polymer, e.g., copolymer, can include a heterocycle-containing component, e.g., 4-vinylpyridine, in amount from about 40% w/w to about 80% w/w of the total copolymer. In certain embodiments, the polymer, e.g., copolymer, can include a heterocycle-containing component, e.g., 4-vinylpyridine, in amount from about 40% w/w to about 70% w/w of the total copolymer. In certain embodiments, the polymer, e.g., copolymer, can include a heterocycle-containing component, e.g., 4-vinylpyridine, in amount from about 30% w/w to about 65% w/w of the total copolymer. In certain embodiments, the polymer, e.g., copolymer, can include a heterocycle-containing component, e.g., 4-vinylpyridine, in amount from about 10% w/w to about 50% w/w of the total copolymer. In certain embodiments, the polymer, e.g., copolymer, can include a heterocycle-containing component, e.g., 4-vinylpyridine, in amount from about 20% w/w to about 50% w/w of the total copolymer. In certain embodiments, the polymer, e.g., copolymer, can include a heterocycle-containing component, e.g., 4-vinylpyridine, in amount from about 30% w/w to about 50% w/w of the total copolymer. In certain embodiments, the polymer, e.g., copolymer, can include a heterocycle-containing component, e.g., 4-vinylpyridine, in amount from about 35% w/w to about 45% w/w of the total copolymer. In certain embodiments, the polymer, e.g., copolymer, can include a heterocycle-containing component, e.g., 4-vinylpyridine, in amount of about 40% w/w of the total copolymer.

In certain embodiments, the polymer, e.g., copolymer, can include a heterocycle-containing component, e.g., monomer, in a mole percent (mer %) of at least about 3%, at least about 5%, at least about 7%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90% or at least about 95%. In certain embodiments, the polymer, e.g., copolymer, can include a heterocycle-containing component, e.g., monomer, in a mole percent of at least about 80%. In certain embodiments, the polymer, e.g., copolymer, can include a heterocycle-containing component, e.g., monomer, in a mole percent of at least about 70%. In certain embodiments, the polymer, e.g., copolymer, can include a heterocycle-containing component, e.g., monomer, in a mole percent of at least about 65%. In certain embodiments, the polymer, e.g., copolymer, can include a heterocycle-containing component, e.g., monomer, in a mole percent of at least about 60%. In certain embodiments, the polymer, e.g., copolymer, can include a heterocycle-containing component, e.g., monomer, in a mole percent of at least about 55%. In certain embodiments, the polymer, e.g., copolymer, can include a heterocycle-containing component, e.g., monomer, e.g., 4-vinylpyridine, in a mole percent of at least about 50%. In certain embodiments, the polymer, e.g., copolymer, can include a heterocycle-containing component, e.g., monomer, in a mole percent of at least about 45%. In certain embodiments, the polymer, e.g., copolymer, can include a heterocycle-containing component, e.g., monomer, e.g., 4-vinylpyridine, in a mole percent of at least about 40%. In certain embodiments, the polymer, e.g., copolymer, can include a heterocycle-containing component, e.g., monomer, e.g., 4-vinylpyridine, in a mole percent of at least about 35%. In certain embodiments, the polymer, e.g., copolymer, can include a heterocycle-containing component, e.g., monomer, e.g., 4-vinylpyridine, in a mole percent of at least about 30%. In certain embodiments, the polymer, e.g., copolymer, can include a heterocycle-containing component, e.g., monomer, e.g., 4-vinylpyridine, in a mole percent of at least about 25%. In certain embodiments, the polymer, e.g., copolymer, can include a heterocycle-containing component, e.g., 4-vinylpyridine, in a mole percent from about 30% to about 80% of the total copolymer. In certain embodiments, the polymer, e.g., copolymer, can include a heterocycle-containing component, e.g., 4-vinylpyridine, in a mole percent from about 40% to about 80% of the total copolymer. In certain embodiments, the polymer, e.g., copolymer, can include a heterocycle-containing component, e.g., 4-vinylpyridine, in a mole percent from about 40% to about 70% of the total copolymer. In certain embodiments, the polymer, e.g., copolymer, can include a heterocycle-containing component, e.g., 4-vinylpyridine, in a mole percent from about 30% to about 65% of the total copolymer. In certain embodiments, the polymer, e.g., copolymer, can include a heterocycle-containing component, e.g., 4-vinylpyridine, in a mole percent from about 10% to about 50% of the total copolymer. In certain embodiments, the polymer, e.g., copolymer, can include a heterocycle-containing component, e.g., 4-vinylpyridine, in a mole percent from about 20% to about 50% of the total copolymer. In certain embodiments, the polymer, e.g., copolymer, can include a heterocycle-containing component, e.g., 4-vinylpyridine, in a mole percent from about 30% to about 50% of the total copolymer. In certain embodiments, the polymer, e.g., copolymer, can include a heterocycle-containing component, e.g., 4-vinylpyridine, in a mole percent from about 35% to about 45% of the total copolymer. In certain embodiments, the polymer, e.g., copolymer, can include a heterocycle-containing component, e.g., 4-vinylpyridine, in a mole percent of about 40% of the total copolymer.

In certain embodiments, the membrane of the present disclosure can include an acrylamide component, e.g., monomer. For example, but not by way of limitation, the polymer, e.g., copolymer, of the present disclosure can include an acrylamide component, e.g., monomer. In certain embodiments, the acrylamide can be an N-alkyl acrylamide. In certain embodiments, the alkyl group is a $C_1$-$C_6$ straight or branched alkyl group or a $C_3$-$C_6$ cycloalkyl group. In certain embodiments, the alkyl group is a $C_1$-$C_6$ straight alkyl group (e.g., a $C_1$-$C_6$ straight-chain alkyl group). Non-limiting examples of $C_1$-$C_6$ straight alkyl groups include methyl, ethyl, propyl, butyl, pentyl and hexyl. In certain embodiments, the $C_1$-$C_6$ straight alkyl group include a methyl group. In certain embodiments, the alkyl group is a $C_3$-$C_6$ cycloalkyl group. Non-limiting examples of $C_3$-$C_6$ cycloalkyl group include cyclopropane, cyclobutene, cyclopentane, cyclohexane and the like. In certain embodiments, the alkyl group is a branched alkyl group. Non-limiting examples of branched alkyl groups include isopropyl, isobutyl, sec-butyl, tert-butyl, tert-pentyl, neopentyl, isopentyl, sec-pentyl, 3-pentyl, sec-isopentyl, active pentyl, isohexyl, tert-hexyl, neohexyl, sec-hexyl and the like. In certain embodiments, the branched alkyl group is an isopentyl group. In certain embodiments, the branched alkyl group is a tert-butyl group.

In certain embodiments, the N-alkyl acrylamide is methylacrylamide, N-ethylacrylamide, N-isopropylacrylamide or N-tert-butylacrylamide. In certain embodiments, the copolymer included in a membrane of the present disclosure includes methylacrylamide. In certain embodiments, the copolymer included in a membrane of the present disclosure includes N-ethylacrylamide. In certain embodiments, the copolymer included in a membrane of the present disclosure includes N-tert-butylacrylamide. In certain embodiments, the copolymer included in a membrane of the present disclosure includes N-isopropylacrylamide.

In certain embodiments, the polymer, e.g., copolymer, can include an acrylamide component, e.g., monomer, in amount of at least about 3%, at least about 5%, at least about 7%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90% or at least about 95% w/w of the total copolymer. In certain embodiments, the acrylamide component is an N-alkyl acrylamide. In certain embodiment, the N-alkyl acrylamide is N-isopropylacrylamide. In certain embodiments, the polymer, e.g., copolymer, can include an acrylamide component, e.g., an N-alkyl acrylamide, in amount of at least about 20% w/w of the total copolymer. In certain embodiments, the polymer, e.g., copolymer, can include an acrylamide component, e.g., an N-alkyl acrylamide, in amount of at least about 25% w/w of the total copolymer. In certain embodiments, the polymer, e.g., copolymer, can include an acrylamide component, e.g., an N-alkyl acrylamide, in amount of at least about 30% w/w of the total copolymer. In certain embodiments, the polymer, e.g., copolymer, can include an acrylamide component, e.g., an N-alkyl acrylamide, in amount of at least about 35% w/w of the total copolymer. In certain embodiments, the polymer, e.g., copolymer, can include an acrylamide component, e.g., an N-alkyl acrylamide, in amount of at least about 40% w/w of the total copolymer. In certain embodiments, the polymer, e.g., copolymer, can include an acrylamide component, e.g., an N-alkyl acrylamide, in amount of at least about 45% w/w of the total copolymer. In certain embodiments, the polymer, e.g., copolymer, can include an acrylamide component, e.g., an N-alkyl acrylamide, in amount of at least about 50% w/w of the total copolymer. In certain embodiments, the polymer, e.g., copolymer, can include an acrylamide component, e.g., an N-alkyl acrylamide, in amount of at least about 55% w/w of the total copolymer. In certain embodiments, the polymer, e.g., copolymer, can include an acrylamide component, e.g., an N-alkyl acrylamide, in amount of at least about 60% w/w of the total copolymer. In certain embodiments, the polymer, e.g., copolymer, can include an acrylamide component, e.g., an N-alkyl acrylamide, in amount of at least about 65% w/w of the total copolymer. In certain embodiments, the polymer, e.g., copolymer, can include an acrylamide component, e.g., an N-alkyl acrylamide, in amount of at least about 70% w/w of the total copolymer. In certain embodiments, the polymer, e.g., copolymer, can include an acrylamide component, e.g., an N-alkyl acrylamide, in amount of at least about 75% w/w of the total copolymer. In certain embodiments, the polymer, e.g., copolymer, can include an acrylamide component, e.g., an N-alkyl acrylamide, in amount of at least about 80% w/w of the total copolymer. In certain embodiments, the polymer, e.g., copolymer, includes an acrylamide component, e.g., an N-alkyl acrylamide, in amount of about 50% w/w of the total copolymer. In certain embodiments, the polymer, e.g., copolymer, includes an acrylamide component, e.g., an N-alkyl acrylamide, in amount of about 55% w/w of the total copolymer. In certain embodiments, the polymer, e.g., copolymer, includes an acrylamide component, e.g., an N-alkyl acrylamide, in amount of about 60% w/w of the total copolymer. In certain embodiments, the polymer, e.g., copolymer, can include an acrylamide component, e.g., an N-alkyl acrylamide, in amount from about 10% w/w to about 80% w/w of the total copolymer. In certain embodiments, the polymer, e.g., copolymer, can include an acrylamide component, e.g., an N-alkyl acrylamide, in amount from about 20% w/w to about 80% w/w of the total copolymer. In certain embodiments, the polymer, e.g., copolymer, can include an acrylamide component, e.g., an N-alkyl acrylamide, in amount from about 20% w/w to about 70% w/w of the total copolymer. In certain embodiments, the polymer, e.g., copolymer, can include an acrylamide component, e.g., an N-alkyl acrylamide, in amount from about 30% w/w to about 80% w/w of the total copolymer. In certain embodiments, the polymer, e.g., copolymer, can include an acrylamide component, e.g., an N-alkyl acrylamide, in amount from about 40% w/w to about 80% w/w of the total copolymer. In certain embodiments, the polymer, e.g., copolymer, can include an acrylamide component, e.g., an N-alkyl acrylamide, in amount from about 50% w/w to about 80% w/w of the total copolymer. In certain embodiments, the polymer, e.g., copolymer, can include an acrylamide component, e.g., an N-alkyl acrylamide, in amount from about 50% w/w to about 70% w/w of the total copolymer. In certain embodiments, the polymer, e.g., copolymer, can include an acrylamide component, e.g., an N-alkyl acrylamide, in amount from about 30% w/w to about 60% w/w of the total copolymer. In certain embodiments, the polymer, e.g., copolymer, can include an acrylamide component, e.g., an N-alkyl acrylamide, in amount from about 30% w/w to about 50% w/w of the total copolymer. In certain embodiments, the polymer, e.g., copolymer, can include an acrylamide component, e.g., an N-alkyl acrylamide, in amount from about 30% w/w to about 65% w/w of the total copolymer. In certain embodiments, the polymer, e.g., copolymer, can include an acrylamide component, e.g., an N-alkyl acrylamide, in amount from about 55% w/w to about 65% w/w of the total copolymer.

In certain embodiments, the polymer, e.g., copolymer, can include an N-isopropylacrylamide component, e.g., monomer, in amount of at least about 3%, at least about 5%, at least about 7%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90% or at least about 95% w/w of the total copolymer. In certain embodiments, the polymer, e.g., copolymer, can include N-isopropylacrylamide in amount of at least about 20% w/w of the total copolymer. In certain embodiments, the polymer, e.g., copolymer, can include N-isopropylacrylamide in amount of at least about 25% w/w of the total copolymer. In certain embodiments, the polymer, e.g., copolymer, can include N-isopropylacrylamide in amount of at least about 30% w/w of the total copolymer. In certain embodiments, the polymer, e.g., copolymer, can include N-isopropylacrylamide in amount of at least about 35% w/w of the total copolymer. In certain embodiments, the polymer, e.g., copolymer, can include N-isopropylacrylamide in amount of at least about 40% w/w of the total copolymer. In certain embodiments, the polymer, e.g., copolymer, can include N-isopropylacrylamide in amount of at least about 45% w/w of the total copolymer. In certain embodiments, the polymer, e.g., copolymer, can include N-isopropylacrylamide in amount of at least about 50% w/w of the total copolymer. In certain embodiments, the polymer, e.g., copolymer, can include N-isopropylacrylamide in amount of at least about 55% w/w of the total copolymer. In certain embodiments, the polymer, e.g., copolymer, can include N-isopropylacrylamide in amount of at least about 60% w/w of the total copolymer. In certain embodiments, the polymer, e.g., copolymer, can include N-isopropylacrylamide in amount of at least about 65% w/w of the total copolymer. In certain embodiments, the polymer, e.g., copolymer, can include N-isopropylacrylamide in amount of at least about 70% w/w of the total copolymer. In certain embodiments, the polymer, e.g., copolymer, can include N-isopropylacrylamide in amount of at least about 75% w/w of the total copolymer. In certain embodiments, the polymer, e.g., copolymer, can include N-isopropylacrylamide in amount of at least about 80% w/w of the total copolymer. In certain embodiments, the polymer, e.g., copolymer, includes N-isopropylacrylamide in amount of about 50% w/w of the total copolymer. In certain embodiments, the polymer, e.g., copolymer, includes N-isopropylacrylamide in amount of about 55% w/w of the total copolymer. In certain embodiments, the polymer, e.g., copolymer, includes N-isopropylacrylamide in amount of about 60% w/w of the total copolymer. In certain embodiments, the polymer, e.g., copolymer, can include N-isopropylacrylamide in amount from about 10% w/w to about 80% w/w of the total copolymer. In certain embodiments, the polymer, e.g., copolymer, can include N-isopropylacrylamide in amount from about 20% w/w to about 80% w/w of the total copolymer. In certain embodiments, the polymer, e.g., copolymer, can include N-isopropylacrylamide in amount from about 30% w/w to about 80% w/w of the total copolymer. In certain embodiments, the polymer, e.g., copolymer, can include N-isopropylacrylamide in amount from about 40% w/w to about 80% w/w of the total copolymer. In certain embodiments, the polymer, e.g., copolymer, can include N-isopropylacrylamide in amount from about 40% w/w to about 70% w/w of the total copolymer. In certain embodiments, the polymer, e.g., copolymer, can include N-isopropylacrylamide in amount from about 50% w/w to about 80% w/w of the total copolymer. In certain embodiments, the polymer, e.g., copolymer, can include N-isopropylacrylamide in amount from about 50% w/w to about 70% w/w of the total copolymer. In certain embodiments, the polymer, e.g., copolymer, can include N-isopropylacrylamide in amount from about 30% w/w to about 50% w/w of the total copolymer. In certain embodiments, the polymer, e.g., copolymer, can include N-isopropylacrylamide in amount from about 30% w/w to about 65% w/w of the total copolymer. In certain embodiments, the polymer, e.g., copolymer, can include N-isopropylacrylamide in amount from about 55% w/w to about 65% w/w of the total copolymer.

In certain embodiments, the polymer, e.g., copolymer, can include an acrylamide component, e.g., monomer, in a mole percent of at least about 3%, at least about 5%, at least about 7%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90% or at least about 95%. In certain embodiments, the acrylamide component is an N-alkyl acrylamide. In certain embodiment, the N-alkyl acrylamide is N-isopropylacrylamide. In certain embodiments, the polymer, e.g., copolymer, can include an acrylamide component, e.g., an N-alkyl acrylamide, in a mole percent of at least about 20%. As shown in Table 2, membranes that include a copolymer comprising an acrylamide (e.g., an N-alkyl acrylamide) at a mole percent of at least 20% results in a membrane that is less temperature-sensitive (e.g., as compared to a control membrane). In certain embodiments, the polymer, e.g., copolymer, can include an acrylamide component, e.g., an N-alkyl acrylamide, in a mole percent of at least about 25%. In certain embodiments, the polymer, e.g., copolymer, can include an acrylamide component, e.g., an N-alkyl acrylamide, in a mole percent of at least about 30%. In certain embodiments, the polymer, e.g., copolymer, can include an acrylamide component, e.g., an N-alkyl acrylamide, in a mole percent of at least about 35%. In certain embodiments, the polymer, e.g., copolymer, can include an acrylamide component, e.g., an N-alkyl acrylamide, in a mole percent of at least about 40%. In certain embodiments, the polymer, e.g., copolymer, can include an acrylamide component, e.g., an N-alkyl acrylamide, in a mole percent of at least about 45%. In certain embodiments, the polymer, e.g., copolymer, can include an acrylamide component, e.g., an N-alkyl acrylamide, in a mole percent of at least about 50%. In certain embodiments, the polymer, e.g., copolymer, can include an acrylamide component, e.g., an N-alkyl acrylamide, in a mole percent of at least about 55%. In certain embodiments, the polymer, e.g., copolymer, can include an acrylamide component, e.g., an N-alkyl acrylamide, in a mole percent of at least about 60%. In certain embodiments, the polymer, e.g., copolymer, can include an acrylamide component, e.g., an N-alkyl acrylamide, in a mole percent of at least about 65%. In certain embodiments, the polymer, e.g., copolymer, can include an acrylamide component, e.g., an N-alkyl acrylamide, in a mole percent of at least about 70%. In certain embodiments, the polymer, e.g., copolymer, can include an acrylamide component, e.g., an N-alkyl acrylamide, in a mole percent of at least about 75%. In certain embodiments, the polymer, e.g., copolymer, can include an acrylamide component, e.g., an N-alkyl acrylamide, in a mole percent of at least about 80%. In certain embodiments, the polymer, e.g., copolymer, includes an acrylamide component, e.g., an N-alkyl acrylamide, in a mole percent of about 50%. As shown in Table 2, membranes that include a copolymer comprising an acrylamide (e.g., an N-alkyl acrylamide) at a mole percent of at least 50% results in a membrane that is significantly less temperature-sensitive (e.g., as compared to a control membrane). In certain embodiments, the polymer, e.g., copolymer, can include an acrylamide component, e.g., an N-alkyl acrylamide, in a mole percent of at least about 55%. In certain embodiments, the polymer, e.g., copolymer, can include an acrylamide component, e.g., an N-alkyl acrylamide, in a mole percent of at least about 60%. In certain embodiments, the polymer, e.g., copolymer, can include an acrylamide component, e.g., an N-alkyl acrylamide, in a mole percent of at least about 65%. In certain embodiments, the polymer, e.g., copolymer, can include an acrylamide component, e.g., an N-alkyl acrylamide, in a mole percent from about 10% to about 80% of the total copolymer. In certain embodiments, the polymer, e.g., copolymer, can include an acrylamide component, e.g., an N-alkyl acrylamide, in a mole percent from about 20% to about 80% of the total copolymer. In certain embodiments, the polymer, e.g., copolymer, can include an acrylamide component, e.g., an N-alkyl acrylamide, in a mole percent from about 30% w/w to about 80% w/w of the total copolymer. In certain embodiments, the polymer, e.g., copolymer, can include an acrylamide component, e.g., an N-alkyl acrylamide, in amount from about 40% w/w to about 80% w/w of the total copolymer. In certain embodiments, the polymer, e.g., copolymer, can include an acrylamide component, e.g., an N-alkyl acrylamide, in a mole percent from about 50% to about 80% of the total copolymer. In certain embodiments, the polymer, e.g., copolymer, can include an acrylamide component, e.g., an N-alkyl acrylamide, in a mole percent from about 20% to about 70% of the total copolymer. In certain embodiments, the polymer, e.g., copolymer, can include an acrylamide component, e.g., an N-alkyl acrylamide, in a mole percent from about 30% to about 70% of the total copolymer. In certain embodiments, the polymer, e.g., copolymer, can include an acrylamide component, e.g., an N-alkyl acrylamide, in a mole percent from about 40% to about 70% of the total copolymer. In certain embodiments, the polymer, e.g., copolymer, can include an acrylamide component, e.g., an N-alkyl acrylamide, in a mole percent from about 50% to about 70% of the total copolymer. In certain embodiments, the polymer, e.g., copolymer, can include an acrylamide component, e.g., an N-alkyl acrylamide, in a mole percent from about 30% to about 50% of the total copolymer. In certain embodiments, the polymer, e.g., copolymer, can include an acrylamide component, e.g., an N-alkyl acrylamide, in a mole percent from about 30% to about 60% of the total copolymer. In certain embodiments, the polymer, e.g., copolymer, can include an acrylamide component, e.g., an N-alkyl acrylamide, in a mole percent from about 30% to about 65% of the total copolymer. In certain embodiments, the polymer, e.g., copolymer, can include an acrylamide component, e.g., an N-alkyl acrylamide, in a mole percent from about 55% to about 65% of the total copolymer. In certain embodiments, the polymer, e.g., copolymer, can include an acrylamide component, e.g., an N-alkyl acrylamide, in a mole percent of about 60% of the total copolymer.

In certain embodiments, the polymer, e.g., copolymer, can include N-isopropylacrylamide in a mole percent of at least about 3%, at least about 5%, at least about 7%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90% or at least about 95%. In certain embodiments, the polymer, e.g., copolymer, can include N-isopropylacrylamide in a mole percent of at least about 20%. In certain embodiments, the polymer, e.g., copolymer, can include N-isopropylacrylamide in a mole percent of at least about 25%. In certain embodiments, the polymer, e.g., copolymer, can include N-isopropylacrylamide in a mole percent of at least about 30%. In certain embodiments, the polymer, e.g., copolymer, can include N-isopropylacrylamide in a mole percent of at least about 35%. In certain embodiments, the polymer, e.g., copolymer, can include N-isopropylacrylamide in a mole percent of at least about 40%. In certain embodiments, the polymer, e.g., copolymer, can include N-isopropylacrylamide in a mole percent of at least about 45%. In certain embodiments, the polymer, e.g., copolymer, can include N-isopropylacrylamide in a mole percent of at least about 50%. In certain embodiments, the polymer, e.g., copolymer, can include N-isopropylacrylamide in a mole percent of at least about 55%. In certain embodiments, the polymer, e.g., copolymer, can include N-isopropylacrylamide in a mole percent of at least about 60%. In certain embodiments, the polymer, e.g., copolymer, can include N-isopropylacrylamide in a mole percent of at least about 65%. In certain embodiments, the polymer, e.g., copolymer, can include N-isopropylacrylamide in a mole percent of at least about 70%. In certain embodiments, the polymer, e.g., copolymer, can include N-isopropylacrylamide in a mole percent of at least about 75%. In certain embodiments, the polymer, e.g., copolymer, can include N-isopropylacrylamide in a mole percent of at least about 80%. In certain embodiments, the polymer, e.g., copolymer, can include N-isopropylacrylamide in a mole percent from about 10% to about 80% of the total copolymer. In certain embodiments, the polymer, e.g., copolymer, can include N-isopropylacrylamide in a mole percent from about 20% to about 80% of the total copolymer. In certain embodiments, the polymer, e.g., copolymer, can include N-isopropylacrylamide in a mole percent from about 30% w/w to about 80% w/w of the total copolymer. In certain embodiments, the polymer, e.g., copolymer, can include N-isopropylacrylamide in amount from about 40% w/w to about 80% w/w of the total copolymer. In certain embodiments, the polymer, e.g., copolymer, can include N-isopropylacrylamide in a mole percent from about 50% to about 80% of the total copolymer. In certain embodiments, the polymer, e.g., copolymer, can include N-isopropylacrylamide in amount from about 30% w/w to about 50% w/w of the total copolymer. In certain embodiments, the polymer, e.g., copolymer, can include N-isopropylacrylamide in amount from about 30% w/w to about 60% w/w of the total copolymer. In certain embodiments, the polymer, e.g., copolymer, can include N-isopropylacrylamide in amount from about 20% w/w to about 70% w/w of the total copolymer. In certain embodiments, the polymer, e.g., copolymer, can include N-isopropylacrylamide in amount from about 30% w/w to about 70% w/w of the total copolymer. In certain embodiments, the polymer, e.g., copolymer, can include N-isopropylacrylamide in amount from about 40% w/w to about 70% w/w of the total copolymer. In certain embodiments, the polymer, e.g., copolymer, can include N-isopropylacrylamide in a mole percent from about 50% to about 70% of the total copolymer. In certain embodiments, the polymer, e.g., copolymer, can include N-isopropylacrylamide in amount from about 30% w/w to about 65% w/w of the total copolymer. In certain embodiments, the polymer, e.g., copolymer, can include N-isopropylacrylamide in a mole percent from about 55% to about 65% of the total copolymer. In certain embodiments, the polymer, e.g., copolymer, can include N-isopropylacrylamide in a mole percent of about 60% of the total copolymer.

In certain embodiments, the copolymer of a membrane of the present disclosure can include a ratio, e.g., a molar ratio, of a heterocycle component, e.g., heterocycle-containing monomer, and an acrylamide component, e.g., acrylamide-containing monomer, from about 10:1 to about 1:10. In certain embodiments, the heterocycle is a pyridine (e.g., 4-vinylpyridine). In certain embodiments, the acrylamide component is an N-alkyl acrylamide, e.g., isopropylacrylamide. In certain embodiments, the copolymer of a membrane of the present disclosure can include a heterocycle component, e.g., heterocycle-containing monomer, and an acrylamide component, e.g., acrylamide-containing monomer, at a ratio, e.g., a molar ratio, from about 9:1 to about 1:9, about 8:1 to about 1:8, about 7:1 to about 1:7, about 6:1 to about 1:6, about 5:1 to about 1:5, about 4:1 to about 1:4, about 3:1 to about 1:3, about 2:1 to about 1:2, about 1:1, about 5:1 to about 1:1, about 4:1 to about 1:1, about 2:1 to about 1:1, about 5:1 to about 1:2, about 4:1 to about 1:2 or about 3:1 to about 1:2. In certain embodiments, the copolymer of a membrane of the present disclosure can include a heterocycle component, e.g., heterocycle-containing monomer (e.g., 4-vinylpyridine), and an acrylamide component, e.g., acrylamide-containing monomer (an N-alkyl acrylamide), at a ratio, e.g., a molar ratio, from about 5:1 to about 1:3. In certain embodiments, the copolymer of a membrane of the present disclosure can include a heterocycle component, e.g., heterocycle-containing monomer (e.g., 4-vinylpyridine), and an acrylamide component, e.g., acrylamide-containing monomer (an N-alkyl acrylamide), at a ratio, e.g., a molar ratio, from about 4:1 to about 1:2. In certain embodiments, the copolymer of a membrane of the present disclosure can include a heterocycle component, e.g., heterocycle-containing monomer (e.g., 4-vinylpyridine), and an acrylamide component, e.g., acrylamide-containing monomer (an N-alkyl acrylamide), at a ratio, e.g., a molar ratio, from about 4:1 to about 1:1. In certain embodiments, the copolymer of a membrane of the present disclosure can include a heterocycle component, e.g., heterocycle-containing monomer (e.g., 4-vinylpyridine), and an acrylamide component, e.g., acrylamide-containing monomer (an N-alkyl acrylamide), at a ratio, e.g., a molar ratio, from about 2:1 to about 1:1. In certain embodiments, the copolymer of a membrane of the present disclosure can include a heterocycle component, e.g., heterocycle-containing monomer, and an acrylamide component, e.g., acrylamide-containing monomer, at a ratio, e.g., a molar ratio, of about 1:1. As shown in Tables 2, 6, 7 and 9, membranes that include a copolymer that includes a heterocycle component, e.g., heterocycle-containing monomer (e.g., a vinylpyridine), and an acrylamide component, e.g., acrylamide-containing monomer (e.g., an N-alkyl acrylamide), at a ratio, e.g., a molar ratio, of about 1:1 results in a membrane that is significantly less temperature-sensitive (e.g., as compared to a control membrane). In certain embodiments, the copolymer of a membrane of the present disclosure can include a heterocycle component, e.g., heterocycle-containing monomer, and an acrylamide component, e.g., acrylamide-containing monomer, at a ratio, e.g., a molar ratio, of about 2:1, e.g., 1.8:1. As shown in Table 2, membranes that include a copolymer that includes a heterocycle component, e.g., heterocycle-containing monomer (e.g., a vinylpyridine), and an acrylamide component, e.g., acrylamide-containing monomer (e.g., an N-alkyl acrylamide), at a ratio, e.g., a molar ratio, of about 2:1 results in a membrane that is less temperature-sensitive (e.g., as compared to a control membrane). In certain embodiments, the copolymer of a membrane of the present disclosure can include a heterocycle component, e.g., heterocycle-containing monomer, and an acrylamide component, e.g., acrylamide-containing monomer, at a ratio, e.g., a molar ratio, of about 3:1. In certain embodiments, the copolymer of a membrane of the present disclosure can include a heterocycle component, e.g., heterocycle-containing monomer, and an acrylamide component, e.g., acrylamide-containing monomer, at a ratio, e.g., a molar ratio, of about 4:1. As shown in Table 2, membranes that include a copolymer that includes a heterocycle component, e.g., heterocycle-containing monomer (e.g., a vinylpyridine), and an acrylamide component, e.g., acrylamide-containing monomer (e.g., an N-alkyl acrylamide), at a ratio, e.g., a molar ratio, of about 4:1 results in a membrane that is less temperature-sensitive (e.g., as compared to a control membrane). In certain embodiments, the copolymer of a membrane of the present disclosure can include a heterocycle component, e.g., heterocycle-containing monomer (e.g., 4-vinylpyridine), and an acrylamide component, e.g., acrylamide-containing monomer (an N-alkyl acrylamide), at a ratio, e.g., a molar ratio, from about 4:1 to about 1:4. In certain embodiments, the copolymer of a membrane of the present disclosure can include a heterocycle component, e.g., heterocycle-containing monomer (e.g., 4-vinylpyridine), and an acrylamide component, e.g., acrylamide-containing monomer (an N-alkyl acrylamide), at a ratio, e.g., a molar ratio, from about 3:1 to about 1:3. In certain embodiments, the copolymer of a membrane of the present disclosure can include a heterocycle component, e.g., heterocycle-containing monomer (e.g., 4-vinylpyridine), and an acrylamide component, e.g., acrylamide-containing monomer (an N-alkyl acrylamide), at a ratio, e.g., a molar ratio, from about 2:1 to about 1:2. In certain embodiments, the copolymer of a membrane of the present disclosure can include a heterocycle component, e.g., heterocycle-containing monomer (e.g., 4-vinylpyridine), and an acrylamide component, e.g., acrylamide-containing monomer (an N-alkyl acrylamide), at a ratio, e.g., a molar ratio, from about 1:1 to about 1:3. In certain embodiments, the copolymer of a membrane of the present disclosure can include a heterocycle component, e.g., heterocycle-containing monomer (e.g., 4-vinylpyridine), and an acrylamide component, e.g., acrylamide-containing monomer (an N-alkyl acrylamide), at a ratio, e.g., a molar ratio, from about 1:1 to about 1:2. As shown in Tables 6, 7 and 9, membranes that include a copolymer that includes a heterocycle component, e.g., heterocycle-containing monomer (e.g., a vinylpyridine), and an acrylamide component, e.g., acrylamide-containing monomer (e.g., an N-alkyl acrylamide), at a ratio, e.g., a molar ratio, of about 1:1.5 are less temperature-sensitive (e.g., as compared to a control membrane).

In certain embodiments, the membranes of the present disclosure can include a copolymer of a heterocycle component, e.g., heterocycle-containing monomer, and an acrylamide component, e.g., acrylamide-containing monomer. In certain embodiments, the membranes of the present disclosure can include a copolymer of a heterocycle component, e.g., heterocycle-containing monomer, and an N-alkyl acrylamide. In certain embodiments, the membranes of the present disclosure can include a copolymer of a vinylpyridine (e.g., 4-vinylpyridine) and an acrylamide component. In certain embodiments, the membranes of the present disclosure can include a copolymer of a vinylpyridine (e.g., 4-vinylpyridine) and an N-alkyl acrylamide, e.g., N-isopropylacrylamide. In certain embodiments, the membranes of the present disclosure can include a copolymer of 4-vinylpyridine and N-isopropylacrylamide.

In certain embodiments, the membranes of the present disclosure can include a copolymer of a vinylimidazole (e.g., 1-vinylimidazole) and an acrylamide component. In certain embodiments, the membranes of the present disclosure can include a copolymer of a vinylimidazole (e.g., 1-vinylimidazole) and an N-alkyl acrylamide, e.g., N-isopropylacrylamide. In certain embodiments, the membranes of the present disclosure can include a copolymer of 1-vinylimidazole and N-isopropylacrylamide.

In certain embodiments, the membranes of the present disclosure can include poly(4-vinylpyridine-co-N-isopropylacrylamide).

In certain embodiments, the poly(4-vinylpyridine-co-N-isopropylacrylamide) includes 4-vinylpyridine at a percent ranging from about 0.01% to about 80%, about 0.01% to about 75%, about 0.01% to about 70%, about 0.01% to about 65%, about 0.01% to about 60%, from about 0.01% to about 55%, from about 0.01% to about 50%, from about 0.05% to about 45%, from about 0.1% to about 40%, from about 0.5% to about 35%, from about 1% to about 30%, from about 2% to about 25%, from about 5% to about 20%, from about 10% to about 60%, from about 20% to about 60%, from about 30% to about 60%, from about 30% to about 50% or from about 35% to about 45% of the total weight of the copolymer. In certain embodiments, the poly(4-vinylpyridine-co-N-isopropylacrylamide) includes 4-vinylpyridine at a percent ranging from about 30% to about 50% of the total weight of the copolymer. In certain embodiments, the poly (4-vinylpyridine-co-N-isopropylacrylamide) includes 4-vinylpyridine at a mole percent ranging from about 0.01% to about 60%, 0.01% to about 50%, from about 0.05% to about 45%, from about 0.1% to about 40%, from about 0.5% to about 35%, from about 1% to about 30%, from about 2% to about 25%, from about 5% to about 20%, from about 10% to about 60%, from about 20% to about 60%, from about 30% to about 60%, from about 30% to about 50% or from about 35% to about 45%. In certain embodiments, the poly(4-vinylpyridine-co-N-isopropylacrylamide) includes 4-vinylpyridine at a mole percent ranging from about 1% to about 80%, about 1% to about 75%, about 1% to about 70%, about 1% to about 65% or about 1% to about 60%, e.g., about 20% to about 50% or from about 30% to about 50%. In certain embodiments, the poly(4-vinylpyridine-co-N-isopropylacrylamide) includes 4-vinylpyridine at a mole percent ranging from about 30% to about 50%.

In certain embodiments, the poly(4-vinylpyridine-co-N-isopropylacrylamide) includes N-isopropylacrylamide at a percent ranging from about 0.01% to about 70%, from about 0.01% to about 65%, from about 0.01% to about 60%, from about 0.01% to about 55%, from about 0.01% to about 50%, from about 0.05% to about 45%, from about 0.1% to about 40%, from about 0.5% to about 35%, from about 1% to about 30%, from about 2% to about 25%, from about 5% to about 20%, from about 10% to about 70%, from about 20% to about 70%, from about 30% to about 70%, from about 40% to about 70%, from about 50% to about 70% or from about 55% to about 65% of the total weight of the copolymer. In certain embodiments, the poly(4-vinylpyridine-co-N-isopropylacrylamide) includes N-isopropylacrylamide at a percent ranging from about 50% to about 70% of the total weight of the copolymer. In certain embodiments, the poly (4-vinylpyridinc-co-N-isopropylacrylamide) copolymer includes N-isopropylacrylamide at a percent ranging from about 0.01% to about 50%, from about 0.05% to about 45%, from about 0.1% to about 40%, from about 0.5% to about 35%, from about 1% to about 30%, from about 2% to about 25% or from about 5% to about 20% of the total weight of the copolymer. In certain embodiments, the poly(4-vinylpyridine-co-N-isopropylacrylamide) includes N-isopropylacrylamide at a mole percent ranging from about 0.01% to about 70%, from about 0.01% to about 65%, from about 0.01% to about 60%, from about 0.01% to about 55%, from about 0.01% to about 50%, from about 0.05% to about 45%, from about 0.1% to about 40%, from about 0.5% to about 35%, from about 1% to about 30%, from about 2% to about 25%, from about 5% to about 20%, from about 10% to about 70%, from about 20% to about 70%, from about 30% to about 70%, from about 40% to about 70%, from about 50% to about 70% or from about 55% to about 65%. In certain embodiments, the poly(4-vinylpyridine-co-N-isopropylacrylamide) includes N-isopropylacrylamide at a mole percent ranging from about 1% to about 70%, e.g., about 1% to about 50%. In certain embodiments, the poly(4-vinylpyridine-co-N-isopropylacrylamide) includes N-isopropylacrylamide at a mole percent ranging from about 50% to about 70%.

The molecular weight of the copolymer containing a heterocycle component and an acrylamide component, e.g., poly(4-vinylpyridine-co-N-isopropylacrylamide) polymer, can vary. In certain embodiments, the copolymer, e.g., poly(4-vinylpyridine-co-N-isopropylacrylamide), has a molecular weight from about 5 kDa to about 500 kDa. In certain embodiments, the copolymer, e.g., poly(4-vinylpyridine-co-N-isopropylacrylamide), has a molecular weight from about 100 kDa to about 500 kDa, from about 150 kDa to about 500 kDa, from about 200 kDa to about 500 kDa, from about 300 kDa to about 500 kDa, from about 400 kDa to about 500 kDa, from about 50 kDa to about 400 kDa, from about 50 kDa to about 400 kDa, from about 50 kDa to about 400 kDa, from about 50 kDa to about 300 kDa, from about 50 kDa to about 200 kDa, from about 50 kDa to about 100 kDa, from about 100 kDa to about 400 kDa, from about 100 kDa to about 300 kDa or from about 200 kDa to about 400 kDa. For example, but not by way of limitation, the molecular weight of the copolymer, e.g., poly(4-vinylpyridine-co-N-isopropylacrylamide), can have a molecular weight of 5 kDa or more, or about 10 kDa or more, or about 15 kDa or more, or about 20 kDa or more, or about 25 kDa or more, or about 30 kDa or more, or about 40 kDa or more, or about 50 kDa or more, or about 75 kDa or more, or about 90 kDa or more, or about 100 kDa or more. In certain embodiments, the molecular weight of the copolymer containing a heterocycle component and an acrylamide component, e.g., poly (4-vinylpyridine-co-N-isopropylacrylamide) polymer, has a molecular weight from about 100 kDa to about 500 kDa.

In certain embodiments, the poly(4-vinylpyridine-co-N-isopropylacrylamide) copolymer has the structure of Formula I:

Formula I

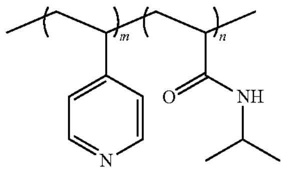

In certain embodiments, m and n denote positive integers. Depending on the properties of the membrane desired, the ratio, e.g., molar ratio, of m and n can vary, ranging from about 100:1 to about 1:100, e.g., from about 100:1 to about 1:90, from about 100:1 to about 1:80, from about 100:1 to about 1:70, from about 100:1 to about 1:60, from about 100:1 to about 1:50, from about 100:1 to about 1:40, from about 100:1 to about 1:30, from about 100:1 to about 1:20, from about 100:1 to about 1:10, from about 90:1 to about 1:100, from about 80:1 to about 1:100, from about 70:1 to about 1:100, from about 60:1 to about 1:100, from about 50:1 to about 1:100, from about 40:1 to about 1:100, from about 30:1 to about 1:100, from about 20:1 to about 1:100, from about 10:1 to about 1:100, from about 90:1 to about 1:90, from about 80:1 to about 1:80, from about 70:1 to about 1:70, from about 60:1 to about 1:60, from about 50:1 to about 1:50, from about 40:1 to about 1:40, from about 30:1 to about 1:30, from about 20:1 to about 1:20, from about 10:1 to about 1:10, from about 5:1 to about 1:5 or from about 5:1 to about 2:1. In certain embodiments, the ratio, e.g., molar ratio, of m and n can be from about 1:1 and about 1:100, e.g., from about 1:1 to about 1:95, from about 1:1 to about 1:80, from about 1:1 to about 1:75, from about 1:1 to about 1:50, from about 1:1 to about 1:25, from about 1:1 to about 1:10, from about 1:1 to about 1:5, from about 1:1 to about 1:3 or from about 1:1 to about 1:2. In certain embodiments, the ratio, e.g., molar ratio, of m and n is about 1:1.5. In certain embodiments, the ratio, e.g., molar ratio, of m and n is about 1:2. In certain embodiments, the ratio, e.g., molar ratio, of m and n is about 1:1.5. In certain embodiments, the ratio, e.g., molar ratio, of m and n is about 1:1.5. In certain embodiments, the ratio, e.g., molar ratio, of m and n ranges from about 1:1 to 100:1, e.g., from about 1:1 to 95:1, from about 1:1 to 80:1, from about 1:1 to about 75:1, from about 1:1 to about 50:1, from about 1:1 to about 25:1, from about 1:1 to about 10:1, from about 1:1 to about 5:1, from about 1:1 to about 4:1, from about 1:1 to about 3:1 or from about 1:1 to about 2:1. In certain embodiments, the ratio, e.g., molar ratio, of m and n ranges from about 4:1 to about 1:1. In certain embodiments, the ratio, e.g., molar ratio, of m and n ranges from about 4:1 to about 1:4. In certain embodiments, the ratio, e.g., molar ratio, of m and n ranges from about 3:1 to about 1:3. In certain embodiments, the ratio, e.g., molar ratio, of m and n ranges from about 2:1 to about 1:2. In certain embodiments, the ratio, e.g., molar ratio, of m and n ranges from about 1:1 to about 1:4. In certain embodiments, the ratio, e.g., molar ratio, of m and n ranges from about 1:1 to about 1:3. In certain embodiments, the ratio, e.g., molar ratio, of m and n ranges from about 1:1 to about 1:2. As shown in Table 2, membranes that include a copolymer that includes a heterocycle component, e.g., heterocycle-containing monomer (e.g., a vinylpyridine), and an acrylamide component, e.g., acrylamide-containing monomer (e.g., an N-alkyl acrylamide), at a ratio, e.g., a molar ratio, from about 4:1 to about 1:1 results in a membrane that is significantly less temperature-sensitive (e.g., as compared to a control membrane). As shown in Tables 6, 7 and 9, membranes that include a copolymer that includes a heterocycle component, e.g., heterocycle-containing monomer (e.g., a vinylpyridine), and an acrylamide component, e.g., acrylamide-containing monomer (e.g., an N-alkyl acrylamide), at a ratio, e.g., a molar ratio, from about 1:1 to about 1:2 are significantly less temperature-sensitive (e.g., as compared to a control membrane). As shown in Tables 2, 6, 7 and 9, membranes that include a copolymer that includes a heterocycle component, e.g., heterocycle-containing monomer (e.g., a vinylpyridine), and an acrylamide component, e.g., acrylamide-containing monomer (e.g., an N-alkyl acrylamide), at a ratio, e.g., a molar ratio, from about 4:1 to about 1:2 results in a membrane that is significantly less temperature-sensitive (e.g., as compared to a control membrane).

In certain embodiments, m can range from about 1 to about 90. In certain embodiments, m can range from about 1 to about 10. In certain embodiments, m can range from about 10 to about 90. In certain embodiments, n can range from about 1 to about 90. In certain embodiments, n can range from about 1 to about 10. In certain embodiments, n can range from about 10 to about 90. In certain embodiments, m can range from about 1 to about 10 and n can range from about 1 to about 10. In certain embodiments, m can range from about 10 to about 90 and n can range from about 10 to about 90. In certain embodiments, m can range from about 40 to about 90 and n can range from about 10 to about 60. In certain particular embodiments, m is about 80 and n is about 22. In certain embodiments, m is about 65 and n is about 35. In certain embodiments, m is about 50 and n is about 50. In certain embodiments, m is about 4 and n is about 6.

In certain embodiments, the membranes of the present disclosure include one or more crosslinkers (crosslinking agent) such that the backbones of the polymers present in a membrane are crosslinked. In certain embodiments of the present disclosure, crosslinkers of interest can provide both intermolecular and intramolecular crosslinkings at the same time. Non-limiting examples of crosslinkers for use herein are disclosed in Section II.4. In certain embodiments, the crosslinker can be a crosslinker with two, three or four epoxide functional groups. In certain embodiments, the crosslinker can be a crosslinker with two epoxide functional groups. In certain embodiments, the crosslinker can be a crosslinker with three epoxide functional groups. In certain embodiments, the crosslinker can be a crosslinker with four epoxide functional groups. In certain embodiments, the crosslinker can be a branched glycidyl ether crosslinker. For example, but not by way of limitation, the crosslinker can be a branched glycidyl ether crosslinker including two or more crosslinkable groups, such as but not limited to polyethylene glycol diglycidyl ether, or polyethylene glycol tetraglycidyl ether. In certain embodiments, the crosslinker is a polyethylene glycol diglycidyl ether. In certain embodiments, the crosslinker is a polyetheramine crosslinker.

The ratio of copolymer, e.g., poly(4-vinylpyridine-co-N-isopropylacrylamide) polymer, and the crosslinker can vary depending on the desired diffusion properties of the membrane. In certain embodiments, the ratio, e.g., weight ratio, of copolymer, e.g., poly(4-vinylpyridine-co-N-isopropylacrylamide) polymer, to the crosslinker can range from about 1000:1 to about 5:1, e.g., from about 900:1 to about 5:1, from about 800:1 to about 5:1, from about 700:1 to about 5:1, from about 600:1 to about 5:1, from about 500:1 to about 5:1, from about 400:1 to about 5:1, from about 300:1 to about 5:1, from about 200:1 to about 5:1, from about 100:1 to about 5:1, from about 50:1 to about 5:1, from about 10:1 to about 5:1, from about 1:1 to about 5:1, from about 1000:1 to about 10:1, from about 1000:1 to about 20:1, from about 1000:1 to about 50:1, from about 1000:1 to about 100:1, from about 1000:1 to about 500:1, from about 500:1 to about 20:1, from about 500:1 to about 50:1, from about 500:1 to about 100:1, from about 500:1 to about 200:1, from about 500:1 to about 400:1, from about 200:1 to about 10:1, from about 200:1 to about 20:1, from about 200:1 to about 50:1, from about 200:1 to about 100:1, from about 100:1 to about 10:1, from about 100:1 to about 20:1 or from about 100:1 to about 50:1. In certain embodiments, the ratio, e.g., weight ratio, of copolymer, e.g., poly(4-vinylpyridine-co-N-isopropylacrylamide) polymer, to the crosslinker can range from about 10:1 to about 5:1. As shown in Table 3, membranes that include a copolymer (e.g., poly(4-vinylpyridine-co-N-isopropylacrylamide)) and a crosslinker at a ratio, e.g., weight ratio, resulted in a membrane that is significantly less temperature-sensitive (e.g., as compared to a control membrane). In certain embodiments, the ratio, e.g., weight ratio, of copolymer, e.g., poly(4-vinylpyridine-co-N-isopropylacrylamide) polymer, to the crosslinker can range from 1:1 to 1:100, from 1:1 to 1:95, from 1:1 to 1:80, from 1:1 to 1:75, from 1:1 to 1:50, from 1:1 to 1:25, from 1:1 to 1:10, from 1:1 to 1:5, from 1:1 to 1:3 and from 1:1 to 1:2. In certain other embodiments, the ratio, e.g., weight ratio, of poly(4-vinylpyridine-co-N-isopropylacrylamide) polymer and crosslinker ranges from 1:1 to 100:1, from 1:1 to 95:1, from 1:1 to 80:1, from 1:1 to 75:1, from 1:1 to 50:1, from 1:1 to 25:1, from 1:1 to 10:1, from 1:1 to 5:1, from 1:1 to 3:1 or from 1:1 to 2:1. In certain embodiments, the ratio, e.g., weight ratio, of copolymer, e.g., poly(4-vinylpyridine-co-N-isopropylacrylamide) polymer, and the crosslinker is 4:1. In certain embodiments, the ratio, e.g., weight ratio, of copolymer, e.g., poly(4-vinylpyridine-co-N-isopropylacrylamide) polymer, and the crosslinker is 5:1. In certain embodiments, the ratio, e.g., weight ratio, of copolymer, e.g., poly(4-vinylpyridine-co-N-isopropylacrylamide) polymer, and the crosslinker is 10:1. In certain embodiments, the ratio, e.g., weight ratio, of copolymer, e.g., poly(4-vinylpyridine-co-N-isopropylacrylamide) polymer, and the crosslinker is 20:1. In certain embodiments, the ratio, e.g., weight ratio, of copolymer, e.g., poly(4-vinylpyridine-co-N-isopropylacrylamide) polymer, and the crosslinker is 50:1. In certain embodiments, the ratio, e.g., weight ratio, of copolymer, e.g., poly(4-vinylpyridine-co-N-isopropylacrylamide) polymer, and the crosslinker is 100:1. In certain embodiments, the ratio, e.g., weight ratio, of copolymer, e.g., poly(4-vinylpyridine-co-N-isopropylacrylamide) polymer, and the crosslinker is 200:1. In certain embodiments, the ratio, e.g., weight ratio, of copolymer, e.g., poly(4-vinylpyridine-co-N-isopropylacrylamide) polymer, and the crosslinker is 300:1. In certain embodiments, the ratio, e.g., weight ratio, of copolymer, e.g., poly(4-vinylpyridine-co-N-isopropylacrylamide) polymer, and the crosslinker is 400:1. In certain embodiments, the ratio, e.g., weight ratio, of copolymer, e.g., poly(4-vinylpyridine-co-N-isopropylacrylamide) polymer, and the crosslinker is 500:1. In certain embodiments, the ratio, e.g., weight ratio, of copolymer, e.g., poly(4-vinylpyridine-co-N-isopropylacrylamide) polymer, and the crosslinker is 600:1. In certain embodiments, the ratio, e.g., weight ratio, of copolymer, e.g., poly(4-vinylpyridine-co-N-isopropylacrylamide) polymer, and the crosslinker is 700:1. In certain embodiments, the ratio, e.g., weight ratio, of copolymer, e.g., poly(4-vinylpyridine-co-N-isopropylacrylamide) polymer, and the crosslinker is 800:1. In certain embodiments, the ratio, e.g., weight ratio, of copolymer, e.g., poly(4-vinylpyridine-co-N-isopropylacrylamide) polymer, and the crosslinker is 900:1. In certain embodiments, the ratio, e.g., weight ratio, of copolymer, e.g., poly(4-vinylpyridine-co-N-isopropylacrylamide) polymer, and the crosslinker is 1000:1. In certain embodiments, a membrane of the present disclosure includes a crosslinker at a weight % of about 10% or more, e.g., about 15% or more or about 18% or more. In certain embodiments, a membrane of the present disclosure includes a crosslinker at a weight % from about 10% to about 20%. In certain embodiments, a membrane of the present disclosure includes a crosslinker at a weight % from about 10% to about 30%.

Generally, the thickness of the membrane is controlled by the concentration of the membrane solution, by the number of droplets of the membrane solution applied, by the number of times the sensor is dipped in or sprayed with the membrane solution, by the volume of membrane solution sprayed on the sensor, and the like, and by any combination of these factors. In certain embodiments, the membrane described herein can have a thickness, e.g., a dry thickness, ranging from about 0.1 μm to about 1000 μm, e.g., from about 1 μm to about 500 μm or from about 10 μm to about 100 μm. In certain embodiments, the membrane described herein can have a thickness, e.g., a dry thickness, ranging from about 1 μm to about 50 μm. In certain embodiments, the membrane described herein can have a thickness, e.g., a dry thickness, ranging from about 5 μm to about 50 μm. In certain embodiments, the membrane described herein can have a thickness, e.g., a dry thickness, ranging from about 5 μm to about 40 μm. In certain embodiments, the membrane described herein can have a thickness, e.g., a dry thickness, ranging from about 10 μm to about 40 μm. In certain embodiments, the membrane described herein can have a thickness, e.g., a dry thickness, ranging from about 20 μm to about 30 μm. In certain embodiments, the thickness, e.g., the dry thickness, of the membranes of the present disclosure is about 20 μm. In certain embodiments, the thickness, e.g., the dry thickness, of the membranes of the present disclosure is about 30 μm.

In certain embodiments, the mass transport limiting membrane can be homogeneous and can be single-component (contain a single membrane copolymer of two or more polymers or monomers as disclosed herein). For example, but not by way of limitation, a membrane of the present disclosure can consist of or consist essentially of a copolymer of the present disclosure, e.g., a poly(4-vinylpyridine-co-N-isopropylacrylamide) polymer. In certain embodiments, a membrane of the present disclosure can include a copolymer of the present disclosure, e.g., a poly(4-vinylpyridine-co-N-isopropylacrylamide) polymer and a crosslinker. In certain embodiments, a membrane of the present disclosure can consist of or consist essentially of a copolymer of the present disclosure, e.g., a poly(4-vinylpyridine-co-N-isopropylacrylamide) polymer and a crosslinker.

Alternatively, the mass transport limiting membrane can be multi-component (contain two or more different membrane polymers, e.g., copolymers, e.g., as a composite). For example, but not by way of limitation, a membrane of the present disclosure can include a copolymer of the present disclosure, e.g., a poly(4-vinylpyridine-co-N-isopropylacrylamide) polymer, and at least one additional polymer, e.g., a second polymer or copolymer. In certain embodiments, a membrane of the present disclosure can include a copolymer of the present disclosure, e.g., a poly(4-vinylpyridine-co-N-isopropylacrylamide) polymer, a second polymer and a crosslinker. Non-limiting examples of second polymers include a polyurethane, a silicone-based polymer, e.g., polydimethylsiloxane (PDMS), or a styrene-based polymer, e.g., a poly(4-vinylpyridine-co-styrene) copolymer.

In certain embodiments, the multi-component membrane can be present as a multilayered membrane, e.g., a bilayer membrane or a trilayer membrane. In certain embodiments, the multi-component membrane can be present as a homogeneous admixture of two or more membrane polymers, e.g., copolymers of the present disclosure. In certain embodiments, a homogeneous admixture can be deposited by combining the two or more membrane polymers in a solution and then depositing the solution upon a working electrode, e.g., by dip coating. In certain embodiments, a multi-layered membrane can be deposited onto analyte-responsive active area by depositing a first layer, e.g., by dip coating, and depositing a second layer onto the first layer, e.g., by dip coating, to generate a bilayer membrane. In certain embodiments, a third layer can be deposited onto the second layer, e.g., by dip coating, to generate a trilayer membrane.

In certain embodiments, an analyte sensor of the present disclosure can comprise a sensor tail comprising at least a first working electrode, a first active area disposed upon a surface of the first working electrode and a mass transport limiting membrane permeable to the first analyte that directly overcoats at least the first active area. In certain embodiments, the first active area comprises a first polymer and at least one enzyme covalently bonded to the first polymer and responsive to a first analyte. In certain embodiments, the mass transport limiting membrane is a membrane, e.g., a membrane disclosed herein, that has low temperature dependency such that detection of the analyte is not adversely affected by changing temperature. In certain embodiments, the mass transport limiting membrane includes a polymer comprising a heterocycle-containing component (e.g., pyridine), and an acrylamide component (e.g., an N-isopropylacrylamide), e.g., a poly(4-vinylpyridine-co-N-isopropylacrylamide) polymer. In certain embodiments, the mass transport limiting membrane further includes a crosslinker. In certain embodiments, the mass transport limiting membrane includes a poly(4-vinylpyridine-co-N-isopropylacrylamide) polymer and a crosslinker.

In certain embodiments, the analyte sensor comprises two active areas and the membrane overcoats at least one of the active areas of the analyte sensor. In certain embodiments, the membrane overcoats each of the active areas of an analyte sensor. Alternatively, a first membrane overcoats one of the active areas and a second membrane overcoats the second active area. In certain embodiments, at least one of the mass transport limiting membranes includes a polymer comprising a heterocycle-containing component (e.g., pyridine), and an acrylamide component (e.g., an N-isopropylacrylamide), e.g., a poly(4-vinylpyridine-co-N-isopropylacrylamide) polymer. In certain embodiments, at least one of the mass transport limiting includes membranes a poly(4-vinylpyridine-co-N-isopropylacrylamide) polymer and a crosslinker. In certain embodiments, the second mass transport limiting membrane includes a different polymer for the first mass transport limiting membrane.

6. Interference Domain

In certain embodiments, a sensor of the present disclosure, e.g., sensor tail, can further comprise an interference domain. In certain embodiments, the interference domain can include a polymer domain that restricts the flow of one or more interferants, e.g., to the surface of the working electrode. In certain embodiments, the interference domain can function as a molecular sieve that allows analytes and other substances that are to be measured by the working electrode to pass through, while preventing passage of other substances such as interferents. In certain embodiments, the interferents can affect the signal obtained at the working electrode. Non-limiting examples of interferents include acetaminophen, ascorbate, ascorbic acid, bilirubin, cholesterol, creatinine, dopamine, ephedrine, ibuprofen, L-dopa, methyldopa, salicylate, tetracycline, tolazamide, tolbutamide, triglycerides, urea and uric acid.

In certain embodiments, the interference domain is located between the working electrode and one or more active areas. In certain embodiments, non-limiting examples of polymers that can be used in the interference domain include polyurethanes, polymers having pendant ionic groups and polymers having controlled pore size. In certain embodiments, the interference domain is formed from one or more cellulosic derivatives. Non-limiting examples of cellulosic derivatives include polymers such as cellulose acetate, cellulose acetate butyrate, 2-hydroxyethyl cellulose, cellulose acetate phthalate, cellulose acetate propionate, cellulose acetate and trimellitate.

In certain embodiments, the interference domain is located between the one or more active areas and the mass transport limiting membrane. In certain embodiments, the interference domain is part of the mass transport limiting membrane and not a separate membrane.

In certain embodiments, the interference domain includes a thin, hydrophobic membrane that is non-swellable and restricts diffusion of high molecular weight species. For example, but not by way of limitation, the interference domain can be permeable to relatively low molecular weight substances, such as hydrogen peroxide, while restricting the passage of higher molecular weight substances, such as ketones, glucose, acetaminophen and/or ascorbic acid.

In certain embodiments, the interference domain can be deposited directly onto the working electrode, e.g., onto the surface of the permeable working electrode. In certain embodiments, the interference domain can be deposited directly onto the active. In certain embodiments, the interference domain has a thickness, e.g., dry thickness, ranging from about 0.1 μm to about 1,000 μm, e.g., from about 1 μm to about 500 μm, about 10 μm to about 100 μm or about 10 μm to about 100 μm. In certain embodiments, the interference domain can have a thickness from about 0.1 μm to about 10 μm, e.g., from about 0.5 μm to about 10 μm, from about 1 μm to about 10 μm, from about 1 μm to about 5 μm or from about 0.1 μm to about 5 μm. In certain embodiments, the sensor can be dipped in the interference domain solution more than once. For example, but not by way of limitation, a sensor (or working electrode) of the present disclosure can be dipped in an interference domain solution at least twice, at least three times, at least four times or at least five times to obtain the desired interference domain thickness.

III. Methods of Use

The present disclosure further provides methods of using the analyte sensors disclosed herein. In certain embodiments, the present disclosure provides methods for detecting an analyte. In certain embodiments, the present disclosure provides methods for detecting two more analytes disclosed herein, e.g., a first analyte and a second analyte. For example, but not by way of limitation, the one or more analytes can be glucose, lactate, ketones (e.g., ketone bodies), glutamine, alcohols, aspartate, asparagine, potassium, glutamate, creatinine, acetoacetate, fructosamine, amylase, bilirubin, cholesterol, chorionic gonadotropin, creatine kinase (e.g., CK-MB), creatine, DNA, RNA, growth factors, growth hormones, hormones (e.g., thyroid stimulating hormone), steroids, vitamins (e.g., ascorbic acid), uric acid, neurochemicals (e.g., acetylcholine, norepinephrine and dopamine), oxygen, albumin, sarcosine, prostate-specific antigen, prothrombin, thrombin, troponin, pyruvate, acetaldehyde, ascorbate, galactose, L-xylono-1,4-lactone, glutathione disulfide, hydrogen peroxide, linoleate, 1,3-bisphosphoglycerate, 6-phospho-D-glucono-1,5-lactone, hemoglobin, pharmaceutical drugs (e.g., antibiotics (e.g., gentamicin, vancomycin and the like), digitoxin, digoxin, theophylline, insulin and warfarin), drugs of abuse (e.g., analgesics, depressants, stimulants and hallucinogens) and/or antibodies. In certain embodiments, the analyte is glucose, glutamate, lactate, creatinine, sarcosine and/or ascorbate. In certain embodiments, the analyte is glucose.

In certain embodiments, a method for detecting an analyte can include: (i) providing an analyte sensor for detecting an analyte, e.g., glucose. In certain embodiments, the analyte sensor includes: (a) a sensor tail including at least a first working electrode; (b) an analyte-responsive active area disposed upon a surface of the first working electrode where the analyte-responsive active area includes a first enzyme system and a second enzyme system; and (c) a mass transport limiting membrane, e.g., comprising a membrane described herein, permeable to the analyte that overcoats the analyte-responsive active area. In certain embodiments, the method can further include: (ii) applying a potential to the first working electrode; (iii) obtaining a first signal at or above an oxidation-reduction potential of the analyte-responsive active area, the first signal being proportional to a concentration of the first analyte in a fluid contacting the analyte-responsive active area; and (iv) correlating the first signal to the concentration of the first analyte in the fluid. In certain embodiments, the mass transport limiting membrane is a membrane, e.g., a membrane disclosed herein, that has low temperature dependency such that detection of the analyte is not adversely affected by changing temperature. Non-limiting examples of mass transport limiting membranes that can be included in an analyte sensor are disclosed herein in Section II.5.

In certain embodiments, methods of the present disclosure can include: (i) exposing an analyte sensor to a fluid comprising an analyte of interest; wherein the analyte sensor comprises: (a) a sensor tail comprising at least a first working electrode; (b) an analyte-responsive active area disposed upon a surface of the first working electrode, where the analyte-responsive active area comprises at least enzyme for detecting the analyte and, optionally, a polymer; and (c) a mass transport limiting membrane, e.g., comprising a membrane disclosed herein, permeable to the analyte that overcoats the analyte-responsive active area. In certain embodiments, the method can further include: (ii) applying a potential, to the first working electrode; (iii) obtaining a first signal at or above an oxidation-reduction potential of the first analyte-responsive active area, the first signal being proportional to a concentration of the analyte in the fluid; and (iv) correlating the first signal to the concentration of the analyte in the fluid. In certain embodiments, the mass transport limiting membrane is a membrane, e.g., a membrane disclosed herein, that has low temperature dependency such that detection of the analyte is not adversely affected by changing temperature. Non-limiting examples of mass transport limiting membranes that can be included in an analyte sensor are disclosed herein in Section II.5.

In certain embodiments, the method of the present disclosure can further include detecting another analyte by providing an analyte sensor that includes a second active area and/or exposing an analyte sensor that includes a second active area to a fluid comprising the analytes. In certain embodiments, the analyte sensor for use in a method of the present disclosure can include a second working electrode; and a second active area disposed upon a surface of the second working electrode, where the second active area comprises a second polymer, at least one enzyme responsive to the analyte to be detected and, optionally, a redox mediator; wherein a portion, e.g., second portion, of the mass transport limiting membrane overcoats the second active area. Alternatively, the second active area can be covered by a second mass transport limiting membrane that is separate and/or different than the mass transport limiting membrane that overcoats the first analyte-responsive active area. In certain embodiments, a method of the present disclosure can further include: (ii) applying a potential to the second working electrode; (iii) obtaining a second signal at or above an oxidation-reduction potential of the second analyte-responsive active area, the second signal being proportional to a concentration of the second analyte in the fluid; and (iv) correlating the second signal to the concentration of the second analyte in the fluid. Non-limiting examples of mass transport limiting membranes that can be included in an analyte sensor are disclosed herein in Section II.5.

IV. Methods of Manufacture

The present disclosure further provides methods for manufacturing the presently disclosed analyte sensors. In certain embodiments, an analyte sensor of the present disclosure includes one or more active areas (for detecting one or more analytes) and one or more working electrodes. For example, but not by way of limitation, the present disclosure provides methods for manufacturing an analyte sensor that includes a first active area disposed upon a first working electrode. In certain embodiments, a second active area can be disposed upon a second working electrode or the first working electrode.

In certain embodiments, the method includes generating a first working electrode, e.g., by screen printing. In certain embodiments, generating a first working electrode can include printing with a carbon ink. In certain embodiments, generating a first working electrode can include printing with a carbon ink on a substrate, e.g., non-conductive substrate.

In certain embodiments, the method can further include adding a composition comprising one or more enzymes onto a surface of the working electrode to generate an analyte-responsive active area on the working electrode. In certain embodiments, the enzyme composition can include one or more enzymes for detecting an analyte described herein. In certain embodiments, the composition comprising the one or more enzymes can further include an electron transfer agent and/or a crosslinker.

In certain embodiments, the method can further include depositing a membrane directly on top of the first and/or the second active areas. In certain embodiments, the membrane composition can include a copolymer described herein. Non-limiting examples of copolymers that can be included in a membrane composition are disclosed herein in Section II.5. In certain embodiments, the membrane is a membrane disclosed herein that has low temperature dependency such that detection of the analyte is not adversely affected by changing temperature. For example, but not by way of limitation, the membrane can include a copolymer of at least a first monomer and a second monomer, wherein the first monomer comprises an acrylamide. In certain embodiments, the copolymer is a poly(4-vinylpyridine-co-N-isopropylacrylamide) polymer. In certain embodiments, the membrane is applied by dip coating. In certain embodiments, the dip coating process can include depositing multiple layers. In certain embodiments, a single layer deposited by a single dip in the polymer-solvent solution can also be used to produce functional sensors. Alternatively, the membrane can be produced by a multiple dipping process. In certain embodiments, the dip-coating process can include (1) dipping the sensor tail into the membrane solution and (2) drying the membrane solution on the sensor tail. In certain embodiments, steps (1) and (2) can be repeated until the membrane has the desired thickness. For example, but not by way of limitation, this dipping process can be repeated at least two times, at least three times, at least four time or at least five times.

In certain embodiments, the method can include generating a second working electrode, e.g., by screen printing, e.g., on the same substrate that has the first working electrode. In certain embodiments, the method can further include adding a composition comprising an enzyme system, e.g., a second enzyme system, onto a surface of the second working electrode to generate a second analyte-responsive active area on the second working electrode. In certain embodiments, a membrane of the present disclosure overcoats the second analyte-responsive active area.

V. Exemplary Embodiments

A. The present disclosure provides a membrane structure comprising: an enzyme layer; and a membrane disposed proximate to the enzyme layer, wherein the membrane comprises: a copolymer of at least a first monomer and a second monomer, wherein the first monomer comprises an acrylamide.

A1. The membrane structure of A, wherein the second monomer comprises a heterocycle-containing component.

A2. The membrane structure of A or A1, wherein the acrylamide is an N-alkyl acrylamide.

A2-1. The membrane structure of A2, wherein the alkyl of the N-alkyl acrylamide is a C1-C6 straight or branched alkyl group or a $C_3$-$C_6$ cycloalkyl group.

A2-2. The membrane structure of A2-1, wherein the alkyl of the N-alkyl acrylamide is a branched alkyl group.

A2-3. The membrane structure of A2-2, wherein the branched alkyl group is selected from the group consisting of isopropyl, isobutyl, sec-butyl, tert-butyl, tert-pentyl, neopentyl, isopentyl, sec-pentyl, 3-pentyl, sec-isopentyl, active pentyl, isohexyl, tert-hexyl, neohexyl and sec-hexyl.

A2-4. The membrane structure of A2-3, wherein the branched alkyl group is an isopropyl group.

A2-5. The membrane structure of any one of A2-A2-4, wherein the N-alkyl acrylamide is N-isopropylacrylamide.

A3. The membrane structure of any one of A1-A2-5, wherein the heterocycle-containing component is selected from the group consisting of furan, thiophene, pyrrole, pyridine, pyrimidine, imidazole, oxadiazole, isoxazole, oxazole, pyrazole, isothiazole, thiazole, pyrazine, isoquinoline, quinoline, benzofuran, and benzimidazole.

A4. The membrane structure of any one of A1-A3, wherein the heterocycle is pyridine.

A5. The membrane structure of A4, wherein the pyridine is a vinylpyridine.

A6. The membrane structure of A5, wherein the vinylpyridine is 2-vinylpyridine, 4-vinylpyridine or a combination thereof.

A7. The membrane structure of A6, wherein the vinylpyridine is 4-vinylpyridine.

A8. The membrane structure of A6, wherein the vinylpyridine is 2-vinylpyridine.

A9. The membrane structure of any one of A1-A3, wherein the heterocycle is imidazole.

A10. The membrane structure of A9, wherein the imidazole is a vinylimidazole.

A11. The membrane structure of A10, wherein the vinylimidazole is 1-vinylimidazole, 2-vinylimidazole, 4-vinylimidazole or a combination thereof.

A12. The membrane structure of A11, wherein the vinylimidazole is 1-vinylimidazole.

A13. The membrane structure of A11, wherein the vinylimidazole is 2-vinylimidazole.

A14. The membrane structure of any one of A1-A3, wherein the acrylamide is an N-alkyl acrylamide and the heterocycle is pyridine.

A15. The membrane structure of A14, wherein the N-alkyl acrylamide is N-isopropylacrylamide.

A16. The membrane structure of A14 or A15, wherein the pyridine is a vinylpyridine.

A17. The membrane structure of A16, wherein the vinylpyridine is 4-vinylpyridine.

A18. The membrane structure of any one of A14-A17, wherein the acrylamide is an N-alkyl acrylamide and the pyridine is 4-vinylpyridine.

A18-1. The membrane structure of any one of A-A18, wherein the copolymer comprises from about 20 mer % to about 70 mer % of the first monomer.

A18-2. The membrane structure of any one of A-A18-1, wherein the copolymer comprises from about 40 mer % to about 60 mer % of the first monomer.

A18-3. The membrane structure of A18-1, wherein the copolymer comprises from about 30 mer % to about 60 mer % of the first monomer.

A18-4. The membrane structure of any one of A-A18-3, wherein the copolymer comprises from about 30 mer % to about 80 mer % of the second monomer.

A18-5. The membrane structure of any one of A-A18-4, wherein the copolymer comprises from about 30 mer % to about 65 mer % of the second monomer.

A18-6. The membrane structure of any one of A-A18-5, wherein the copolymer comprises from about 30 mer % to about 50 mer % of the second monomer.

A18-7. The membrane structure of A18-4, wherein the copolymer comprises from about 40 mer % to about 70 mer % of the second monomer.

A18-8. The membrane structure of A17, wherein the copolymer comprises at least about 40 mer % of the first monomer.

A18-9. The membrane structure of A17, wherein the copolymer comprises at least about 60 mer % of the first monomer.

A18-10. The membrane structure of A17, wherein the copolymer comprises at least about 60 mer % of the second monomer.

A18-11. The membrane structure of A17, wherein the copolymer comprises at least about 40 mer % of the second monomer.

A18-12. The membrane structure of any one of A14-A18-11, wherein the copolymer is a poly(4-vinylpyridine-co-N-isopropylacrylamide).

A19. The membrane structure of any one of A-A3, wherein the copolymer has the structure of Formula I:

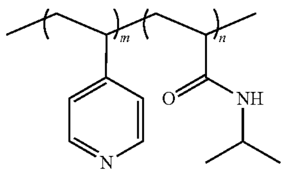

wherein m and n are each a positive integer.

A20. The membrane structure of A19, wherein the ratio of m and n is from about 1:1 to about 1:100.

A21. The membrane structure of A19, wherein the ratio of m and n is from about 1:1 to about 100:1.

A21-1. The membrane structure of A19, wherein the ratio of m and n is from about 4:1 to about 1:4.

A21-2. The membrane structure of A21-1, wherein the ratio of m and n is from about 1:1 to about 1:4.

A21-3. The membrane structure of A21-2, wherein the ratio of m and n is from about 1:1 to about 1:3.

A21-4. The membrane structure of A21-3, wherein the ratio of m and n is from about 1:1 to about 1:2.

A22. The membrane structure of A19, wherein m ranges from about 1 to about 90 and n ranges from about 1 to about 90.

A22-1. The membrane structure of A19, wherein m ranges from about 30 to about 50 and n ranges from about 50 to about 70.

A23. The membrane structure of A22, wherein m is about 80 and n is about 22, m is about 65 and n is about 35 or m is about 50 and n is about 50.

A23-1. The membrane structure of A22-1, wherein m is about 40 and n is about 60.

A24. The membrane structure of any of A-A23-1, wherein the membrane comprises one or more crosslinking agents.

A25. The membrane structure of A24, wherein the one or more crosslinking agents is selected from the group consisting of polyethylene glycol diglycidyl ether, polyethylene glycol tetraglycidyl ether and polyetheramine.

A26. The membrane structure of A25, wherein the crosslinking agent is a polyethylene glycol diglycidyl ether.

A27. The membrane structure of any one of A-A26, wherein enzyme layer comprises one or more enzymes responsive to a first analyte.

A28. The membrane structure of any one of A-A27, wherein the enzyme layer comprises an electron transfer agent.

A29. The membrane structure of A27 and A28, wherein the first analyte is selected from the group consisting of glucose, glutamate, ketones, lactate, creatinine, potassium, sarcosine and ascorbate.

A30. The membrane structure of A29, wherein the first analyte is glucose.

A31. The membrane structure of A29, wherein the first analyte is lactate.

A32. The membrane structure of any one of A-A31, wherein the rate of analyte diffusion through the membrane structure changes less than about 5% in response to a change in temperature.

A33. The membrane structure of any one of A-A32, wherein the rate of analyte diffusion through the membrane structure changes less than about 1% in response to a change in temperature.

B. The present disclosure provides an analyte sensor comprising:

(i) a sensor tail comprising at least a first working electrode;

(ii) a first active area disposed upon a surface of the first working electrode;

(iii) a first mass transport limiting membrane permeable to the first analyte that overcoats at least the first active area, wherein the first mass transport limiting membrane comprises a copolymer of at least a first monomer comprising an acrylamide and a second monomer.

B1. The analyte sensor of B, wherein the second monomer comprises a heterocycle-containing component.

B2. The analyte sensor of B or B1, wherein the acrylamide is an N-alkyl acrylamide.

B2-1. The analyte sensor of B2, wherein the alkyl of the N-alkyl acrylamide is a C1-C6 straight or branched alkyl group or a $C_3$-$C_6$ cycloalkyl group.

B2-2. The analyte sensor of B2-1, wherein the alkyl of the N-alkyl acrylamide is a branched alkyl group.

B2-3. The analyte sensor of B2-2, wherein the branched alkyl group is selected from the group consisting of isopropyl, isobutyl, sec-butyl, tert-butyl, tert-pentyl, neopentyl, isopentyl, sec-pentyl, 3-pentyl, sec-isopentyl, active pentyl, isohexyl, tert-hexyl, neohexyl and sec-hexyl.

B2-4. The analyte sensor of any one of B2-B2-3, wherein the N-alkyl acrylamide is N-isopropylacrylamide.

B3. The analyte sensor of any one of B1-B2-4, wherein the heterocycle-containing component is selected from the group consisting of furan, thiophene, pyrrole, pyridine, pyrimidine, imidazole, oxadiazole, isoxazole, oxazole, pyrazole, isothiazole, thiazole, pyrazine, isoquinoline, quinoline, benzofuran, and benzimidazole.

B4. The analyte sensor of any one of B1-B3, wherein the heterocycle is pyridine.

B5. The analyte sensor of B4, wherein the pyridine is a vinylpyridine.

B6. The analyte sensor of B5, wherein the vinylpyridine is 2-vinylpyridine, 4-vinylpyridine or a combination thereof.

B7. The analyte sensor of B6, wherein the vinylpyridine is 4-vinylpyridine.

B8. The analyte sensor of B6, wherein the vinylpyridine is 2-vinylpyridine.

B9. The analyte sensor of any one of B1-B3, wherein the heterocycle is imidazole.

B10. The analyte sensor of B9, wherein the imidazole is a vinylimidazole.

B11. The analyte sensor of B10, wherein the vinylimidazole is 1-vinylimidazole, 2-vinylimidazole, 4-vinylimidazole or a combination thereof.

B12. The analyte sensor of B11, wherein the vinylimidazole is 1-vinylimidazole.

B13. The analyte sensor of B11, wherein the vinylimidazole is 2-vinylimidazole.

B14. The analyte sensor of any one of B1-B3, wherein the acrylamide is an N-alkyl acrylamide and the heterocycle is pyridine.

B15. The analyte sensor of B14, wherein the N-alkyl acrylamide is N-isopropylacrylamide.

B16. The analyte sensor of B14 or B15, wherein the pyridine is a vinylpyridine.

B17. The analyte sensor of B16, wherein the vinylpyridine is 4-vinylpyridine.

B18. The analyte sensor of any one of B14-B17, wherein the acrylamide is an N-alkyl acrylamide and the pyridine is 4-vinylpyridine.

B18-1. The analyte sensor of any one of B-B18, wherein the copolymer comprises from about 20 mer % to about 70 mer % of the first monomer.

B18-2. The analyte sensor of any one of B-B18-1, wherein the copolymer comprises from about 40 mer % to about 60 mer % of the first monomer.

B18-3. The analyte sensor of any one of B-B18-2, wherein the copolymer comprises from about 30 mer % to about 60 mer % of the first monomer.

B18-4. The analyte sensor of any one of B-B18-3, wherein the copolymer comprises from about 30 mer % to about 80 mer % of the second monomer.

B18-5. The analyte sensor of any one of B-B18-4, wherein the copolymer comprises from about 30 mer % to about 65 mer % of the second monomer.

B19. The analyte sensor of any one of B-B18-5, wherein the copolymer comprises from about 30 mer % to about 50 mer % of the second monomer.

B19-1. The analyte sensor of any one of B-B18-4, wherein the copolymer comprises from about 40 mer % to about 70 mer % of the second monomer.

B19-2. The analyte sensor of any one of B-B18, wherein the copolymer comprises at least about 40 mer % of the first monomer.

B19-3. The analyte sensor of any one of B-B18, wherein the copolymer comprises at least about 60 mer % of the first monomer.

B19-4. The analyte sensor of any one of B-B18, wherein the copolymer comprises at least about 60 mer % of the second monomer.

B19-5. The analyte sensor of any one of B-B18, wherein the copolymer comprises at least about 40 mer % of the second monomer.

B19-6. The analyte sensor of any one of B14-B19-5, wherein the copolymer is a poly(4-vinylpyridine-co-N-isopropylacrylamide).

B20. The analyte sensor of any one of B-B8, wherein the copolymer has the structure of Formula I:

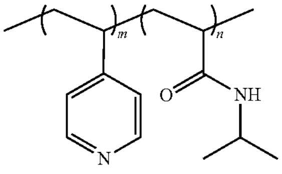

wherein m and n are each a positive integer.

B21. The analyte sensor of B20, wherein the ratio of m and n is from about 1:1 to about 1:100.

B22. The analyte sensor of B20, wherein the ratio of m and n is from about 1:1 to about 100:1.

B22. The analyte sensor of B19 or B20, wherein the ratio of m and n is from about 4:1 to about 1:4.

B23. The analyte sensor of B19 or B20, wherein the ratio of m and n is from about 4:1 to about 1:1.

B24. The analyte sensor of B19 or B20, wherein the ratio of m and n is from about 1:1 to about 1:4.

B25. The analyte sensor of B24, wherein the ratio of m and n is from about 1:1 to about 1:3.

B26. The analyte sensor of B25, wherein the ratio of m and n is from about 1:1 to about 1:2.

B27. The analyte sensor of B19, wherein m ranges from about 1 to about 90 and n ranges from about 1 to about 90.

B27-1. The analyte sensor of B27, wherein m ranges from about 30 to about 50 and n ranges from about 50 to about 70.

B27-2. The analyte sensor of B27-1, wherein m is about 40 and n is about 60.

B28. The analyte sensor of B27, wherein m is about 80 and n is about 22, m is about 65 and n is about 35 or m is about 50 and n is about 50.

B29. The analyte sensor of any of B-B28, wherein the membrane comprises one or more crosslinking agents.

B30. The analyte sensor of B29, wherein the one or more crosslinking agents is selected from the group consisting of polyethylene glycol diglycidyl ether, polyethylene glycol tetraglycidyl ether and polyetheramine.

B31. The analyte sensor of B30, wherein the crosslinking agent is a polyethylene glycol diglycidyl ether.

B32. The analyte sensor of any one of B-B31, wherein the first active area comprises one or more enzymes responsive to a first analyte.

B33. The analyte sensor of any one of B-B32, wherein the first active area comprises an electron transfer agent.

B34. The analyte sensor of any one of B-B33, wherein the first analyte is selected from the group consisting of glucose, glutamate, ketones, lactate, creatinine, potassium, sarcosine and ascorbate.

B35. The analyte sensor of any of B-B34, wherein the analyte sensor further comprises:

(iv) a second working electrode; and (v) a second active area disposed upon a surface of the second working electrode and responsive to a second analyte differing from the first analyte or for detecting a background signal, wherein a second portion of the first mass transport limiting membrane overcoats the second active area or a second separate mass transport limiting membrane overcoats the second active area.

B36. The analyte sensor of B35, wherein the background signal can be subtracted from the first signal obtained from the first working electrode to obtain the concentration of the first analyte in the fluid.

B37. The analyte sensor of B35 or B36, wherein the second active area comprises at least one enzyme responsive to the second analyte.

B38. The analyte sensor of any one of B35-B37, wherein the second separate mass transport limiting membrane comprises a different polymer than the first separate mass transport limiting membrane.

B39. The analyte sensor of any one of B35-B37, wherein the second separate mass transport limiting membrane comprises the same copolymer as the first separate mass transport limiting membrane.

B40. The analyte sensor of any one of B-B39, wherein the rate of analyte diffusion through the mass transport limiting membrane changes less than about 5% in response to a change in temperature.

B41. The analyte sensor of any one of B-B40, wherein the rate of analyte diffusion through the mass transport limiting membrane changes less than about 1% in response to a change in temperature.

B42. The analyte sensor of any one of B-B41, wherein the sensitivity of the analyte sensor changes less than about 5% in response to a change in temperature.

B43. The analyte sensor of any one of B-B42, wherein the sensitivity of the analyte sensor changes less than about 1% in response to a change in temperature.

C. The present disclosure provides a method for detecting an analyte comprising:

(i) providing an analyte sensor of any of B-B43, (ii) obtaining a first signal at or above an oxidation-reduction potential of the active area, the first signal being proportional to a concentration of the first analyte in a fluid contacting the first active area; and (iii) correlating the first signal to the concentration of the first analyte in the fluid.

D. The present disclosure provides a method for detecting an analyte comprising:

(i) providing an analyte sensor of any one of B-B39, (ii) obtaining a first signal at or above an oxidation-reduction potential of the first active area, the first signal being proportional to a concentration of the first analyte in a fluid contacting the first active area;

(iii) obtaining a second signal at or above an oxidation-reduction potential of the second active area, the second signal being proportional to a concentration of the second analyte in a fluid contacting the second active area, (iv) correlating the first signal to the concentration of the first analyte in the fluid, and (v) correlating the second signal to the concentration of the second analyte in the fluid.

E. The present disclosure provides a copolymer comprising at least a first monomer and a second monomer, wherein the first monomer comprises an acrylamide, and wherein the second monomer comprises a heterocycle-containing component.

E1. The copolymer of E, wherein the acrylamide is an N-alkyl acrylamide.

E2. The copolymer of E1, wherein the alkyl of the N-alkyl acrylamide is a C1-C6 straight or branched alkyl group or a $C_3$-$C_6$ cycloalkyl group.

E3. The copolymer of E2, wherein the alkyl of the N-alkyl acrylamide is a branched alkyl group.

E4. The copolymer of E3, wherein the branched alkyl group is selected from the group consisting of isopropyl, isobutyl, sec-butyl, tert-butyl, tert-pentyl, neopentyl, isopentyl, sec-pentyl, 3-pentyl, sec-isopentyl, active pentyl, isohexyl, tert-hexyl, neohexyl and sec-hexyl.

E5. The copolymer of any one of E-E4, wherein the N-alkyl acrylamide is N-isopropylacrylamide.

E6. The copolymer of any one of E-E5, wherein the heterocycle-containing component is selected from the group consisting of furan, thiophene, pyrrole, pyridine, pyrimidine, imidazole, oxadiazole, isoxazole, oxazole, pyrazole, isothiazole, thiazole, pyrazine, isoquinoline, quinoline, benzofuran, and benzimidazole.

E7. The copolymer of any one of E-E6, wherein the heterocycle is pyridine.

E8. The copolymer of E7, wherein the pyridine is a vinylpyridine.

E9. The copolymer of E8, wherein the vinylpyridine is 2-vinylpyridine, 4-vinylpyridine or a combination thereof.

E10. The copolymer of E8 or E9, wherein the vinylpyridine is 4-vinylpyridine.

E11. The copolymer of E8 or E9, wherein the vinylpyridine is 2-vinylpyridine.

E12. The copolymer of any one of E-E6, wherein the heterocycle is imidazole.

E13. The copolymer of E12, wherein the imidazole is a vinylimidazole.

E14. The copolymer of E13, wherein the vinylimidazole is 1-vinylimidazole, 2-vinylimidazole, 4-vinylimidazole or a combination thereof.

E15. The copolymer of E14, wherein the vinylimidazole is 1-vinylimidazole.

E16. The copolymer of E14, wherein the vinylimidazole is 2-vinylimidazole.

E17. The copolymer of any one of E-E16, wherein the acrylamide is an N-alkyl acrylamide and the heterocycle is pyridine.

E18. The copolymer of E17, wherein the N-alkyl acrylamide is N-isopropylacrylamide.

E19. The copolymer of E17 or E18, wherein the pyridine is a vinylpyridine.

E20. The copolymer of E19, wherein the vinylpyridine is 4-vinylpyridine.

E21. The copolymer of any one of E17-E20, wherein the acrylamide is an N-alkyl acrylamide and the pyridine is 4-vinylpyridine.

E22. The copolymer of any one of E-E21, wherein the copolymer comprises from about 20 mer % to about 70 mer % of the first monomer.

E22-1. The copolymer of any one of E-E22, wherein the copolymer comprises from about 40 mer % to about 60 mer % of the first monomer.

E22-2. The copolymer of any one of E-E22-1, wherein the copolymer comprises from about 30 mer % to about 60 mer % of the first monomer.

E23. The copolymer of any one of E-E22-2, wherein the copolymer comprises from about 30 mer % to about 80 mer % of the second monomer.

E23-1. The copolymer of any one of E-E23, wherein the copolymer comprises from about 30 mer % to about 65 mer % of the second monomer.

E23-2. The copolymer of any one of E-E23-1, wherein the copolymer comprises from about 30 mer % to about 50 mer % of the second monomer.

E23-3. The copolymer of any one of E-E23, wherein the copolymer comprises from about 40 mer % to about 70 mer % of the second monomer.

E23-4. The copolymer of any one of E-E21, wherein the copolymer comprises at least about 40 mer % of the first monomer.

E23-5. The copolymer of any one of E-E21, wherein the copolymer comprises at least about 60 mer % of the first monomer.

E23-6. The copolymer of any one of E-E21, wherein the copolymer comprises at least about 60 mer % of the second monomer.

E23-7. The copolymer of any one of E-E21, wherein the copolymer comprises at least about 40 mer % of the second monomer.

E23-8. The copolymer of any one of E17-E23-7, wherein the copolymer is a poly(4-vinylpyridine-co-N-isopropylacrylamide).

E24. The copolymer of any one of E-E10, wherein the copolymer has the structure of Formula I:

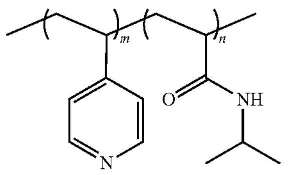

wherein m and n are each a positive integer.

E25. The copolymer of E24, wherein the ratio of m and n is from about 1:1 to about 1:100.

E26. The copolymer of E24 wherein the ratio of m and n is from about 1:1 to about 100:1.

E27. The copolymer of E24, wherein the ratio of m and n is from about 4:1 to about 1:4.

E28. The copolymer of E27, wherein the ratio of m and n is from about 1:1 to about 1:4.

E29. The copolymer of E28, wherein the ratio of m and n is from about 1:1 to about 1:3.

E30. The copolymer of E29, wherein the ratio of m and n is from about 1:1 to about 1:2.

E31. The copolymer of E24, wherein m ranges from about 1 to about 90 and n ranges from about 1 to about 90.

E31-1. The copolymer of E31, wherein m ranges from about 30 to about 50 and n ranges from about 50 to about 70.

E31-2. The copolymer of E31-1, wherein m is about 40 and n is about 60.

E32. The copolymer of E31, wherein m is about 80 and n is about 22, m is about 65 and n is about 35 or m is about 50 and n is about 50.

E33. The copolymer of any one of E-E32, wherein the rate of diffusion of an analyte through the copolymer changes less than about 5% in response to a change in temperature.

E34. The copolymer of any one of E-E33, wherein the rate of diffusion of an analyte through the copolymer changes less than about 1% in response to a change in temperature.

F. The present disclosure further provides an analyte sensor comprising:

(i) a sensor tail comprising at least a first working electrode;

(ii) a first active area disposed upon a surface of the first working electrode;

(iii) a first mass transport limiting membrane permeable to the first analyte that overcoats at least the first active area, wherein the first mass transport limiting membrane comprises a copolymer of any one of E-E32.

F1. The analyte sensor of F, wherein the first mass transport limiting membrane further comprises a second polymer.

F2. The analyte sensor of F1, wherein the second polymer comprises silicone.

G. The present disclosure further provides an analyte sensor comprising a membrane structure of any one of A-A33.

EXAMPLES

The presently disclosed subject matter will be better understood by reference to the following Examples, which are provided as exemplary of the presently disclosed subject matter, and not by way of limitation.

Example 1: Preparation of Poly(4-vinylpyridine-co-N-isopropylacrylamide)

The present example provides the synthesis of poly(4-vinylpyridine-co-N-isopropylacrylamide), which was used to prepare a mass transport limiting membrane that has a low temperature dependency.

Poly(4-vinylpyridine-co-N-isopropylacrylamide) was prepared by coupling vinylpyridine, e.g., 4-vinylpyridine, and N-isopropylacrylamide (NIPAAM) as shown in Scheme I below:

Scheme I

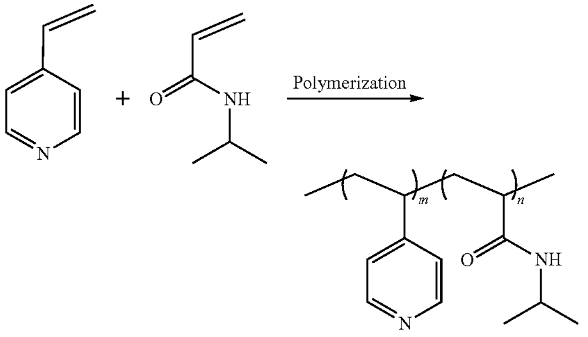

Example 2: Testing of Glucose Sensors

The present example provides testing of the temperature dependency of glucose sensors using membranes of the present disclosure. Particularly, the present example provides testing of glucose sensors having various amounts of poly(4-vinylpyridine-co-N-isopropylacrylamide) at various temperatures to assess temperature dependency of said sensors. Poly(4-vinylpyridine-co-N-isopropylacrylamide) polymers used in the membranes of this example were prepared as described in Example 1.

Glucose sensors having a working electrode that includes glucose oxidase (GOX) and flavin adenine dinucleotide (FAD) in the enzyme layer were coated with poly(4-vinylpyridine-co-N-isopropylacrylamide) polymer including different percentages of N-isopropylacrylamide (NIPAAM) and a crosslinker PEGDGE 1000. The thickness of the membranes was about 20-30 μm.

A control sensor was prepared by coating a poly(4-vinylpyridine-co-styrene) polymer membrane onto a working electrode having a GOX enzyme layer. Examples of poly(4-vinylpyridine-co-styrene) polymer membranes used as controls include those described in U.S. Pat. No. 6,932,894, the disclosure of which is herein incorporated by reference. The poly(4-vinylpyridine-co-styrene) polymer membrane used as the control can include a poly(4-vinylpyridine-co-styrene) copolymer derivatized with propylsulfonate and poly(ethyleneoxide) moieties.

The analyte sensors were tested in a 0.1 M phosphate buffer (PBS) buffer including 0.1 M NaCl (pH 7.4) and 10 mM glucose at temperatures ranging from 22° C. to 42° C. The temperature was controlled by a circulated water system with a digital temperature controller.

Figure 6:
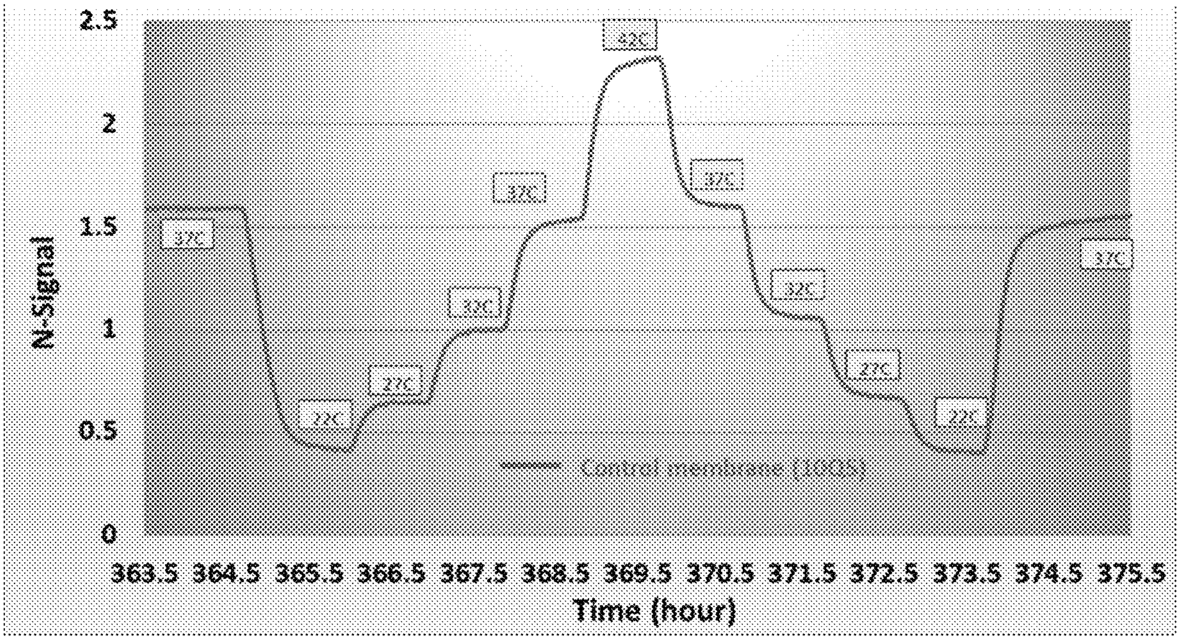
FIG. 6 provides a graph of sensor signal (in nA) over time and a temperature range of 22° C. to 42° C. for a control glucose sensor having a poly(4-vinylpyridine-co-styrene) polymer-containing membrane on a working electrode having a glucose oxidase (GOX)-containing enzyme layer.

FIG. 6 provides a response curve of a glucose sensor having a poly(4-vinylpyridine-co-styrene) polymer membrane onto a working electrode having a GOX enzyme layer (control). As shown in FIG. 6, increasing temperature increases the permeability of the membrane. As the temperature increases more water molecules form hydrogen bonds with the polar groups of this polymer, which causes expansion of the membrane. As a result, more glucose is able to diffuse thereby increasing the sensitivity of the sensor.

Table 1 provides membrane compositions where the amount of NIPAAM is varied in the poly(4-vinylpyridine-co-N-isopropylacrylamide) copolymer. Membranes having 0%, 20%, 35% and 50% of NIPAAM by monomer ratio (molar ratio) were prepared. The amount of crosslinker was kept constant.

TABLE 1

Membrane Compositions Having a Varied Amount of NIPAAM and a Constant Amount of Crosslinker

| | Stock | Mix (mL) % NIPAAM | | | |
|---|---|---|---|---|---|
| Reagent | mg/ml | 0 | 20 | 35 | 50 |
| PVP coNIPAAM (0%) | 100 | 4 | | | |
| PVP coNIPAAM (20%) | 100 | | 4 | | |
| PVP coNIPAAM (35%) | 100 | | | 4 | |
| PVP coNIPAAM (50%) | 100 | | | | 4 |
| PEGDGE 1000 | 200 | 0.25 | 0.25 | 0.25 | 0.25 |
| Dipping Conditions (mm/s) | | 3 × 5 | 4 × 5 | 4 × 5 | 4 × 5 |

Figure 7:
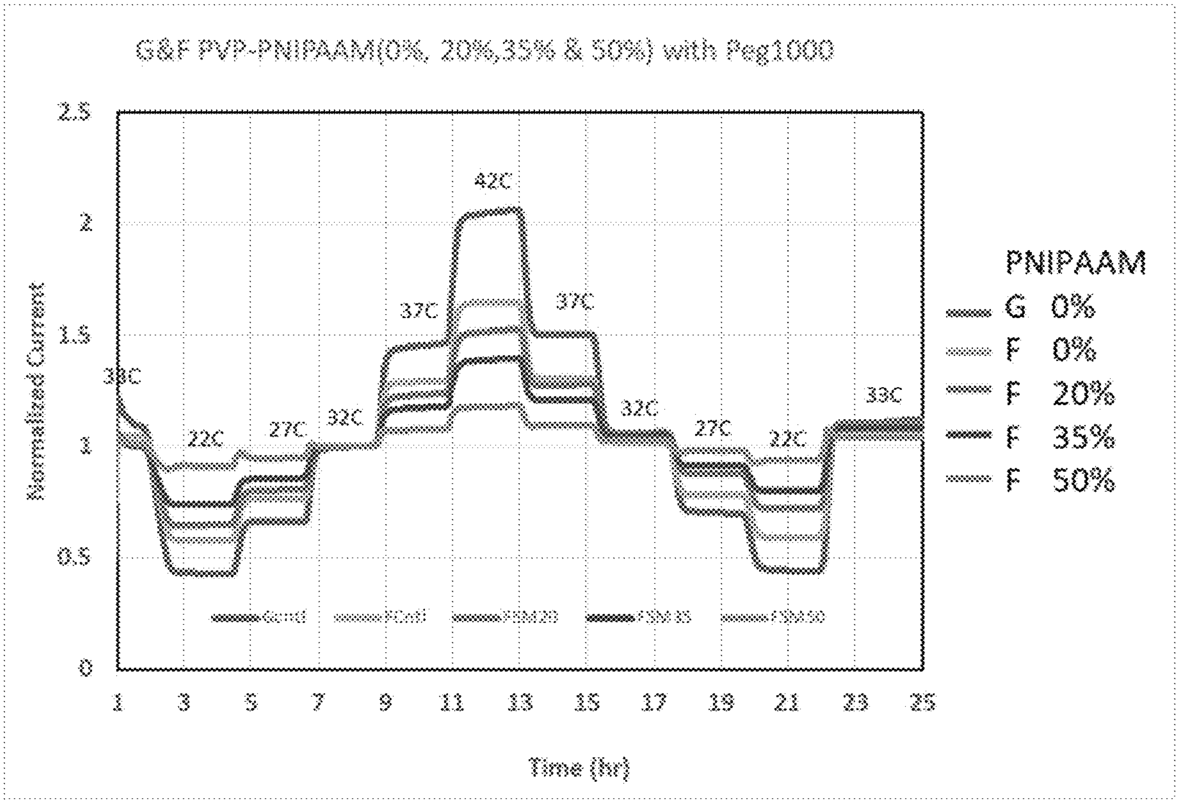
FIG. 7 provides a graph of sensor signal (in nA) over time and a temperature range of 22° C. to 42° C. for glucose sensors having membrane compositions comprising a poly(4-vinylpyridine-co-N-isopropylacrylamide) polymer with varied amounts of N-isopropylacrylamide and a control glucose sensor having a poly(4-vinylpyridine-co-styrene) polymer-containing membrane.

FIG. 7 provides the normalized response curve of glucose sensor having the membrane compositions as provided in Table 1. Table 2 provides a percent change is sensor response over a temperature range from 22° ° C. to 42° C. As shown, the working electrode includes either only glucose oxidase (GOX) at 6% or a combination of GOX at 6% and flavin adenine dinucleotide (FAD) at 3%. As shown in FIG. 7 and Table 2, when the membrane polymer includes a higher percentage of NIPAAM, the sensor response is less dependent on temperature. In particular, 50% NIPAAM results in a membrane that is significantly less temperature sensitive than membrane polymers containing less NIPAAM.

TABLE 2

Sensitivity Change of Sensors Having Membrane Compositions with a Varied Amount of NIPAAM and a Constant Amount of Crosslinker

| Enzyme | NIPAAM | % Increase per ° C. Under Air | | | | |
|---|---|---|---|---|---|---|
| Layer | (%) | 33 to 22 | 22 to 27 | 27 to 32 | 32 to 37 | 37 to 42 |
| GOX | 0 | −8.1 | 9.0 | 8.6 | 7.9 | 7.1 |
| GOX/FAD | 0 | −5.3 | 5.8 | 5.5 | 5.3 | 5.0 |
| GOX/FAD | 20 | −3.9 | 4.4 | 4.5 | 4.4 | 4.2 |
| GOX/FAD | 35 | −2.7 | 2.9 | 3.2 | 3.4 | 3.4 |
| GOX/FAD | 50 | −1.0 | 0.8 | 1.1 | 1.5 | 1.9 |

Figure 8:
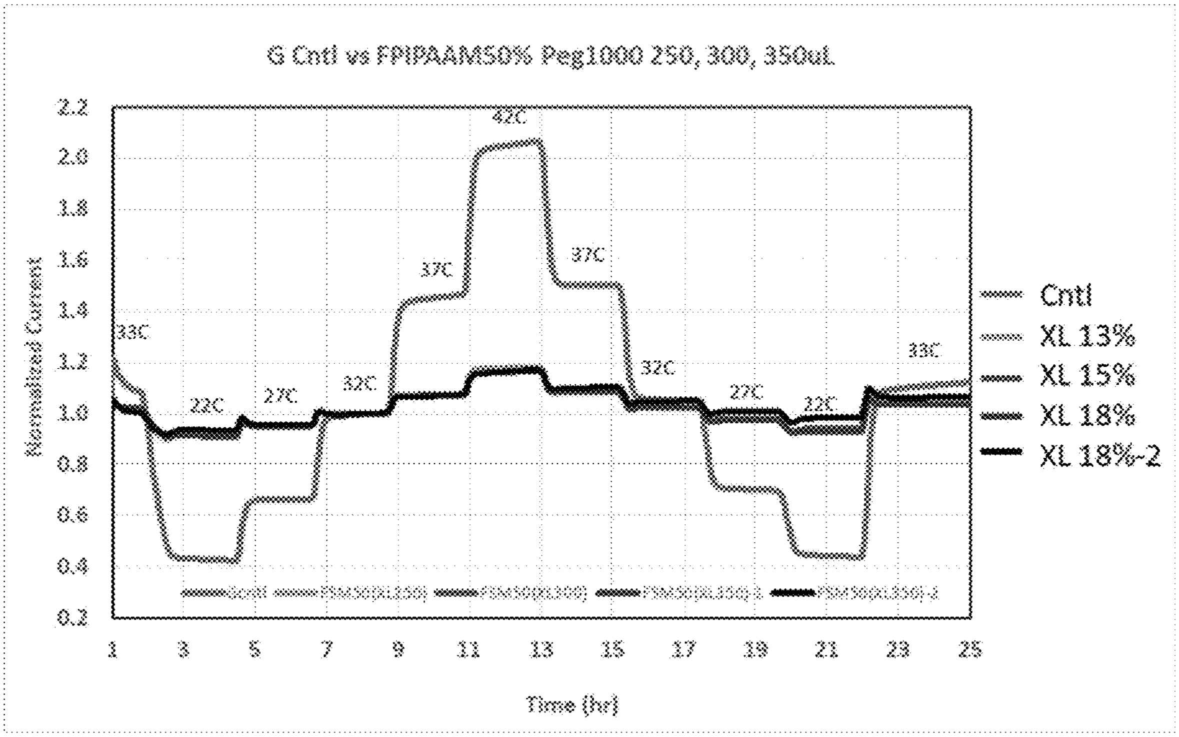
FIG. 8 provides a graph of sensor signal (in nA) over time and a temperature range of 22° C. to 42° C. for glucose sensors having membrane compositions comprising a poly(4-vinylpyridine-co-N-isopropylacrylamide) polymer with varied amounts of a crosslinker and a control glucose sensor having poly(4-vinylpyridine-co-styrene) polymer-containing membrane.

The experiments were repeated with varied amounts of crosslinker, as shown in Table 3. FIG. 8 provides the normalized response curve of glucose sensors having the membrane compositions as provided in Table 3.

TABLE 3

Membrane Compositions Having a Constant Amount of NIPAAM and a Varied Amount of Crosslinker

| | Stock | Mix (mL) % Crosslinker | | | | |
|---|---|---|---|---|---|---|
| Reagent | mg/ml | Control | 13% | 15% | 18% | 18% |
| PVP coNIPAAM (0%) | 100 | 4 | | | | |
| PVP coNIPAAM (50%) | 100 | | 4 | 4 | 4 | 4 |
| PEGDGE 1000 | 200 | 0.25 | 0.25 | 0.30 | 0.35 | 0.35 |
| Dipping Conditions (mm/s) | | 3 × 5 | 4 × 5 | 4 × 5 | 4 × 5 | 5 × 5 |

Table 4 provides a percent change in the sensor response over a temperature range from 22° ° C. to 42° C. As shown, the working electrode includes either only glucose oxidase (GOX) at 6% or a combination of GOX at 6% and flavin adenine dinucleotide (FAD) at 3%. The analyte sensors were tested in 0.1 M phosphate buffer (PBS) buffer containing 10 mM glucose at temperatures ranging from 22° C. to 42° ° C. The temperature was controlled by a circulated water system with a digital temperature controller. As shown in Table 4 and FIG. 8, different levels of crosslinker do not affect the sensor response at varied temperature.

TABLE 4

Sensitivity Change of Sensors Having Membrane Compositions with a Constant Amount of NIPAAM and a Varied Amount of Crosslinker

| Enzyme | PEGDGE | % Increase per ° C. Under Air | | | | |
|---|---|---|---|---|---|---|
| Layer | 1000 (%) | 33 to 22 | 22 to 27 | 27 to 32 | 32 to 37 | 37 to 42 |
| GOX | Control | −8.1 | 9.0 | 8.6 | 7.9 | 7.1 |
| GOX/FAD | 13 | −1.0 | 0.8 | 1.1 | 1.5 | 1.9 |
| GOX/FAD | 15 | −0.9 | 0.7 | 1.0 | 1.4 | 1.7 |
| GOX/FAD | 18 | −1.1 | 0.9 | 1.1 | 1.4 | 1.7 |
| GOX/FAD | 18 | −0.7 | 0.4 | 0.9 | 1.4 | 1.7 |

The results disclosed in this example show that use of a membrane comprising a polymer that includes NIPAAM enables preparation of a sensor that only has about 1% change in sensitivity over a temperature range of from 22° C. to 42° ° C., as compared to the control membrane, which showed about 7% change in sensitivity. It was also observed that a higher amount of NIPAAM in the polymer reduced changes in sensitivity over a temperature range. Furthermore, the present example showed that different levels of crosslinker do not affect the sensor response at varied temperature.

Example 3: Membranes with Increasing Amounts of N-isopropylacrylamide (NIPAAM)

The present example provides testing of the temperature dependency of glucose sensors using membranes of the present disclosure that have increased amounts of NIPAAM. Poly(4-vinylpyridine-co-N-isopropylacrylamide) polymers used in the membranes of this example were prepared as described in Example 1. The present example provides testing of glucose sensors with membranes comprising poly (4-vinylpyridine-co-N-isopropylacrylamide) that includes a mole percent of 50% or 60% of NIPAAM at various temperatures to assess temperature dependency of said sensors compared to control sensors that have membranes that do not include poly(4-vinylpyridine-co-N-isopropylacrylamide).

Table 5 provides membrane compositions where the amount of NIPAAM is varied in the poly(4-vinylpyridine-co-N-isopropylacrylamide) copolymer. Membranes having 50% and 60% of NIPAAM by monomer ratio (molar ratio) were prepared and are referred to SM50 and SM60, respectively, and were placed on enzyme layers that included GOX or included FADGDH (FAD-Glucose Dehydrogenase). The amount of crosslinker was kept constant.

TABLE 5

Membrane Compositions Having a Varied Amount of NIPAAM and a Constant Amount of Crosslinker

| Reagent | Stock MW | Stock mg/mL | Vol (mL) SM50 | Vol (mL) SM60 | mg/mL SM50 | mg/mL SM60 |
|---|---|---|---|---|---|---|
| PVPcoNIPAAM50 | 150-250 K | 100 | 4 | 0 | 92.0 | 0 |
| PVPcoNIPAAM60 | 150-250 K | 100 | 0 | 4 | 0 | 92.0 |
| PEGDGE1000 | | 200 | 0.35 | 0.35 | 16.1 | 16.1 |
| Total | | | 4.35 | 4.35 | | |
| Dipping Conditions | | | 4 × 5 | 5 × 5 | | |
| Membrane Thickness (μm) | | | 17.0 | 21.2 | | |

Figure 9:
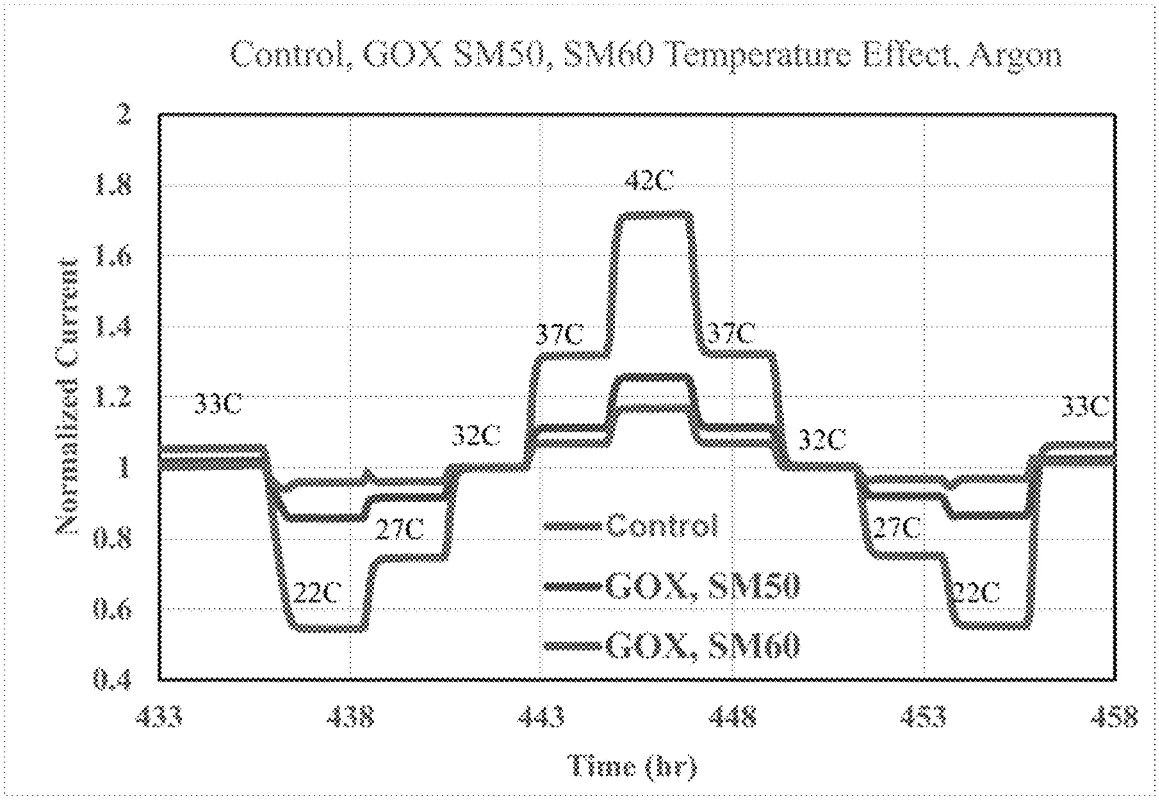
FIG. 9 provides a graph of sensor signal (in nA) over time and a temperature range of 22° C. to 42° C. for glucose sensors having membrane compositions comprising a poly(4-vinylpyridine-co-N-isopropylacrylamide) polymer with varied amounts of N-isopropylacrylamide on a working electrode having a GOX-containing enzyme layer and a control glucose sensor having a poly(4-vinylpyridine-co-styrene) polymer-containing membrane on a GOX-enzyme layer.

Table 6 provides a percent change in the sensor response over a temperature range from 22° ° C. to 42° C. As shown, the working electrode includes GOX. The analyte sensors were tested in 0.1 M phosphate buffer (PBS) buffer containing 10 mM glucose at temperatures ranging from 22° ° C. to 42° C. As shown in Table 6 and FIG. 9, when the membrane polymer includes a higher percentage of NIPAAM, the sensor response is less dependent on temperature. In particular, 60% NIPAAM results in a membrane that is less temperature sensitive than membrane polymers containing less NIPAAM and is significantly less temperature sensitive than the control membrane which contains no NIPAAM.

TABLE 6

Sensitivity Change of Sensors Having Membrane Compositions with Increasing Amounts of NIPAAM

| | | % Increase per ° C. Under Argon | | | | | | |
|---|---|---|---|---|---|---|---|---|
| Enzyme | Membrane | 33 to 22 | 22 to 27 | 27 to 32 | 32 to 37 | 37 to 42 | 22 to 37 | 22 to 42 |
| GOX | Control | −5.8% | 6.5% | 6.0% | 5.7% | 5.4% | 6.1% | 5.9% |
| GOX | SM50 | −1.6% | 1.3% | 1.8% | 2.2% | 2.5% | 1.8% | 1.9% |
| GOX | SM60 | −0.4% | 0.1% | 0.8% | 1.3% | 1.8% | 0.7% | 1.0% |

Figure 10:
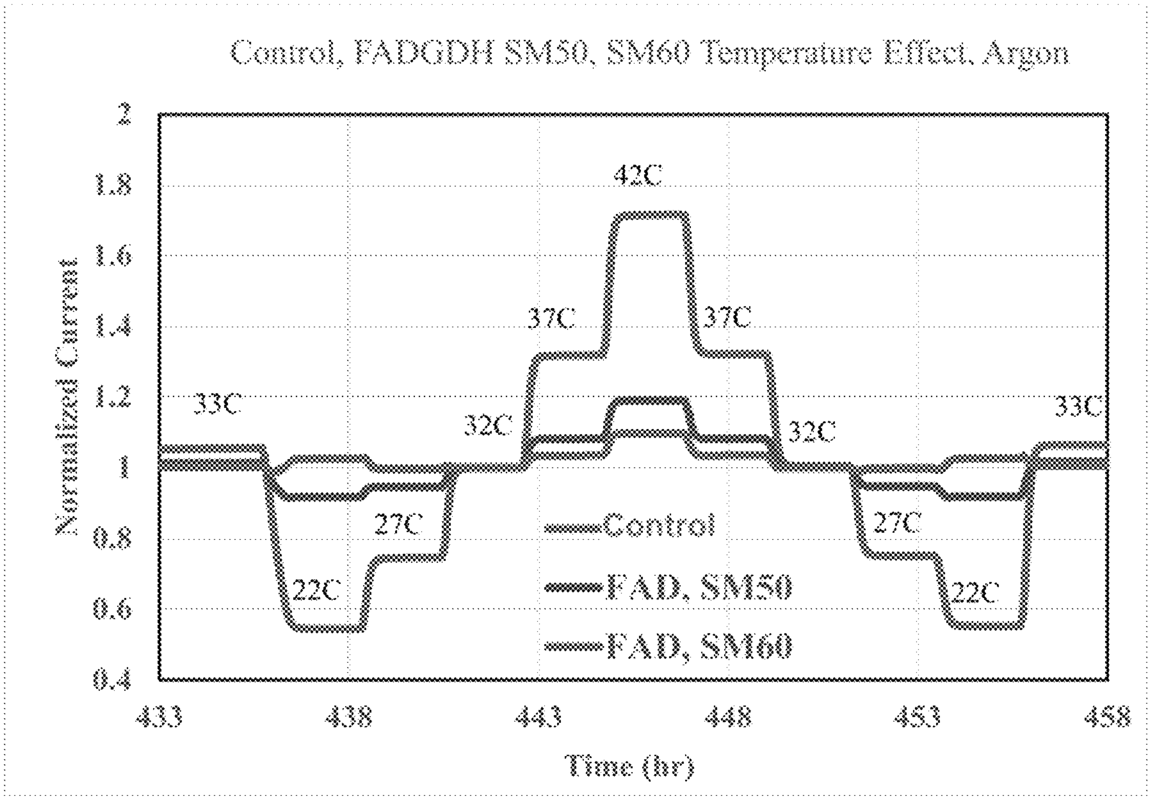
FIG. 10 provides a graph of sensor signal (in nA) over time and a temperature range of 22° C. to 42° C. for glucose sensors having membrane compositions comprising a poly(4-vinylpyridine-co-N-isopropylacrylamide) polymer with varied amounts of N-isopropylacrylamide on a working electrode having a FADGDH-containing enzyme layer and a control glucose sensor having a poly(4-vinylpyridine-co-styrene) polymer-containing membrane on a GOX-enzyme layer.

Table 7 provides a percent change in the sensor response over a temperature range from 22° ° C. to 42° C. As shown, the working electrode includes GOX and FADGDH. GOX was used with the control membrane, and FADGDH was used with the temperature insensitive membranes. The ana lyte sensors were tested in 0.1 M phosphate buffer (PBS) buffer containing 10 mM glucose at temperatures ranging from 22° ° C. to 42° ° C. As shown in Table 7 and FIG. 10, when the membrane polymer includes a higher percentage of NIPAAM, the sensor response is less dependent on temperature. In particular, 60% NIPAAM results in a membrane that is less temperature sensitive than membrane polymers containing less NIPAAM and is significantly less temperature sensitive than the control membrane which contains no NIPAAM.

TABLE 7

Sensitivity Change of Sensors Having Membrane Compositions with Increasing Amounts of NIPAAM

| | | % Increase per ° C. Under Argon | | | | | | |
|---|---|---|---|---|---|---|---|---|
| Enzyme | Membrane | 33 to 22 | 22 to 27 | 27 to 32 | 32 to 37 | 37 to 42 | 22 to 37 | 22 to 42 |
| GOX | Control | −5.8% | 6.5% | 6.0% | 5.7% | 5.4% | 6.1% | 5.9% |
| FADGDH | SM50 | −0.9% | 0.6% | 1.1% | 1.5% | 1.9% | 1.1% | 1.3% |
| FADGDH | SM60 | 0.2% | −0.6% | 0.1% | 0.7% | 1.2% | 0.1% | 0.3% |

The results disclosed in this example show that use of a membrane comprising a copolymer that includes 50% or 60% NIPAAM by monomer ratio (molar ratio) results in a sensor that only has about 1% change in sensitivity over a temperature range of from 22° ° C. to 42° C., as compared to the control membrane. It was also observed that a higher amount of NIPAAM in the polymer reduced changes in sensitivity over a temperature range. For example, a copolymer that includes 60% NIPAAM by monomer ratio (molar ratio) is significantly temperature insensitive.

Example 4: Lactate Sensors Comprising Membranes with Increasing Amounts of N-isopropylacrylamide (NIPAAM)

The present example provides testing of the temperature dependency of lactate sensors using membranes of the present disclosure that have increased amounts of NIPAAM. Poly(4-vinylpyridine-co-N-isopropylacrylamide) polymers used in the membranes of this example were prepared as described in Example 1. The present example provides testing of lactate sensors with membranes comprising poly (4-vinylpyridine-co-N-isopropylacrylamide) that includes a mole percent of 50% or 60% of NIPAAM at various temperatures to assess temperature dependency of said sensors compared to control sensors that have membranes that do not include poly(4-vinylpyridine-co-N-isopropylacrylamide), e.g., poly(4-vinylpyridine)-only polymers.

Table 8 provides membrane compositions where the amount of NIPAAM is varied in the poly(4-vinylpyridine-co-N-isopropylacrylamide) copolymer. Membranes having 50% and 60% of NIPAAM by monomer ratio (molar ratio) were prepared and are referred to SM50 and SM60, respectively, and were placed on enzyme layers that included lactate oxidase. The amount of crosslinker was kept constant. The sensors were dipped into the copolymer 4 times with an exit speed of 5 mm/second and dipped 1 time with an exit speed of 1 mm/second (referred to as 4×5, 1×1 in Table 8).

TABLE 8

Lactate Sensors Comprising Membrane Compositions Having a Varied Amount of NIPAAM and a Constant Amount of Crosslinker

| Reagent | Stock MW | Stock mg/mL | Vol (mL) SM50 | Vol (mL) SM60 |
|---|---|---|---|---|
| PVPcoNIPAAM50 | 150-250K | 100 | 4 | 0 |
| PVPcoNIPAAM60 | 150-250K | 100 | 0 | 4 |
| PEGDGE600 | | 150 | 0.15 | 0.15 |
| Total | | | 4.15 | 4.15 |

TABLE 8-continued

Lactate Sensors Comprising Membrane Compositions Having a Varied Amount of NIPAAM and a Constant Amount of Crosslinker

| Reagent | Stock MW | Stock mg/mL | Vol (mL) SM50 | Vol (mL) SM60 |
|---|---|---|---|---|
| Dipping Conditions | | | 4 × 5, 1 × 1 | 4 × 5, 1 × 1 |
| Membrane Thickness (μm) | | | 25.6 | 19.4 |

Figure 11:
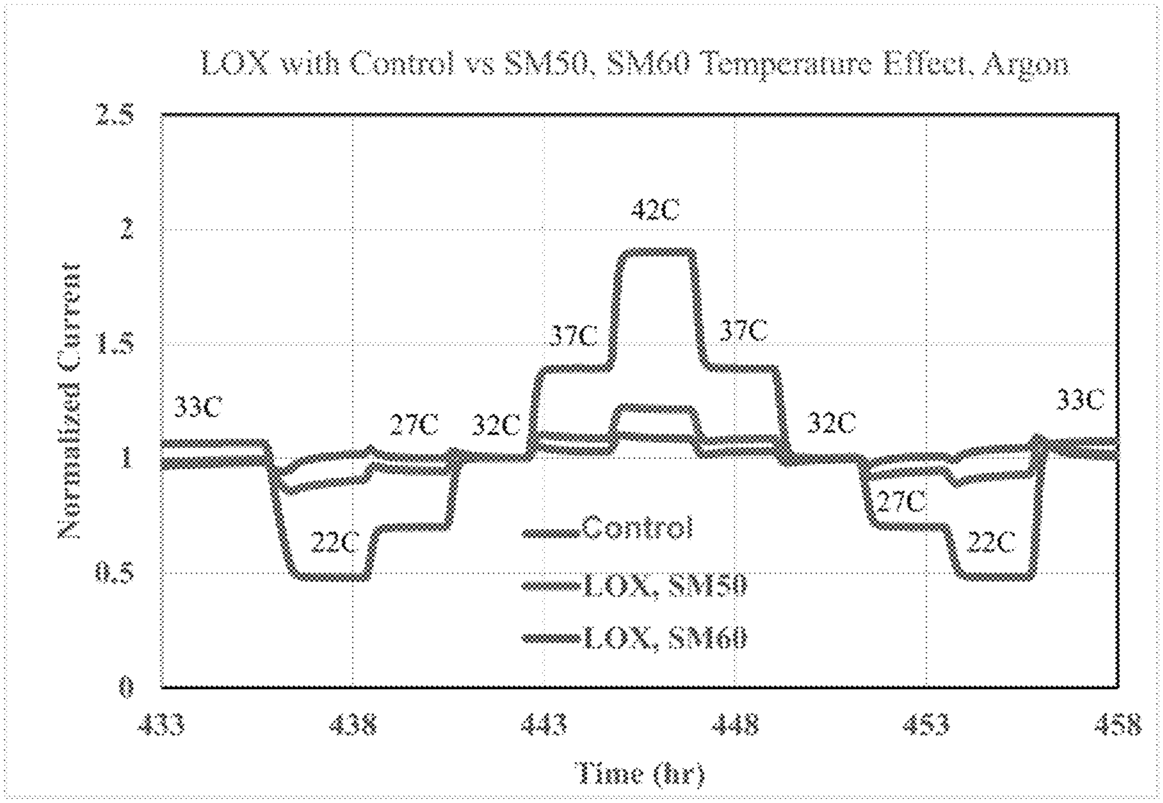
FIG. 11 provides a graph of sensor signal (in nA) over time and a temperature range of 22° C. to 42° C. for lactate sensors having membrane compositions comprising a poly(4-vinylpyridine-co-N-isopropylacrylamide) polymer with varied amounts of N-isopropylacrylamide on a working electrode having a lactate oxidase (LOX)-containing enzyme layer and a control lactate sensor having a control membrane on a LOX-containing enzyme layer.

Table 9 and FIG. 11 provide a percent change in the sensor response over a temperature range from 22° ° C. to 42° ° C. As shown, the working electrode includes lactate oxidase (LOX). The analyte sensors were tested at temperatures ranging from 22° C. to 42° C. As shown in Table 9 and FIG. 11, when the membrane polymer includes a higher percentage of NIPAAM, the sensor response is less dependent on temperature. In particular, 60% NIPAAM results in a membrane that is less temperature sensitive than membrane polymers containing less NIPAAM and is significantly less temperature sensitive than the control membrane which contains no NIPAAM.

TABLE 9

Sensitivity Change of Lactate Sensors Having Membrane Compositions with Increasing Amounts of NIPAAM

| | | % Increase per ° C. Under Argon | | | | | | |
|---|---|---|---|---|---|---|---|---|
| Enzyme | Membrane | 33 to 22 | 22 to 27 | 27 to 32 | 32 to 37 | 37 to 42 | 22 to 37 | 22 to 42 |
| LOX | Control | −7.0% | 7.9% | 7.3% | 6.8% | 6.4% | 7.4% | 7.1% |
| LOX | SM50 | −0.8% | 0.9% | 1.2% | 1.7% | 2.2% | 1.2% | 1.5% |
| LOX | SM60 | 0.3% | −0.3% | 0.0% | 0.6% | 1.1% | 0.1% | 0.3% |

The results disclosed in this example show that use of a membrane comprising a copolymer that includes 50% or 60% NIPAAM by monomer ratio (molar ratio) results in a lactate sensor that only has about 1-2% change in sensitivity over a temperature range of from 22° ° C. to 42° C., as compared to the control membrane. It was also observed that a higher amount of NIPAAM in the polymer reduced changes in sensitivity over a temperature range. For example, a copolymer that includes 60% NIPAAM by monomer ratio (molar ratio) is significantly temperature insensitive.

Although the presently disclosed subject matter and its advantages have been described in detail, it should be understood that various changes, substitutions and alterations can be made herein without departing from the spirit and scope of the disclosed subject matter. Moreover, the scope of the present application is not intended to be limited to the particular embodiments of the process, machine, manufacture, and composition of matter, methods and processes described in the specification. As one of ordinary skill in the art will readily appreciate from the disclosed subject matter of the presently disclosed subject matter, processes, machines, manufacture, compositions of matter, methods, or steps, presently existing or later to be developed that perform substantially the same function or achieve substantially the same result as the corresponding embodiments described herein may be utilized according to the presently disclosed subject matter. Accordingly, the appended claims are intended to include within their scope such processes, machines, manufacture, compositions of matter, methods, or steps.

Various patents, patent applications, publications, product descriptions, protocols, and sequence accession numbers are cited throughout this application, the inventions of which are incorporated herein by reference in their entireties for all purposes.

What is claimed is:

1. An analyte sensor comprising:

(i) an in vivo portion comprising at least a first working electrode;

(ii) a first active area disposed upon a surface of the first working electrode, wherein the first active area comprises one or more enzymes responsive to a first analyte;

(iii) a first mass transport limiting membrane permeable to the first analyte that overcoats at least the first active area, wherein the first mass transport limiting membrane comprises a copolymer of at least a first monomer comprising an acrylamide and a second monomer comprising a heterocycle-containing component, wherein the acrylamide is an N-alkyl acrylamide and the heterocycle comprises pyridine.

2. The analyte sensor of claim 1, wherein (i) the first active area comprises an electron transfer agent and/or (ii) the first analyte is selected from the group consisting of glucose, glutamate, ketones, lactate, creatine, creatinine, potassium, sarcosine and ascorbate.

3. The analyte sensor of claim 1, wherein the alkyl of the N-alkyl acrylamide is a C1-C6 straight or branched alkyl group or a C3-C6 cycloalkyl group.

4. The analyte sensor of claim 1, wherein the N-alkyl acrylamide is N-isopropylacrylamide.

5. The analyte sensor of claim 1, wherein the copolymer comprises (i) from about 20 mer % to about 70 mer % of the first monomer or from about 40 mer % to about 60 mer % of the first monomer and/or (ii) from about 30 mer % to about 80 mer % of the second monomer or from about 30 mer % to about 60 mer % of the second monomer.

6. The analyte sensor of claim 1, wherein the copolymer has the structure of Formula I:

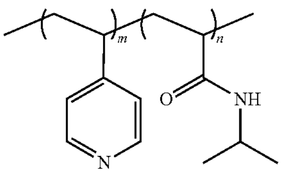

wherein m and n are each a positive integer.

7. The analyte sensor of claim 6, wherein the ratio of m and n is from about 1:1 to about 1:100, from about 1:1 to about 100:1, from about 4:1 to about 1:4 or from about 1:1 to about 1:4 or wherein m ranges from about 1 to about 90 and n ranges from about 1 to about 90.

8. The analyte sensor of claim 1, wherein the analyte sensor further comprises:

(iv) a second working electrode; and (v) a second active area disposed upon a surface of the second working electrode and responsive to a second analyte differing from the first analyte or for detecting a background signal, wherein a second portion of the first membrane overcoats the second active area or a second separate membrane overcoats the second active area.

9. The analyte sensor of claim 1, wherein the first active area comprises an electron transfer agent.

10. The analyte sensor of claim 1, wherein the first analyte is selected from the group consisting of glucose, glutamate, ketones, lactate, creatine, creatinine, potassium, sarcosine and ascorbate.

11. The analyte sensor of claim 3, wherein the alkyl of the N-alkyl acrylamide is a branched alkyl group.

12. The analyte sensor of claim 1, wherein the heterocycle of the heterocycle-containing component is a vinylpyridine.

13. The analyte sensor of claim 12, wherein the vinylpyridine is selected from the group consisting of 2-vinylpyridine, 4-vinylpyridine and a combination thereof.

14. The analyte sensor of claim 1, wherein the copolymer comprises (i) from about 40 mer % to about 60 mer % of the first monomer and/or (ii) from about 30 mer % to about 60 mer % of the second monomer.

15. The analyte sensor of claim 1, wherein the acrylamide is N-isopropylacrylamide and the heterocycle is 4-vinylpyridine.

16. The analyte sensor of claim 1, wherein the heterocycle of the heterocycle-containing component is a polyvinylimidazole.

17. The analyte sensor of claim 1, wherein the acrylamide is N-isopropylacrylamide and the heterocycle is a polyvinylimidazole.

18. The analyte sensor of claim 1, wherein the acrylamide is N-isopropylacrylamide and the heterocycle is 4-vinylpyridine.

19. The analyte sensor of claim 1, wherein the in vivo portion is adapted to be inserted into a subcutaneous layer of skin of a user.

* * * * *